(12) United States Patent
Li et al.

(10) Patent No.: US 11,777,138 B2
(45) Date of Patent: Oct. 3, 2023

(54) SOLID STATE ELECTROLYTES AND METHODS OF PRODUCTION THEREOF

(71) Applicant: President and Fellows of Harvard College, Cambridge, MA (US)

(72) Inventors: Xin Li, Belmont, MA (US); Fan Wu, Cambridge, MA (US); William Fitzhugh, Somerville, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 365 days.

(21) Appl. No.: 16/766,393

(22) PCT Filed: Nov. 21, 2018

(86) PCT No.: PCT/US2018/062265
§ 371 (c)(1),
(2) Date: May 22, 2020

(87) PCT Pub. No.: WO2019/104181
PCT Pub. Date: May 31, 2019

(65) Prior Publication Data
US 2020/0350618 A1    Nov. 5, 2020

Related U.S. Application Data

(60) Provisional application No. 62/729,749, filed on Sep. 11, 2018, provisional application No. 62/669,152, (Continued)

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01); *H01M 2300/0094* (2013.01)

(58) Field of Classification Search
CPC ..................... H01M 10/0562; H01M 10/0525
See application file for complete search history.

(56) References Cited

U.S. PATENT DOCUMENTS 6,492,062 B1    12/2002   Wang et al.
9,399,404 B2    7/2016    Ose et al.
(Continued)

FOREIGN PATENT DOCUMENTS

KR    10-2018-0094184 A    8/2018
WO    WO-2016/026130 A1    2/2016
(Continued)

OTHER PUBLICATIONS

Sun et al., Oxygen Substitution Effects in Li10GeP2S12 Solid Electrolyte, Journal of Power Sources, vol./Issue 324, pp. 798-803 (Year: 2016).*
(Continued)

*Primary Examiner* — Jayne L Mershon
(74) *Attorney, Agent, or Firm* — Clark & Elbing LLP

(57) ABSTRACT

The invention provides compositions containing a solid state electrolyte (SSE) containing an alkali metal and a sulfide for use as the electrolyte matrix in a solid state rechargeable battery. The SSE compositions may further contain phosphorous, silicon, or a dopant atom, such as a halogen. These compositions are advantageous as they use Earth-abundant elements, have high voltage stability, excellent battery cycle performance, and are fabricated and used under conditions that do not require excessive external pressures which would otherwise limit their use in a production battery. In particular, the SSEs have a controllable microstructure, e.g., core-shell structure, that enhances their inherent stability while obviating the need for excessively large pressures to control (Continued)

the electrolyte stability. Methods of producing the compositions and rechargeable batteries including the composition are also provided.

29 Claims, 42 Drawing Sheets

Related U.S. Application Data filed on May 9, 2018, provisional application No. 62/590,046, filed on Nov. 22, 2017.

(56) References Cited

U.S. PATENT DOCUMENTS

| | | | |
|---|---|---|---|
| 9,634,360 | B2 | 4/2017 | Hayashi et al. |
| 2005/0233206 | A1 | 10/2005 | Puttaiah et al. |
| 2010/0129724 | A1 | 5/2010 | Kolosnitsyn |
| 2010/0285372 | A1 | 11/2010 | Lee et al. |
| 2011/0223477 | A1 | 9/2011 | Nelson et al. |
| 2014/0193691 | A1 | 7/2014 | Ueki et al. |
| 2014/0342222 | A1 | 11/2014 | Kim et al. |
| 2016/0211498 | A1 | 7/2016 | Kim et al. |
| 2016/0276641 | A1 | 9/2016 | Umeyama et al. |
| 2017/0170473 | A1* | 6/2017 | Peled .............. H01M 4/387 |
| 2018/0090758 | A1 | 3/2018 | Xu et al. |
| 2019/0296305 | A1* | 9/2019 | Ito .............. H01M 50/10 |
| 2019/0305293 | A1 | 10/2019 | Sotowa et al. |
| 2021/0408580 | A1 | 12/2021 | Ye et al. |
| 2022/0166012 | A1 | 5/2022 | Li et al. |

FOREIGN PATENT DOCUMENTS

| | | |
|---|---|---|
| WO | WO-2018/098494 A1 | 5/2018 |
| WO | WO-2019/104181 A1 | 5/2019 |
| WO | WO-2022/094412 A1 | 5/2022 |

OTHER PUBLICATIONS

Cheng et al., "High rate performance of the carbon encapsulated $Li_4Ti_5O_{12}$ for lithium ion battery," Results in Physics. 7:810-2 (2017).
International Search Report and Written Opinion for International Application No. PCT/US18/62265, dated Feb. 1, 2019 (15 pages).
Kato et al., "High-power all-solid-state batteries using sulfide superionic conductors," Nature Energy. 1:1-7 (2016).
Wu et al., "Advanced sulfide solid electrolyte by core-shell structural design," Nat Commun. 9(1):4037 (2018).
Wu et al., "Mechanical modeling of particles with active core-shell structures for lithium-ion battery electrodes," J Phys Chem. (2017).
Doeff et al., "Orthorhombic $Na_xMnO_2$ as a cathode material for secondary sodium and lithium polymer batteries," Journal of the Electrochemical Society. 141(11):L145-L147 (1994).
Ma et al., "Electrochemical properties of Monoclinic $NaMnO_2$," Journal of the Electrochemical Society. 158(12):A1307-A1312 (2011).
Winter et al., "What are batteries, fuel cells, and supercapacitors?" Chem Rev. 104(10):4245-69 (2010).
Adeli et al., "Boosting Solid-State Diffusivity and Conductivity in Lithium Superionic Argyrodites by Halide Substitution," Angew Chem Int Ed Engle. 58(26):8681-8686 (Jun. 24, 2019).
Asano et al., "Solid Halide Electrolytes with High Lithium-Ion Conductivity for Application in 4 V Class Bulk-Type All-Solid-State Batteries," Adv Mater. 30:1-7 (Sep. 14, 2018).
Auvergniot et al., "Interface Stability of Argyrodite $Li_6PS_5Cl$ toward $LiCoO_2$, $LiNi_{1/3}Co_{1/3}Mn_{1/3}O2$, and $LiMn_2O_4$ in Bulk All-Solid-State Batteries," Chem Mater. 29(9):3883-3890 (Apr. 7, 2017).
Braga et al., "Novel $Li_3ClO$ based glasses with superionic properties for lithium batteries," J Mater Chem A. 2(15):5470-5480 (Mar. 7, 2014).

Chen et al., "Li metal deposition and stripping in a solid-state battery via Coble creep," Nature. 578(7794):251-255 (Feb. 3, 2020) (8 pages).
Chen et al., "Reversible flat to rippling phase transition in Fe containing layered battery electrode materials," Adv Funct Mater. 28(39):https://doi.org/10.1002/adfm.201803896 (Jul. 2018) (22 pages) manuscript.
Chen et al., "Super charge separation and high voltage phase in $Na_xMnO_2$," Adv Funct Mater. 28:https://doi.org/10.1002/adfm. 201805105 (Oct. 2018) (24 pages) manuscript.
Cheng et al., "Intergranular Li metal propagation through polycrystalline $Li_{6.25}Al_{0.25}La_3Zr_2O_{12}$ ceramic electrolyte," Electrochimica Acta. 223:85-91 (Jan. 1, 2017). manuscript.
Choi et al., "Li-ion batteries from $LiFePO_4$ cathode and anatase/graphene composite anode for stationary energy storage," Electrochemistry Communications. 12(3):378-381 (Mar. 2010).
Deviannapoorani et al., "Lithium ion transport properties of high conductive tellurium substituted $Li_7La_3Zr_2O_{12}$ cubic lithium garnets," J Power Sci. 240:18-25 (Oct. 15, 2013).
Du et al., "Structures, Thermodynamics, and $Li^+$ Mobility of $Li_{10}GeP_2S_{12}$: A First-Principles Analysis," J Phys Chem. 118(20):10590-10595 (May 1, 2014).
El-Shinawi et al., "Enhancement of the lithium ion conductivity of Ta-doped $Li_7La_3Zr_2O_{12}$ by incorporation of calcium," Dalton Trans. 46(29):9415 (Jul. 3, 2017) (5 pages).
Fitzhugh et al., "A High-Throughput Search for Functionally Stable Interfaces in Sulfide Solid-State Lithium Ion Conductors," Adv Energy Mater. 9(21):1900807 (Apr. 24, 2019) (12 pages).
Fitzhugh et al., "Strain-Stabilized Ceramic-Sulfide Electrolytes," Small. 15(33):e1901470 (Jul. 3, 2019) (14 pages).
Fitzhugh et al., "The effects of mechanical constriction on the operation of sulfide based solid-state batteries," J Mater Chem A. DOI:10.1039/C9TA05248H (Sep. 13, 2019) (24 pages).
Geiger et al., "Crystal Chemistry and Stability of "$Li_7La_3Zr_2O_{12}$" Garnet: A Fast Lithium-Ion Conductor," Inorg Chem. 50(3):1089-1097 (Dec. 28, 2010).
Goodenough et al., "Challenges for Rechargeable Li Batteries," Chem Mat. 22:587-603 (Aug. 28, 2009).
Goodenough et al., "The Li-Ion Rechargeable Battery: A Perspective," J Am Chem Soc. 135(4):1167-1176 (Jan. 7, 2013).
Han et al., "A Battery Made from a Single Material," Adv Mat. 27(23):3473-3483 (Apr. 30, 2015).
Han et al., "Electrochemical Stability of $Li_{10}GeP_2S_{12}$ and $Li_7La_3Zr_2O_{12}$ Solid Electrolytes," Adv Energy Mater. 6(8):1501590 (Jan. 21, 2016) (29 pages) manuscript.
Hayashi et al., "All-solid-state Li/S batteries with highly conductive glass-ceramic electrolytes," Electrochemistry Communications. 5(8):701-705 (Aug. 2003).
Jain et al., "Commentary: The Materials Project: A materials genome approach to accelerating materials innovation," Apl Mater. 1:011002 (Jul. 18, 2013) (11 pages).
Jin et al., "Covalently Connected Carbon Nanostructures for Current Collectors in Both the Cathode and Anode of Li—S Batteries," Adv Mater. 28(41):9094-9102 (Nov. 2, 2016).
Jin et al., "Self-healing SEI enables full-cell cycling of a silicon-majority anode with a coulombic efficiency exceeding 99.9%," Energy Environ Sci. 10:580-592 (Jan. 6, 2017).
Kamaya et al., "A lithium superionic conductor," Nature Mat. 10(9):682-686 (Jul. 31, 2011).
Kang et al., "Battery materials for ultrafast charging and discharging," Nature. 458(7235):190-193 (Mar. 12, 2009).
Kasemchainan et al., "Critical stripping current leads to dendrite formation on plating in lithium anode solid electrolyte cells," Nat Mater. 18:1105-1111 (Jul. 29, 2019) (24 pages). manuscript.
Khurana et al., "Suppression of Lithium Dendrite Growth Using Cross-Linked Polyethylene/Poly(ethylene oxide) Electrolytes: A New Approach for Practical Lithium-Metal Polymer Batteries," J Am Chem Soc. 136(20):7395-402 (Apr. 22, 2014).
Kim et al., "Electrochemical Stability of $Li_{6.5}La_3Zr_{1.5}M_{0.5}O_{12}$ (M=Nb or Ta) against Metallic Lithium," Front Energy Res. 4:1-7 (May 20, 2016).

(56) References Cited

OTHER PUBLICATIONS

Krauskopf et al., "Physicochemical Concepts of the Lithium Metal Anode in Solid-State Batteries," Chem Rev. 120(15):7745-7794 (Jul. 27, 2020).
Kuhn et al., "Tetragonal $Li_{10}GeP_2S_{12}$ and $Li_7GePS_8$—exploring the Li ion dynamics in LGPS Li electrolytes," Energy Environ Sci. 6:3548-3552 (Oct. 7, 2013).
Lee et al., "High-energy long-cycling all-solid-state lithium metal batteries enabled by silver-carbon composite anodes," Nat Energy. 5:299-308 (Mar. 9, 2020).
Li et al., "Air-stable Li3InCl6 electrolyte with high voltage compatibility for all-solid-state batteries," Energy Environ Sci. 12:2665-2671 (Aug. 28, 2019).
Li et al., "Extending the Service Life of High-Ni Layered Oxides by Tuning the Electrode-Electrolyte Interphase," Adv Nat Mater. 8:1-11 (Sep. 10, 2018) (33 pages). manuscript.
Li et al., "Long-Term Cyclability of NCM-811 at High Voltages in Lithium-Ion Batteries: an In-Depth Diagnostic Study," Chem Mater. 32(18):7796-7804 (Aug. 27, 2020).
Li et al., "Solid Electrolyte: the Key for High-Voltage Lithium Batteries," Adv Energy Mat. 5(4):1401408 (Oct. 14, 2014) (21 Pages) manuscript.
Li, Xin, "Critical Assembly and Test Procedures Driven by Mechanical Constriction Principle for Advanced Performances of Solid-State Batteries," Adv Energy Sustainability Res. 2(6):2100003 (Apr. 7, 2021) (9 pages).
Li, Xin., "Constrictions Induced Metastability and Kinetic Stability for Advanced Solid-State Battery Design," Encyclopedia of Energy Storage. 4:180-190 (Jan. 2021) (12 pages).
Liang et al., "In Situ $Li_3$ $PS_4$ Solid-State Electrolyte Protection Layers for Superior Long-Life and High-Rate Lithium-Metal Anodes," Adv Mater. 30(45):e1804684 (Oct. 1, 2018) (9 pages).
Liang et al., "Site-Occupation-Tuned Superionic $Li_xScCl_{3+x}$Halide Solid Electrolytes for All-Solid-State Batteries," J Am Chern Soc. 142(15):7012-7022 (Mar. 26, 2020).
Lin et al., "Low-Temperature Behavior of Li-Ion Cells," Electrochem Solid-State Lett. 4(6):A71-A73 (Apr. 12, 2001).
Liu et al., "Pathways for practical high-energy long-cycling lithium metal batteries," Nat Energy. 4:180-186 (Feb. 25, 2019).
Mangani et al., "Mechanical vs. chemical stability of sulphide-based solid-state batteries. Which one is the biggest challenge to tackle? Overview of solid-state batteries and hybrid solid state batteries," J Mater Chem A. 8(20):10150-10167 (Apr. 28, 2020) (19 pages). manuscript.
Manthiram et al., "Lithium battery chemistries enabled by solid-state electrolytes," Nature reviews materials. 2:1-16 (Feb. 14, 2017).
Mizuno et al., "High lithium ion conducting glass-ceramics in the system $Li_2S$—$P_2S_5$," Solid State Ionics. 177:2721-2725 (Oct. 2006).
Mizuno et al., "New, Highly Ion-Conductive Crystals Precipitated from $Li_2S$—$P_2S_5$ Glasses," Adv Mater. 17(7):918-921 (Apr. 4, 2005).
Mo et al., "First Principles Study of the $Li_{10}GeP_2Si_2$ Lithium Super Ionic Conductor Material," Chem Mater. 24(1):15-17 (Dec. 9, 2011) (4 pages). manuscript.
Morimoto et al., "Mechanochemical Synthesis of New Amorphous Materials of $60Li_2S•40SiS_2$ with High Lithium Ion Conductivity," J Am Chem Soc. 82(5):1352-1354 (Dec. 21, 2004).
Murugan et al., "Fast Lithium Ion Conduction in Garnet-Type $Li_7La_3Zr_2O_{12}$," Agnew Chem Int Ed. 46(41):7778-7781 (Oct. 15, 2007).
Nagao et al., "High-capacity $Li_2S$-nanocarbon composite electrode for all-solid-state rechargeable lithium batteries," J Mat Chem. 22:10015-10020 (Apr. 13, 2012).
Ning et al., "Visualizing plating-induced cracking in lithium-anode solid-electrolyte cells," Nature Mater. 20(8):1121-1129 (Apr. 22, 2021) (20 pages).
Ong et al., "Li—Fe—P—$O_2$ Phase Diagram from First Principles Calculations," Chem Mater. 20(5):1798-1807 (Feb. 7, 2008).
Ong et al., "Phase stability, electrochemical stability and ionic conductivity of the $Li_{10\pm1}MP_2X_{12}$ (M=Ge, Si, Sn, Al or P, and X=O, S or Se) family of superionic conductors," Energy Environ Sci. 6(1):148 (Oct. 2, 2012) (23 pages). manuscript.
Pan et al., "Electrochemical Properties of All-solid-state Lithium Batteries with Amorphous $FeS_x$-based Composite Positive Electrodes Prepared via Mechanochemistry," Electrochemistry. 86(4):175-178 (Jun. 1, 2018).
Park et al., "High-Voltage Superionic Halide Solid Electrolytes for All-Solid-State Li-Ion Batteries," ACS Energy Lett. 5(2):533-539 (Jan. 9, 2020) (17 pages). manuscript.
Peng et al., "Nanoarchitectured Graphene/CNT@Porous Carbon with Extraordinary Electrical Conductivity and Interconnected Micro/Mesopores for Lithium-Sulfur Batteries," Adv Funct Mater. 24:2772-2781 (Jan. 30, 2014).
Qi et al., "A New General Paradigm for Understanding and Preventing Li Metal Penetration through Solid Electrolytes," Joule. 4(12):2599-2608 (Dec. 16, 2020).
Rangasamy et al., "An Iodide-Based $Li_7P_2S_8I$ Superionic Conductor," J Am Chem Soc. 137(4):1384-1387 (Jan. 20, 2015).
Ren et al., "Oxide Electrolytes for Lithium Batteries," J Am Chern Soc. 98(12):3603-3623 (Sep. 22, 2015).
Richards et al., "Interface Stability in Solid-State Batteries," Chem Mater. 28(1):266-273 (Dec. 7, 2015).
Sallard et al., "Cr-Doped Li-Rich Nickel Cobalt Manganese Oxide as a Positive Electrode Material in Li-Ion Batteries to Enhance Cycling Stability," ACS Appl Energy Mater. 3(9):8646-9657 (Aug. 10, 2020).
Saroha et al., "Development of surface functionalized ZnO-doped $LiFePO_4$/C composites as alternative cathode material for lithium ion batteries," Applied Surface Science. 394:25-36 (Feb. 1, 2017).
Schwietert et al., "Clarifying the relationship between redox activity and electrochemical stability in solid electrolytes," Nat Mater. 19:428-435 (Jan. 13, 2020) (34 pages). manuscript.
Su et al., "A more stable lithium anode by mechanical constriction for solid state batteries," Energy Environ Sci. 13:908-916 (Jan. 22, 2020).
Takada, Kazunor, "Progress and prospective of solid-state lithium batteries," Acta Materialia. 61(3):759-770 (Feb. 2013).
Tarascon et al., "Issues and challenges facing rechargeable lithium batteries," Nature. 414(6861):359-67 (Nov. 15, 2001).
Tatsumisago et al., "New lithium ion conducting glass-ceramics prepared from mechanochemical $Li_2S$—$P_2S_5$ glasses," Solid State Ionics. 154-155:635-640 (Dec. 2, 2002).
Tian et al., "Compatibility issues between electrodes and electrolytes in solid-state batteries," Energy Environ Sci. 10:1150-1166 (Apr. 26, 2017).
Tu et al., "Electrodeposition and Mechanical Stability at Lithium-Solid Electrolyte Interface during Plating in Solid-State Batteries," Cell Reports Physical Science. 1(7):100106 (Jul. 22, 2020) (20 pages).
Wang et al., "Computational Prediction and Evaluation of Solid-State Sodium Superionic Conductors $Na_7P_3X_{11}$ (X=O, S, Se)," Chem Mater. 29(17):7475-7482 (Jul. 27, 2017).
Wang et al., "Lithium Chlorides and Bromides as Promising Solid-State Chemistries for Fast Ion Conductors with Good Electrochemical Stability," Angew Chemie—Int Ed. 58:8039-8043 (Apr. 11, 2019) (7 pages). manuscript.
Wang et al., "Stabilizing interface between $Li_{10}SnP_2S_{12}$ and Li metal by molecular layer deposition," Nano Energy. 53:168-174 (Aug. 21, 2018).
Wenzel et al., "Direct Observation of the Interfacial Instability of the Fast Ionic Conductor $Li_{10}GeP_2S_{12}$ at the Lithium Metal Anode," Chem Mater. 28(7):2400-2407 (Mar. 10, 2016).
Wenzel et al., "Interfacial reactivity and interphase growth of argyrodite solid electrolytes at lithium metal electrodes," Solid State Ionics. 318:102-112 (May 2018).
Wenzel et al., "Interphase formation and degradation of charge transfer kinetics between a lithium metal anode and highly crystalline $Li_7P_3S_{11}$ solid electrolyte," Solid State Ionics. 286:24-33 (Mar. 2016).

(56) References Cited

OTHER PUBLICATIONS

Xin et al., "Li—Nb—O Coating/Substitution Enhances the Electrochemical Performance of the $LiNi_{0.8}Mn_{0.1}Co_{0.1}O_2$ (NMC 811) Cathode," ACS Appl Mater Interfaces. 11(38):34889-34894 (Aug. 30, 2019).

Xu et al., "Bulk Fatigue Induced by Surface Reconstruction in Layered Ni-Rich Oxide Cathodes for Li-ion Batteries," Nat Mater. DOI:10.1038/s41563-020-0767-8 (Mar. 11, 2020) (51 pages).

Xu et al., "In Situ Generated Fireproof Gel Polymer Electrolyte with Li6.4Ga0.2La3Zr2O12 As Initiator and Ion-Conductive Filler," Adv Energy Mater. 9:1-12 (May 3, 2019).

Yamauchi et al., "Preparation and ionic conductivities of (100-x)(0.75$Li_2S$•0.25$P_2S_5$)•xLiBH4 glass electrolytes," J Power Sci. 244:707-710 (Dec. 15, 2013).

Ye et al., "A dynamic stability design strategy for lithium metal solid state batteries," Nature. 593:218-222 (May 12, 2021).

Ye et al., "An Efficient Route to Polymeric Electrolyte Membranes with Interparticle Chain Microstructure Toward High-Temperature Lithium-Ion Batteries," Adv Mater Interfaces. 4(11):1601236 (Apr. 13, 2017) (6 pages).

Ye et al., "Toward Higher Voltage Solid-State Batteries by Metastability and Kinetic Stability Design," Adv Energy Mater. 10(34):2001569 (Jul. 29, 2020) (15 pages).

Yoshinari et al., "Interfacial Stability of Phosphate-NASICON Solid Electrolytes in Ni-Rich NCM Cathode-Based Solid-State Batteries," ACS Appl Mater Interfaces. 11(26):23244-23253 (Jun. 14, 2019).

Zhang et al., "Effects of CuO on the microstructure and electrochemical properties of garnet-type $Li_{6.3}La_3Zr_{1.65}W_{0.35}O_{12}$ solid electrolyte," J Phys Chem Solids. 135:109080 (Dec. 2019) (6 pages).

Zhang et al., "Mechanisms and properties of ion-transport in inorganic solid electrolytes," Energy Storage Materials. 10:139-159 (Jan. 2018).

Zhang et al., "Unraveling the Intra and Intercycle Interfacial Evolution of $Li_6PS_5Cl$-Based All-Solid-State Lithium Batteries," Adv Energy Mater. 10(4):1903311 (Dec. 10, 2019).

Zhao et al., "Ultrastable Anode Interface Achieved by Fluorinating Electrolytes for All-Solid-State Li Metal Batteries," ACS Energy Lett. 5(4):1035-1043 (Mar. 5, 2020).

Zhu et al., "First principles study on electrochemical and chemical stability of solid electrolyte-electrode interfaces in all-solid-state Li-ion batteries," J Mater Chem. 4:3253-3266 (Dec. 11, 2015) (34 pages) manuscript.

Zhu et al., "Origin of Outstanding Stability in the Lithium Solid Electrolyte Materials: Insights from Thermodynamic Analyses Based on First-Principles Calculations," ACS Appl Mater Interfaces. 7(42):23685-23693 (Oct. 6, 2015).

Zhu et al., "Strategies Based on Nitride Materials Chemistry to Stabilize Li Metal Anode," Adv Sci. 4(8):1600517 (Mar. 3, 2017) (11 pages).

Kim, J. S. et al. Three-dimensional silicon/carbon core-shell electrode as an anode material for lithium-ion batteries. J. Power Sources 279, 13-20 (2015).

Kyoung et al., "Electronic structures of $SiO_2$ thim films via Ar gas cluster ion beam sputtering" Surf. Interface Anal. 46: 58-61 (2014).

Yoshimura et al., "Measurement of the diffusion rate of Li in silicon by the use of bipolar cells" J. Power Sources. 174(2): 653-657 (2007).

Lin et al., "Lithium plating mechanism, detection, and mitigation in lithium-ion batteries" Prog. Energy Combust Sci. 87:100953 (2021) (30 Pages).

Masias et al., "Elastic, plastic, and creeep mechanical properties of lithium metal" J. Mater. Sci. 54:2585-2600 (2019).

Lee et al., "Lithiation pathway mechanism of Si—C composite anode revealed by the role of nanopore using in situ lithiation" ACS Energy Lett. 7: 2469-76 (2022).

Ryou et al., "A microgrid-patterned silicon electrode as an electroactive lithium host" Energy Environ. Sci. 15: 2581-90 (2022).

Ghosh et al., "Study of inelastic mean free path of metal nanostructures using energy filtered transmission electron microscopy imaging" J. Microsc. 258(3): 253-8 (2015).

\* cited by examiner

LSPS-Cl 500°C

LSPS-Cl 490°C

LSPS-Cl 480°C

LSPS-Cl 470°C

LSPS-Cl 460°C

LSPS-Cl 450°C

LSPS-Cl 400°C

FIG. 30A
FIG. 30B
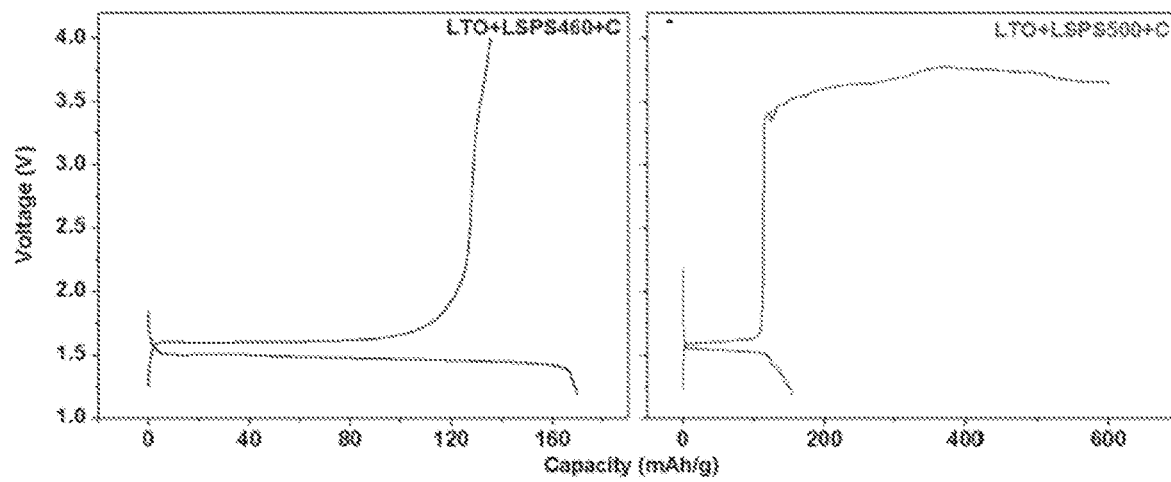
FIG. 30C
FIG. 30D
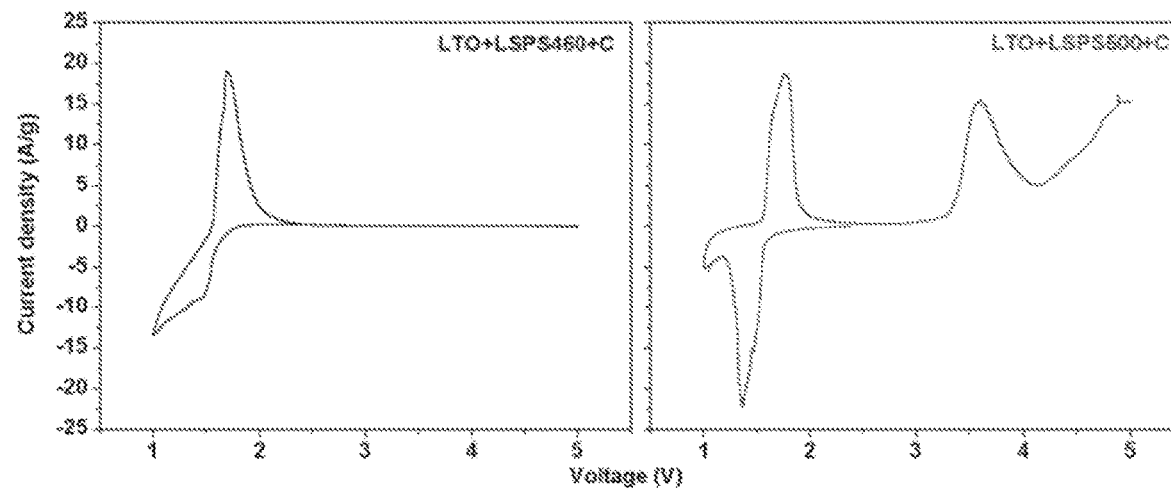

SOLID STATE ELECTROLYTES AND METHODS OF PRODUCTION THEREOF

FIELD OF THE INVENTION

The invention is directed to the field of alkali metal sulfide solid state electrolytes and solid state batteries.

BACKGROUND OF THE INVENTION

The fast development of portable electronic devices and electric vehicles benefits from lithium ion batteries with high power, energy density and safety[1-5]. These applications demand a solid state electrolyte with good chemical compatibility, high Li ion conductivity and a wide electrochemical stability window. Solid state batteries using solid state electrolytes such as polymers[6-8], oxides[9-12] or sulfides[13-16] hold promise for the next generation lithium ion batteries.

High Li ion conductivity has been achieved in various solid state electrolytes. Solid state electrolytes (SSEs), such as $Li_{10}SiP_2S_{12}$ (LSPS) and its doped derivatives, show promise in terms of ion conductivity for use in all solid state batteries[13,16-18]. In fact, LSPS may be more conductive than traditional liquid electrolytes. Future battery technologies may benefit from this feature, which is combined with the improved safety and thermal stability offered by solid state electrolytes.

Despite the promise of sulfide-based SSEs, incompatibility with the lithium chemical potentials of battery electrode materials has inhibited their practical use. Research suggests that LSPS is only stable in the lithium chemical potential region of 1.7-2.1 V versus lithium metal[17-20], while others reported wide voltage windows up to around 4.5 V[13,16,21] or down to the direct contact with lithium metal[21]. At voltages below this stability window, the LSPS will decay by absorbing lithium atoms. An example of such a reaction is given in Equation 1, which is the dominant decay process at 0 V:

$$5Li_{10}SiP_2S_{12}+121Li \rightarrow 5P_2Li_6+Si_5Li_{21}+60SLi_2 \quad (1)$$

In the opposite direction, at voltages above the stability window, LSPS will decay by producing lithium metal. An example of such a reaction is given in Equation 2:

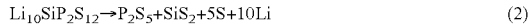

$$Li_{10}SiP_2S_{12} \rightarrow P_2S_5+SiS_2+5S+10Li \quad (2)$$

Thus, there is a need for improved SSEs.

SUMMARY OF THE INVENTION

We have developed a solid state electrolyte having a core-shell morphology for use in a rechargeable battery. The electrolytes disclosed herein are advantageous as they have high voltage stability and excellent battery cycle performance. The invention also provides a design strategy from a predictive formalism to further stabilize solid state electrolytes by microstructure modifications, and more generally by volume constriction or pressurization that can be realized on both materials and battery cell levels.

In one aspect, the invention features a solid state electrolyte containing an alkali metal and a sulfide and having a core-shell morphology, wherein the shell increases the stability of the solid state electrolyte during electrical cycling by reducing expansion of the core.

In certain embodiments, the solid state electrolyte further includes P and Si. In some embodiments, the alkali metal is selected from the group consisting of Li, Na, K, Rb, and Cs, in particular Li. In certain embodiments, the solid state electrolyte further includes a dopant atom incorporated within. For example, the dopant atom is a halogen, in particular Cl. In other embodiments, the dopant atom is a chalcogen, in particular O. In some embodiments, the solid state electrolyte has a core that contains about 65% to about 80% S, about 10% to about 20% P, about 5% to about 15% Si, and about 0% to about 10% Cl. In some embodiments, the solid state electrolyte has a shell that contains about 30% to about 70% S, about 0% to about 5% P, about 25% to about 50% Si, and about 5% to about 20% Cl. In some embodiments, the shell has a Young's modulus of about 1 GPa to about 250 GPa.

In a related aspect, the invention features a method of fabricating a solid state electrolyte by mixing together a S source, a P source, a Si source and an alkali metal salt and annealing the mixture to form a sulfide solid state electrolyte having alkali metal atoms and halogen atoms incorporated therein. The annealing occurs, e.g., under conditions to produce a solid state electrolyte with a core-shell morphology, e.g., having increased stability from a reduction in core expansion during electrical cycling.

In certain embodiments, the alkali metal salt is a source of the alkali metal and the halogen. In some embodiments, the S source is a source of the alkali metal. In some embodiments, the mixture is in the form of a powder. In some embodiments, the annealing temperature is between 400 and 500° C.

In another related aspect, the invention features a rechargeable battery having first and second electrodes and a solid state electrolyte described herein disposed between the first and second electrodes.

In certain embodiments, the first electrode includes lithium titanate (LTO), carbon, and a fluoropolymer, and the second electrode is an alkali metal, in particular lithium. In other embodiments, the second electrode comprises Li metal, e.g., coated with LPS. The battery may further include LSPS, e.g., in the cathode, and LGPS, e.g., as the solid state electrolyte.

In certain embodiments, the battery does not include a liquid electrolyte, e.g., the battery is an all-solid state battery. In other embodiments, the battery further includes a liquid electrolyte. The battery may also include a separator, e.g., glass fiber.

In yet another related aspect, the invention features a solid state electrolyte of the formula $Li_{9.54}Si_{1.74}P_{1.44}S_{11.7}Cl_{0.3}$.

BRIEF DESCRIPTION OF THE DRAWINGS

FIGS. 30A-30D: Battery performance and CV test results of all-solid state batteries using: (A,C) LTO+LSPS460+C as cathode, LGPS as solid electrolytes and LPS-coated lithium foil as anode. (B,D) The same tests for LSPS500. Current rate for battery test is 0.1 C. Sweeping rate for CV test is 0.1 mV/s.

DETAILED DESCRIPTION OF THE INVENTION

Figure 1A:
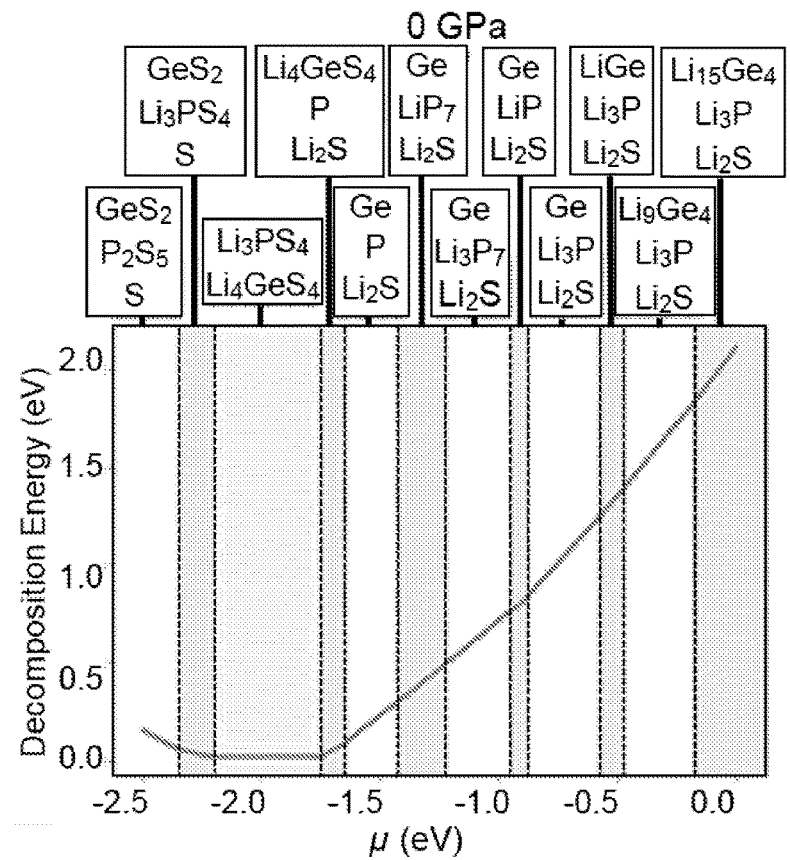
FIGS. 1A-1D: Computationally predicted decomposition energies for the decomposition products of $Li_{10}GeP_2S_{12}$ solid state electrolyte at an applied pressure of (A) 0 GPa, (B) 1 GPa, (C) 10 GPa, and (D) 20 GPa.
Figure 1B:
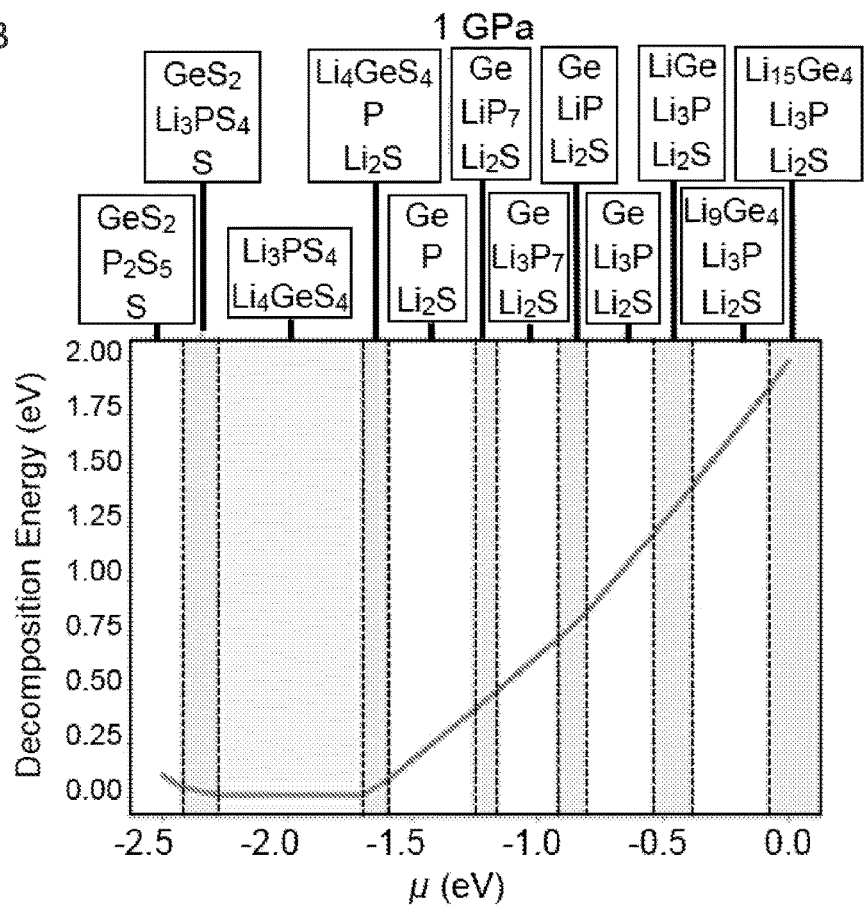
Figure 1C:
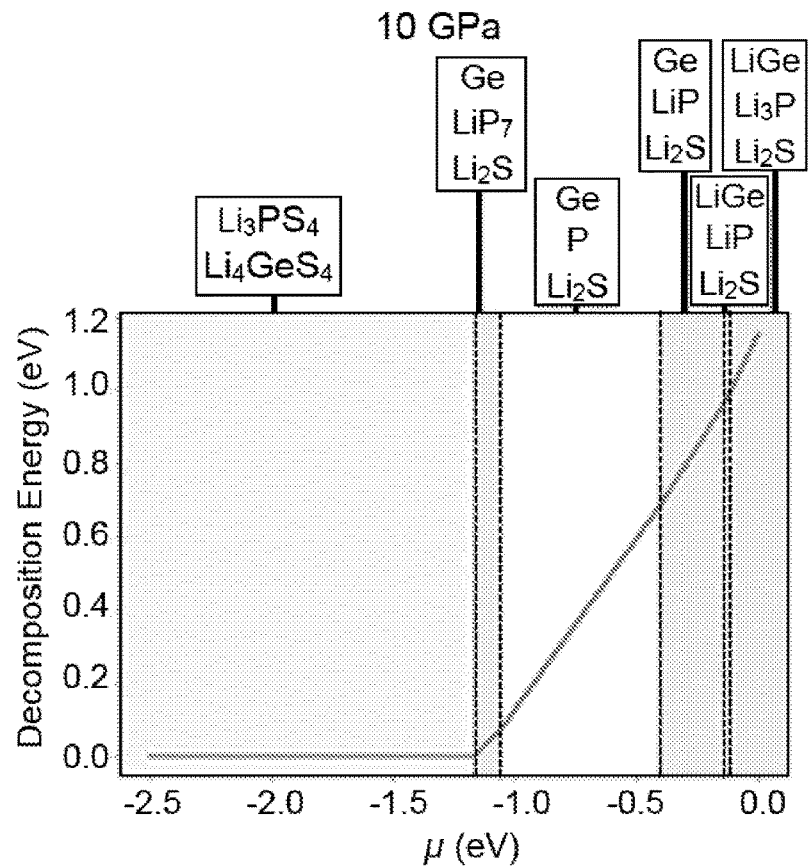
Figure 1D:
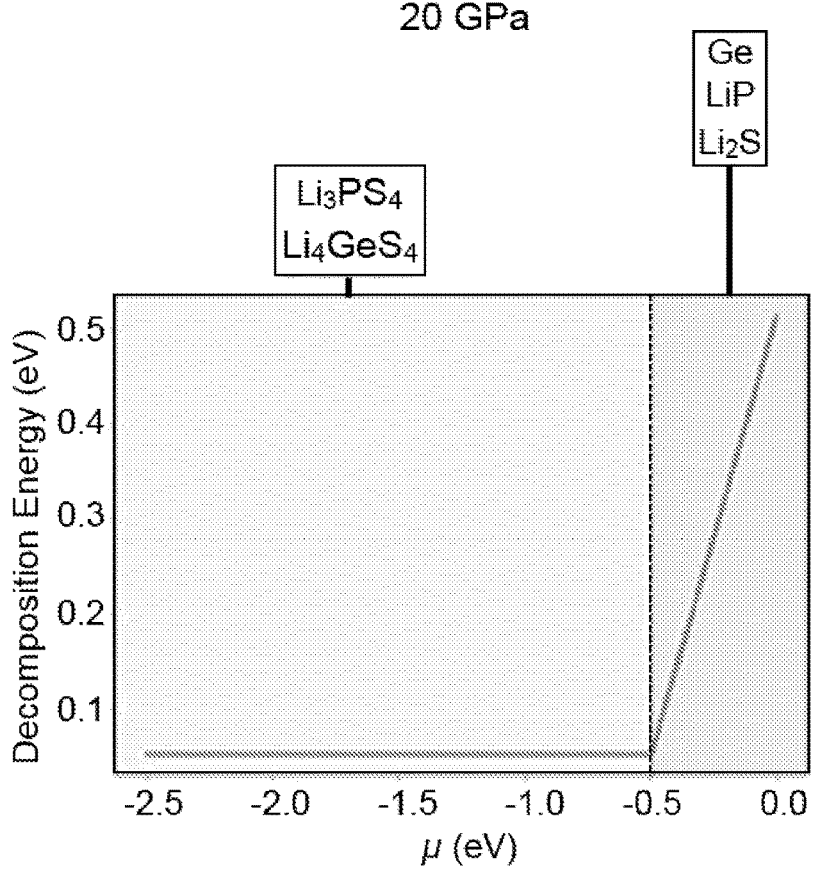

The invention provides compositions containing a solid state electrolyte (SSE) containing an alkali metal and a sulfide for use as the electrolyte matrix in a solid state rechargeable battery. The SSE compositions may further contain phosphorous, silicon, or a dopant atom, such as a halogen. These compositions are advantageous as they use Earth-abundant elements, have high voltage stability, excellent battery cycle performance, and are fabricated and used under conditions that do not require excessive external pressures which would otherwise limit their use in a production battery. In particular, the SSEs have a controllable microstructure, e.g., core-shell structure, that enhances their inherent stability while obviating the need for excessively large pressures to control the electrolyte stability. The shell and core compositions can be controlled by adjusting synthetic parameters. Methods of producing the compositions and rechargeable batteries including the composition are also provided. Alternatively, pressure may be applied to a battery cell to prevent volume changes in a solid state electrolyte.

Regardless of which decay pathway occurs, LSPS will always expand during decay. The volume expanding nature of LSPS allows for a valuable mechanical stabilization method that can significantly expand the stability window. If the LSPS is pressurized, then any volume expansion must exert mechanical work. For any decay to occur, the decay energy must be at least as great as work needed for the volume expansion. If conditions are created such that the work to expand is greater than the decay energy, the decay will not occur, and the stability window will be improved. However, the pressures required for significant improvements in electrolyte stability are out of range of feasibility (10-20 GPa) for use in solid state batteries. We have discovered that the pressures needed to reduce the expansion of the LSPS and therefore expand the stability window can be obtained by careful synthetic control of the microstructure of the LSPS.

Theoretical Underpinnings of Microstructure on Stability

SSEs, e.g., LSPS, will always expand during decay, independent of the decay pathway, and controlling that expansion is critical to enhancing the stability of solid state electrolytes. This expansion can be expressed and understood in terms of a reaction strain, defined to be the relative change in volume accompanying any given decay pathway (Eq. 1, Eq. 2, or any other known decay pathway). Equation 3 puts the reaction strain in terms of the SSE volume and the final volume of the decay products ($V_{DECAY}$):

$$\epsilon_{RXN}(\mu, p) = \frac{V_{DECAY}(\mu, p) - V_{SSE}(p)}{V_{SSE}(p)} \quad (3)$$

Equation 3 shows that the reaction strain varies with both chemical potential ($\mu$) and pressure (p). The chemical potential determines which decay products are included in $V_{DECAY}$. For example, at 0 V versus lithium metal, the decay pathway of Eq. 1 will dominate and the decay volume will consist of the sum of the volumes of $P_2Li_6$, $Si_5L_{21}$, and $SLi_2$ at appropriate stoichiometric ratios. The pressure changes the reaction strain as determined by the compressibility of LSPS and the decay products. In the case of an LSPS SSE at zero pressure (p=0 GPa), the calculated reaction strain varies from 56% at 0 V, then drops to 1.26% in the stability window of 1.7-2.1 V, then increases again to 21.5% above 2.3 V.

The most direct route to increase the work required for a LSPS SSE to decay is to apply a constant pressure. If the solid electrolyte is pressurized, then any volume expansion must exert certain mechanical work. This constant pressure ensemble can be directly calculated via density functional theory (DFT) calculations. The relevant free energy for a lithium open system at constant pressure is:

$$\phi(p, \mu Li) = H(p) - \mu LiNLi \quad (4)$$

where H is the enthalpy of the structure (calculated via DFT) and NLi is the number of lithium atoms in the cell. The free energy $\phi$ is calculated for both the sulfide-based SSE of interest and for all known possible decay products (which are obtained from various material databases). Convex hull methods are then used to determine which compounds are stable at which pressure and chemical potential. Recent experimental evidence has shown that applying large pressures can in fact improve the stability window. Furthermore, recent computational simulations have showed that a directly applied pressure could improve the stability window of sulfide-based SSEs considerably, but is limited in feasibility for battery operation. Here, the same underlying physical mechanism (e.g., the positive reaction strain) can be used in conjunction with a core-shell structure to widen the stability window without the need for unfeasible experimental conditions. Consider, first, the limit of a perfectly rigid shell structure enclosing a particle of sulfide SSE. The effect of the shell on the core, in this perfectly rigid extreme, is that of constant volume constraints. If a portion of the particle decays, and hence expands, it must compress its local environment. In terms of the fraction of decayed and pristine LSPS, this condition can be expressed as Equation 5:

$$x_{DECAY}V_{DECAY}(p) + x_{LSPS}V_{LSPS}(p) = V_{LSPS}(p=0) = V_{CORE} \quad (5)$$

Note that Eq. 5 does not fix the volume of the unit cell of LSPS, but the combined volume of the decayed and pristine LSPS. Physically, equation 5 says that for decay to occur, the core must become sufficiently pressurized so that the post decay volume is equal to the volume of the core.

Considering the onset of SSE decay, where $x_{DECAY} \ll 1$ and hence the internal pressure is low, the decayed and pristine volumes of Eq. 5 can be linearly approximated in terms of the compressibilities ($\beta_{(DECAY,LSPS)}$):

$$(p) = V^0 - V^0 \beta^0 p \quad (6)$$

where the superscript 0 indicates the volume/compressibility at zero pressure. Comparing Eq. 5 and Eq. 6 for the case of $x_{DEC} \ll x_{LSPS}$, Equation 7 can be found which relates the internal pressure to the fraction of decomposed LSPS:

$$p \approx \frac{x_{DEC}(V^0_{DEC} - V^0_{LSPS})}{V_{LGPS}\beta^0_{LSPS}} = x_{DEC}\frac{\epsilon^0_{RXN}}{\beta^0_{LSPS}} \quad (7)$$

Equation 7 represents the fixed volume constraint of equation 5 at the onset of decomposition. For a small amount of decomposition to occur ($x_{DEC}$=0→0+∈), an internal pressure within the core must be created that compresses the neighboring LSPS sufficiently as to make room for the volume expansion associated with the reaction strain.

Given the pressure regime needed to expand the stability window, e.g., reduce the external pressure needed for stability, of solid state electrolyte materials, as shown in FIGS. 1A-1D and Table 1, a theoretical framework was developed in order to calculate the stability windows of more advantageous core-shell electrolyte particles.

TABLE 1

H(p) values for each pressure and solid electrolyte material plotted in FIGS. 1A-1D

| System | H(0GPa)/eV | H(1GPa)/eV | H(10GPa)/eV | H(20GPa)/eV |
|---|---|---|---|---|
| Ge | −4.487796E+00 | −4.338350E+00 | −3.079492E+00 | −1.803821E+00 |
| GeS | −9.148459E+00 | −8.882685E+00 | −6.765160E+00 | −4.691484E+00 |
| GeS$_2$ | −1.369779E+01 | −1.317950E+01 | −9.331516E+00 | −6.359788E+00 |
| Li$_2$S | −1.196982E+01 | −1.168203E+01 | −9.323823E+00 | −7.015825E+00 |
| Li$_3$P | −1.391181E+01 | −1.354894E+01 | −1.057828E+01 | −7.679334E+00 |
| Li$_3$PS$_4$ | −3.509377E+01 | −3.406774E+01 | −2.613501E+01 | −1.958275E+01 |
| Li$_4$GeS$_4$ | −3.818960E+01 | −3.713570E+01 | −2.861505E+01 | −2.036525E+01 |
| Li$_4$P$_2$S$_6$ | −5.372166E+01 | −5.240342E+01 | −4.165673E+01 | −3.110949E+01 |
| Li$_{15}$Ge$_4$ | −5.202579E+01 | −5.012603E+01 | −3.529954E+01 | −2.133391E+01 |
| LGPS | −1.080921E+02 | −1.050711E+02 | −8.132142E+01 | −5.876544E+01 |
| P | −5.378355E+00 | −5.252024E+00 | −4.295360E+00 | −3.397391E+00 |
| S | −4.061113E+00 | −3.889834E+00 | −2.767311E+00 | −1.745577E+00 |
| P$_2$S$_5$ | −3.260306E+01 | −3.135725E+01 | −2.295823E+01 | −1.531866E+01 |
| LiP$_7$ | −4.097063E+01 | −3.990250E+01 | −3.163096E+01 | −2.382346E+01 |
| Li$_3$P$_7$ | −4.721150E+01 | −4.599375E+01 | −3.635586E+01 | −2.774939E+01 |
| LiP | −8.365624E+00 | −8.172500E+00 | −6.580108E+00 | −5.014365E+00 |
| LiGe | −6.956550E+00 | −6.756500E+00 | −5.100235E+00 | −3.458691E+00 |
| Li$_9$Ge$_4$ | −3.962443E+01 | −3.836025E+01 | −2.812853E+01 | −1.824771E+01 |

Calculating the constant volume core-shell stability windows directly via DFT is not possible because the internal pressure and, hence, the unit cell size, is not known a priori. Instead, the constant volume decay conditions are put in terms of the constant pressure decay calculation. For the decay of a particle with a perfectly rigid shell, the decomposition energy is given by Equation 8:

$$\Delta\phi_V(\mu) = x_{LSPS}\phi_{LSPS}(p,\mu) + x_{DEC}\phi_{DEC}(p,\mu) - \phi LSPS(0,\mu) \quad (8)$$

Note that the subscript in $\Delta(\mu)$ is added to distinguish it from the constant pressure decomposition energy $\Delta\phi(p,\mu)$. Rearranging, it is seen that:

$$\Delta\phi_V(\mu) = x_{DEC}(\phi_{LSPS}(p,\mu) - \phi_{LSPS}(p,\mu)) + (\phi_{LSPS}(p,\mu) - \phi_{LSPS}(0,\mu))$$

$$\Delta\phi_V(\mu) = x_{DEC}(\Delta\phi(p,\mu)) + (\phi_{LSPS}(p,\mu) - \phi_{LSPS}(0,\mu))$$

$$\Delta(\mu) \approx \frac{p\beta^0_{LSPS}}{\epsilon^0_{RXN}}(\Delta\phi(p,\mu)) + (\phi_{LSPS}(p,\mu) - \phi_{LSPS}(0,\mu))$$

For this decay to be energetically favorable $\Delta(\mu)<0$, or equivalently (noting that $\Delta\phi(p,\mu)\leq 0$):

$$|\Delta(p,\mu)| > \frac{\epsilon^0_{RXN}}{p\beta^0_{LSPS}}(\phi_{LSPS}(p,\mu) - \phi_{LSPS}(0,\mu)) \quad (9)$$

The conclusion of this inequality is that in order for LSPS to decompose inside of a perfectly rigid shell, the decomposition energy must be sufficiently high to compress the remaining LSPS to accommodate the larger volume decomposed products.

Eq. 9 was derived for the case of a perfectly rigid shell. The adoption of a shell with certain rigidity requires the mechanical work to be done for the decay to proceed. In order to generalize the framework to a shell that is stiff, but elastic, in the low pressure limit, we define an effective compressibility of the shell as Equation 10:

$$\beta_{shell}(p) = -\frac{1}{V_{CORE}(p)} \frac{\partial V_{CORE}(p)}{\partial p} \quad (10)$$

where Eq. 10 represents a metric for the performance of the shell in terms of volume constriction. Note that $\beta_{shell}$ is therefore not the shell's material compressibility, but an effective compressibility of the core-shell structure. It is a function of not only the material properties but also the geometry of the shell, including the curvature and thickness. We show by our theory and simulation that a low effective compressibility provided by the core-shell structure will suppress any solid electrolyte decomposition with large positive reaction strain, a mechanism that can effectively widen the voltage stability window. The amorphous shell with high Si composition falls into this category based on the high Young's modulus reported[22,23] previously. Our work also provides a new design strategy from a predictive formalism to further stabilize the solid state electrolytes by microstructure modification. In this case, the right hand side of Eq. 5 becomes pressure dependent ($V_{CORE} \rightarrow V_{CORE}(p)$) and Eq. 9 becomes:

$$|\Delta(p,\mu)| > \frac{\epsilon_{RXN}^0}{p(\beta_{LSPS}^0 + \beta_{shell}^0)}(\phi_{LSPS}(p,\mu) - \phi_{LSPS}(0,\mu)) \quad (11)$$

The decay conditions for both isobaric (no shell) and isovolumetric (ideal shell) can be recovered by taking the shell compressibility to infinity or zero, respectively. In practice, we expect a macroscopic SSE material to contain particles with a distribution of $\beta_{shell}$. Defining the effective bulk modulus $K_{eff} = (\beta_{SE} + \beta_{shell})^{-1}$ and noting that $V = \partial_p \phi(p, \mu)$, the inequality of Equations 9 and 11 becomes a familiar stress-strain type relation:

$$\frac{|\Delta\phi(p\mu)|}{V} > K_{eff} \epsilon_{RXN} \quad (12)$$

It should be noted that the shell serves as a pressure vessel for the SSE core. As such, the effective compressibility of shell is a complicated function of the shell mechanical properties, thickness, curvature, core volume, etc. In general, however, shell structures with high moduli, such as amorphous silicon, are best.

Our experiments and computations using the theoretical model presented herein agree that while solid state electrolytes, e.g., LSPS, may have narrow stability windows, microstructured materials, namely core-shell structures in this particular case, show significantly improved electrical cycling performance. These results suggest a new direction for solid state battery development and that for such core-shell microstructures, three overarching conditions significantly increase the stability of solid electrolytes.

1. The effective compressibility of the shell must be low. The ideal shell structure would be completely rigid ($\beta$ shell=0), which forces any decomposition to exert work on the neighboring solid electrolytes, leading to an increased threshold for the decomposition energy.
2. The compressibility of the pristine sulfide must be low. By making the pristine solid electrolyte more rigid, it requires more work to be compressed.
3. Reaction strains should be maximized. $\epsilon_{RXN}$ indicates how much of the neighboring solid electrolytes must be compressed for decomposition to occur, multiplying the effects of condition 2.

Conditions 2 and 3 are intrinsic to the solid electrolytes, whereas condition 1 is dependent on the microstructure and composition of the shell.

Compositions

A composition of the invention includes a solid electrolyte material and an alkali metal atom incorporated within the solid electrolyte material. In particular, compositions of the invention have a core-shell morphology, with the core and shell typically having different atomic compositions. The compositions may also include smaller particles within the shell.

Suitable solid state electrolyte materials include sulfide solid electrolytes, e.g., $Si_xP_yS_z$, e.g., $SiP_2S_{12}$, or $\beta/\gamma$-$PS_4$. Other solid state electrolytes include, but are not limited to, germanium solid electrolytes, e.g., $Ge_aP_bS_c$, e.g., $GeP_2S_{12}$, tin solid electrolytes, e.g., $Sn_dP_eS_f$, e.g., $SnP_2S_{12}$, iodine solid electrolytes, e.g., $P_2S_8I$ crystals, glass electrolytes, e.g., alkali metal-sulfide-$P_2S_5$ electrolytes or alkali metal-sulfide-$P_2S_5$-alkali metal-halide electrolytes, or glass-ceramic electrolytes, e.g., alkali metal-$P_gS_{h-i}$ electrolytes. Other solid state electrolyte materials are known in the art. The solid state electrolyte material may be in various forms, such as a powder, particle, or solid sheet. An exemplary form is a powder.

Alkali metals useful for the compositions include Li, Na, K, Rb, and Cs, e.g., Li. Examples of Li-containing solid electrolytes include, but are not limited to, lithium glasses, e.g., $xLi_2S\cdot(1-x)P_2S_5$, e.g., $2Li_2S\cdot P_2S_5$, and $xLi_2S\cdot(1-x)P_2S_5$—LiI, and lithium glass-ceramic electrolytes, e.g., $Li_7P_3S_{11-z}$.

The composition may also include dopant atoms, for example, halogen atoms, such as F, Cl, Br, and I, or chalcogen atoms, such as O. An exemplary halogen dopant is Cl.

Figure 2:
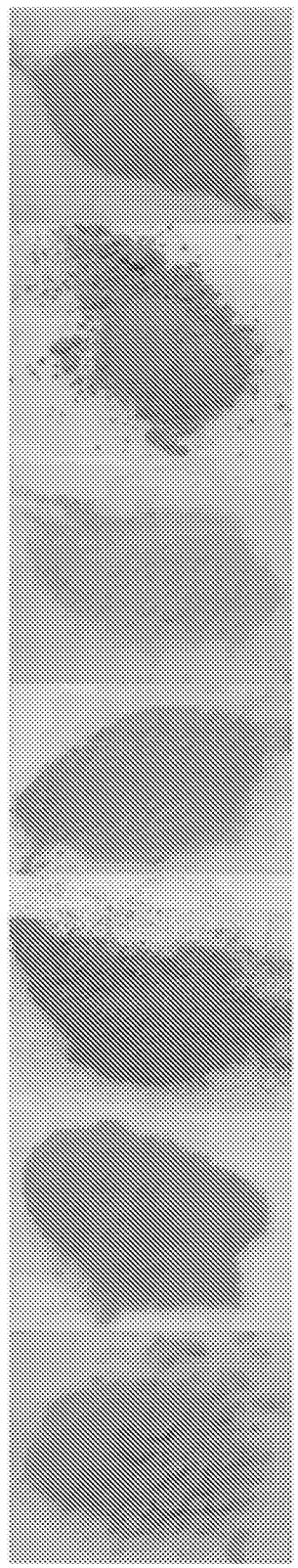
FIG. 2: Representative images of compositions of the invention annealed at temperatures ranging from 400° C. to 500° C.

FIG. 2 shows representative images of exemplary powdered solid electrolyte materials made from a SPS (S, P, Si) base material, Li as the alkali metal, and Cl as a halogen dopant across a range of annealing/sintering temperatures.

The relative atomic amount of Li in the compositions may be from about 8 to about 12, e.g., from about 8 to about 9.5, from about 8.5 to about 10, from about 9 to about 10.5, from about 9.5 to about 11, from about 10 to about 11.5, or from about 10.5 to about 12, e.g., about 8, about 8.1, about 8.2, about 8.3, about 8.4, about 8.5, about 8.6, about 8.7, about 8.8, about 8.9, about 9, about 9.1, about 9.2, about 9.3, about 9.4, about 9.5, about 9.6, about 9.7, about 9.8, about 9.9, about 10, about 10.1, about 10.2, about 10.3, about 10.4, about 10.5, about 10.6, about 10.7, about 10.8, about 10.9, about 11, about 11.1, about 11.2, about 11.3, about 11.4, about 11.5, about 11.6, about 11.7, about 11.8, about 11.9, or about 12. The relative atomic amount of Si in the compositions may be from about 0 to about 4, e.g., from about 0 to about 1.5, from about 0.5 to about 2, from about 1 to about 2.5, from about 1.5 to about 3, from about 2 to about 3.5, or from about 2.5 to about 4, e.g., about 0, about 0.1, about 0.2, about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9, about 2, about 2.1, about 2.2, about 2.3, about 2.4, about 2.5, about 2.6, about 2.7, about 2.8, about 2.9, about 3, about 3.1, about 3.2, about 3.3, about 3.4, about 3.5, about 3.6, about 3.7, about 3.8, about 3.9, or about 4. The relative atomic amount of P in the compositions may be from about 0 to about 4, e.g., from about 0 to about 1.5, from about 0.5 to about 2, from about 1 to about 2.5, from about 1.5 to about 3, from about 2 to about 3.5, or from about 2.5 to about 4, e.g., about 0, about 0.1, about 0.2, about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9, about 2, about 2.1, about 2.2, about 2.3, about 2.4, about 2.5, about 2.6, about 2.7, about 2.8, about 2.9, about 3, about 3.1, about 3.2, about 3.3, about 3.4, about 3.5, about 3.6, about 3.7, about 3.8, about 3.9, or about 4. The relative atomic amount of S in the compositions may be from about 10 to about 14, e.g., from about 10 to about 11.5, from about 10.5 to about 12, from about 11 to about 12.5, from about 11.5 to about 13, from about 12 to about 13.5, or from about 12.5 to about 14, e.g., about 10, about 10.1, about 10.2, about 10.3, about 10.4, about 10.5, about 10.6, about 10.7, about 10.8, about 10.9, about 11, about 11.1, about 11.2, about 11.3, about 11.4, about 11.5, about 11.6, about 11.7, about 11.8, about 11.9, about 12, about 12.1, about 12.2, about 12.3, about 12.4, about 12.5, about 12.6, about 12.7, about 12.8, about 12.9, about 13, about 13.1, about 13.2, about 13.3, about 13.4, about 13.5, about 13.6, about 13.7, about 13.8, about 13.9, or about 14. An exemplary SSE composition of the invention has the molecular formula $Li_{9.54}Si_{1.74}P_{1.44}S_{11.7}$.

When germanium is a part of a composition of the invention, the relative atomic amount of Ge in the compositions may be from about 0 to about 4, e.g., from about 0 to about 1.5, from about 0.5 to about 2, from about 1 to about 2.5, from about 1.5 to about 3, from about 2 to about 3.5, or from about 2.5 to about 4, e.g., about 0, about 0.1, about 0.2, about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9, about 2, about 2.1, about 2.2, about 2.3, about 2.4, about 2.5, about 2.6, about 2.7, about 2.8, about 2.9, about 3, about 3.1, about 3.2, about 3.3, about 3.4, about 3.5, about 3.6, about 3.7, about 3.8, about 3.9, or about 4. An exemplary SSE composition of the invention containing germanium has the molecular formula $Li_{10}GeP_2S_{12}$.

When a halogen, e.g., Cl, dopant is present, it may be in a molar amount from about 0 to about 2, e.g., from about 0 to about 0.2, from about 0.1 to about 0.3, from about 0.2 to about 0.4, from about 0.3 to about 0.5, from about 0.4 to about 0.6, from about 0.5 to about 0.7, from about 0.6 to about 0.8, from about 0.7 to about 0.9, from about 0.8 to about 1, from about 0.9 to about 1.1, from about 1 to about 1.2, from about 1.1 to about 1.3, from about 1.2 to about 1.4, from about 1.3 to about 1.5, from about 1.4 to about 1.6, from about 1.5 to about 1.7, from about 1.6 to about 1.8, from about 1.7 to about 1.9, or from about 1.8 to about 2, e.g., about 0, about 0.1, about 0.2, about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9, or about 2. An exemplary SSE composition of the invention that includes Cl as a halogen dopant has the molecular formula $Li_{9.54}Si_{1.74}P_{1.44}S_{11.7}Cl_{0.3}$.

When a chalcogen, e.g., O, dopant is present, it may be in a molar amount from about 0 to about 1, e.g., from about 0 to about 0.2, from about 0.1 to about 0.3, from about 0.2 to about 0.4, from about 0.3 to about 0.5, from about 0.4 to about 0.6, from about 0.5 to about 0.7, from about 0.6 to about 0.8, from about 0.7 to about 0.9, from about 0.8 to about 1, from about 0.9 to about 1.1, from about 1 to about 1.2, from about 1.1 to about 1.3, from about 1.2 to about 1.4, from about 1.3 to about 1.5, from about 1.4 to about 1.6, from about 1.5 to about 1.7, from about 1.6 to about 1.8, from about 1.7 to about 1.9, or from about 1.8 to about 2, e.g., about 0, about 0.1, about 0.2, about 0.3, about 0.4, about 0.5, about 0.6, about 0.7, about 0.8, about 0.9, about 1, about 1.1, about 1.2, about 1.3, about 1.4, about 1.5, about 1.6, about 1.7, about 1.8, about 1.9, or about 2.

The sintering temperature may be used to determine the overall atomic content of solid state electrolytes of the invention, as well as the partitioning of the composition in the core and the shell. Across a broad range of sintering temperatures, the core of the solid state electrolytes is primarily sulfur, with varying levels of silicon, phosphorus, and optional dopant atoms. The composition of the shell, unlike the core, depends on temperature. At lower sintering temperatures, the shell is primarily silicon. Increasing temperature results in a continuously decreasing silicon concentration and increasing sulfur concentration in the shell.

The percentage (atomic composition) of S in the core of the SSE compositions of the invention may be from about 60% to about 80%, e.g., about 60% to about 70%, about 65% to about 75%, or about 70% to about 80%, e.g., about 65% to about 80%, e.g., about 65%, about 66%, about 67%, about 68%, about 69%, about 70%, about 71%, about 72%, about 73%, about 74%, about 75%, about 76%, about 77%, about 78%, about 79%, or about 80%. The percentage (atomic composition) of P in the core of the SSE compositions of the invention may be from about 5% to about 20%, e.g., about 5% to about 15% or about 10% to about 20%, e.g., about 5%, about 6%, about 7%, about 8%, about 9%, about 10%, about 11%, about 12%, about 13%, about 14%, about 15%, about 16%, about 17%, about 18%, about 19%, or about 20%. The percentage (atomic composition) of Si in the core of the SSE compositions of the invention may be from about 5% to about 25%, e.g., about 5% to about 15%, about 10% to about 20%, or about 15% to about 25%, e.g., about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25%.

When a halogen, e.g., Cl, dopant is present, the percentage (atomic composition) of halogen dopant in the core of the SSE compositions of the invention may be about 0% to about 10%, e.g., from about 0% to about 3%, from about 1% to about 4%, from about 2% to about 5%, from about 3% to about 6%, from about 4% to about 7%, from about 5% to about 8%, from about 6% to about 9%, or from about 7% to about 10%, e.g., about 0%, about 1%, about 2%, about 3%, about 4%, about 5%, about 6%, about 7%, about 8%, about 9%, or about 10%.

The percentage (atomic composition) of S in the shell of the SSE compositions of the invention may be from about 30% to about 90%, e.g., about 30% to about 70%, about 30% to about 50%, about 40% to about 60%, about 50% to about 70%, about 60% to about 80%, or about 70% to about 90%, e.g., about 30% to about 70%, e.g., about 30%, about 35%, about 40%, about 45%, about 50%, about 55%, about 60%, about 65%, about 70%, about 75%, about 80%, about 85%, or about 90%. The percentage (atomic composition) of P in the shell of the SSE compositions of the invention may be from about 0% to about 25%, e.g., about 0% to about 5%, about 0% to about 10%, about 5% to about 15%, about 10% to about 20%, or about 15% to about 25%, e.g., about 0%, about 1%, about 2%, about 3%, about 5%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25%. The percentage (atomic composition) of Si in the shell of the SSE compositions of the invention may be from about 5% to about 50%, e.g., about 5% to about 15%, about 10% to about 20%, about 15% to about 25%, about 20% to about 30%, about 25% to about 35%, about 30% to about 40%, about 35% to about 40%, or about 40% to about 50%, e.g., about 15% to about 45% or about 25% to about 50%, e.g., about 5%, about 6%, about 7%, about 8%, about 9%, about 10%, about 15%, about 20%, about 25%, about 30%, about 35%, about 40%, about 45%, or about 50%.

When a dopant, e.g., Cl, is present, the percentage (atomic composition) of dopant in the shell of the SSE compositions of the invention may be about 0% to about 25%, e.g., about 5% to about 25% or about 8% to about 20%, e.g., about 5%, about 6%, about 7%, about 8%, about 9%, about 10%, about 11%, about 12%, about 13%, about 14%, about 15%, about 16%, about 17%, about 18%, about 19%, or about 20%. The percentage (atomic composition) of dopant in the core of the SSE compositions of the invention may be about 0% to about 10%, e.g., about 1% to about 8% or about 3% to about 6%, e.g., about 1%, about 2%, about 3%, about 4%, about 5%, about 6%, about 7%, about 8%, about 9%, or about 10%.

For example, in a SSE composition of the invention ($Li_{9.54}Si_{1.74}P_{1.44}S_{11.7}Cl_{0.3}$) sintered at 450° C., the core of the composition is about 74% S, about 13% P, about 10% Si, and about 3% Cl. The shell of the 450° C. sintered composition is about 38% S, about 0% P, about 42% Si, about 20% Cl. In contrast, a SSE composition of the invention ($Li_{9.54}Si_{1.74}P_{1.44}S_{11.7}Cl_{0.3}$) sintered at 500° C. has a core composition of about 75% S, about 8% P, about 18% Si, and about 1% Cl with a shell that is 80% S, about 15% P, about 5% Si, and about 0% Cl.

In certain embodiments, the shell is rigid, e.g., having a high Young's modulus, such that the expansion of the composition is controlled during electrical cycling. The Young's modulus of the shell of the SSE compositions of the invention will vary based on the Si content. Without wishing to be bound to a particular theory, a lower content of Si in the shell will lead to a lower Young's modulus, e.g., higher compressibility. The Young's modulus of a shell of the SSE compositions of the invention may be from about 1 GPa to about 250 GPa, e.g., about 1 GPa to about 20 GPa, about 10 GPa to about 30 GPa, about 20 GPa to about 40 GPa, about 30 GPa to about 50 GPa, about 40 GPa to about 60 GPa, about 50 GPa to about 100 GPa, about 75 GPa to about 125 GPa, about 100 GPa to about 150 GPa, about 125 GPa to about 175 GPa, about 150 GPa to about 200 GPa, about 175 GPa to about 225 GPa, or about 200 to about 250 GPa, e.g., about 1 GPa, about 2 GPa, about 3 GPa, about 4 GPa, about 5 GPa, about 6 GPa, about 7 GPa, about 8 GPa, about 9 GPa, about 10 GPa, about 20 GPa, about 30 GPa, about 40 GPa, about 50 GPa, about 60 GPa, about 70 GPa, about 80 GPa, about 90 GPa, about 100 GPa, about 110 GPa, about 120 GPa, about 130 GPa, about 140 GPa, about 150 GPa, about 160 GPa, about 170 GPa, about 180 GPa, about 190 GPa, about 200 GPa, about 210 GPa, about 220 GPa, about 230 GPa, about 240 GPa, or about 250 GPa.

Methods of Production

The invention features a method of fabricating a solid state electrolyte. The method involves mixing a sulfur source, a phosphorous source, a silicon source, an alkali metal salt, and optionally a dopant. The mixture is then annealed to produce a solid state electrolyte having an alkali metal atom and optional dopant atoms incorporated within under conditions that produce a core-shell morphology.

The sources of the solid state electrolyte materials can include minerals and inorganic compounds. Examples of sulfur-containing sources for solid electrolytes include sulfide minerals (e.g., a phosphorous sulfide ($P_xS_y$)) and sulfur salts. The sources of phosphorous can be phosphorous salts, e.g., alkali or alkaline earth metal phosphates. Alternatively or additionally, the source of phosphorus may also be the source of sulfur in the electrolyte (e.g., $P_2S_5$ or $P_4S_{10}$). An exemplary source of both phosphorous and sulfur is $P_2S_5$. The sources of silicon can be silicon salts, e.g., a silicon halide, or an alkali or alkaline earth silicide, such as NaSi. Alternatively or additionally, the source of silicon may also be the source of sulfur in the electrolyte (e.g., $SiS_2$). Other sources for sulfur, phosphorous, and silicon are known in the art.

Suitable alkali metal salts for incorporation within the solid electrolyte material generally include salts of any counterion (e.g., $Cl^-$, $NO_3^-$, or $SO_4^{2-}$). An exemplary alkali metal salt is LiCl. Alternatively or additionally, the source of the alkali metal may also be the source of one of the components of the solid electrolyte. For example, the alkali metal source may be an alkali metal sulfide, e.g., $Li_2S$.

The source of the dopant halogen atom can be one of the solid electrolyte or alkali metal source materials, such as halide salts, or can be a separate material. Other sources for dopant atoms are known in the art.

To form the solid state electrolyte from the mixture, the mixture is heated using methods known in the art. The temperatures used to form the solid state electrolyte may be from about 350° C. to about 550° C. (e.g., about 350° C. to about 480° C., about 350° C. to about 540° C., about 360° C. to about 530° C., about 370° C. to about 520° C., about 380° C. to about 510° C., about 390° C. to about 510° C., about 400° C. to about 475° C., about 405° C. to about 470° C., about 410° C. to about 470° C., about 400° C. to about 420° C., about 410° C. to about 430° C., about 420° C. to about 440° C., about 430° C. to about 440° C., about 440° C. to about 460° C., about 450° C. to about 470° C., or about 460° C. to about 480° C., e.g., about 400° C., about 410° C., about 420° C., about 430° C., about 440° C., about 450° C., about 460° C., about 470° C., about 480° C., about 490° C., about 500° C., about 510° C., about 520° C., about 530° C., about 540° C., or about 550° C.). The heating process can be done in the presence of air, an inert gas (e.g., $N_2$ or Ar), or under vacuum. The resulting solid state electrolyte is then cooled back to room temperature using methods known in the art. The annealing may be performed in a sealed vessel.

Rechargeable Batteries

The invention further includes a rechargeable battery including a solid state electrolyte.

Electrode Materials

Electrode materials can be chosen to have optimum properties for ion transport. Electrodes for use in a solid state electrolyte battery include metals, e.g., transition metals, e.g., Au, alkali metals, e.g., Li, or crystalline compounds, e.g., lithium titanate. Other materials for use as electrodes in solid state electrolyte batteries are known in the art. The electrodes may be a solid piece of the material, or alternatively, may be deposited on an appropriate substrate, e.g., a fluoropolymer or carbon. For example, liquefied polytetrafluoroethylene (PTFE) has been used as the binder when making solutions of electrode materials for deposition onto a substrate. Other binders are known in the art. The electrode material can be used without any additives. Alternatively, the electrode material may have additives to enhance its physical and/or ion conducting properties. For example, the electrode materials may have an additive that modifies the surface area exposed to the solid electrolyte, such as carbon. Other additives are known in the art.

In one embodiment of the invention, the first electrode, e.g., the cathode, is lithium titanate, PFTE, and carbon, and the second electrode, e.g., the anode, is a Li foil.

EXAMPLES

Example 1—Calculating the Stability of Core-Shell Electrolyte Powders Using DFT

Figure 3A:
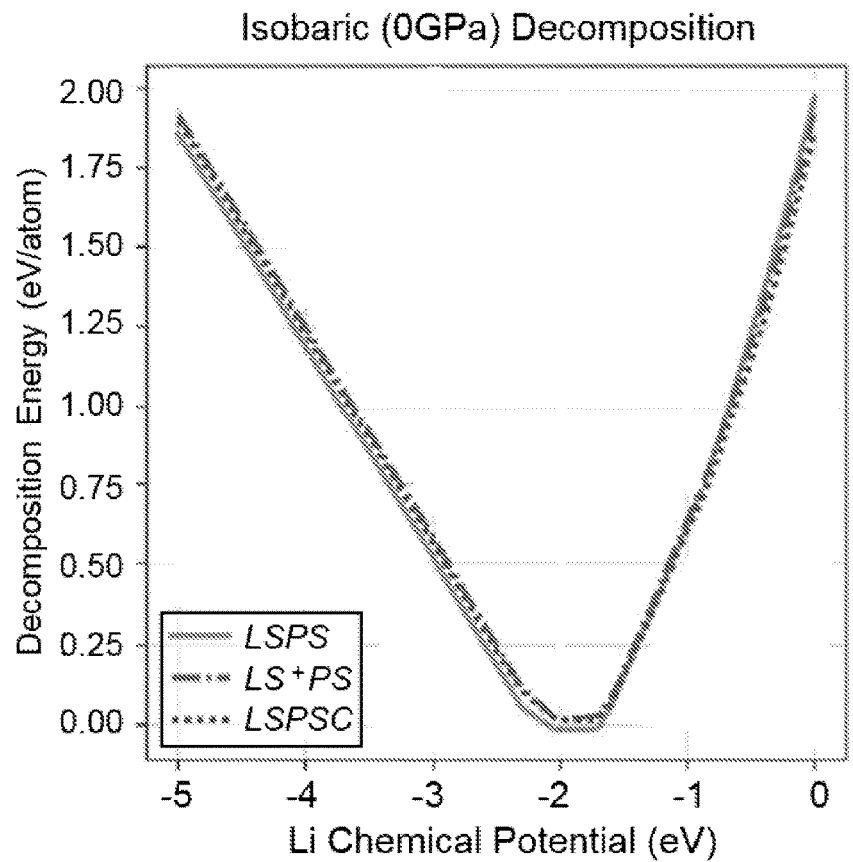
FIGS. 3A-3D: (A) Zero-pressure decomposition energy for $Li_{10}SiP_2S_{12}$ (LSPS), $Li_{10}Si_{1.5}P_{1.5}S_{11.5}Cl_{0.5}$ (LSPSC), and $Li_{10}Si_{1.5}P_{1.5}S_{12}$ (LS+PS). (B) Stability windows for LSPS, LSPSC, and LS+PS as a function of shell effective compressibility. The zero limit of $\beta_{shell}$ (left extreme of x axis) corresponds to a perfectly rigid shell (isovolumetric decay). $\beta_{shell} \gg \beta_{core}$ (right extreme of x axis) corresponds to no shell (isobaric decay). (C) Stability window for LSPS at different packing fractions. (D) The stability voltage window of Li-doped germanium-phosphorous-sulfur (LGPS) as a function of pressure. LGPS is chosen here for calculation because the free energy Φ for all possible decay products of LGPS can be obtained from various material databases.
Figure 3B:
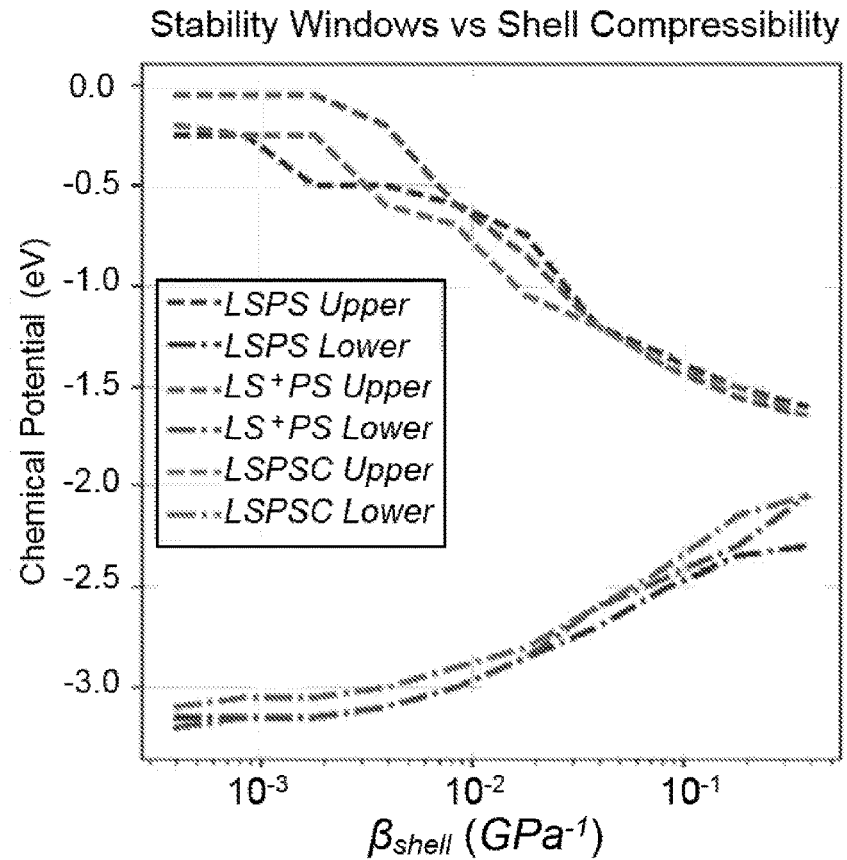

Our DFT simulation and further analyses based on the formalism described herein shows that LSPS decay remains largely unchanged with doping and initial composition in a zero-pressure environment. This suggests a narrow voltage stability window similar to the related solid state electrolyte, Li-doped germanium-phosphorous-sulfur (LGPS) at zero pressure[19,20] (FIG. 3A). The application of a shell with certain rigidity greatly improves the stability window (FIG. 3B). Additionally, Equation 1 underestimates the reaction strain as the decay converts a single crystal solid electrolyte to a polycrystalline mixture. In the latter case, perfect packing is unlikely. If the decay products have a packing efficiency of η, then the reaction strain would be given by equation 12:

$$\epsilon_{RXN} = \frac{V_d \eta^{-1} - V_{SE}}{V_{SE}} \quad (12)$$

Figure 3C:
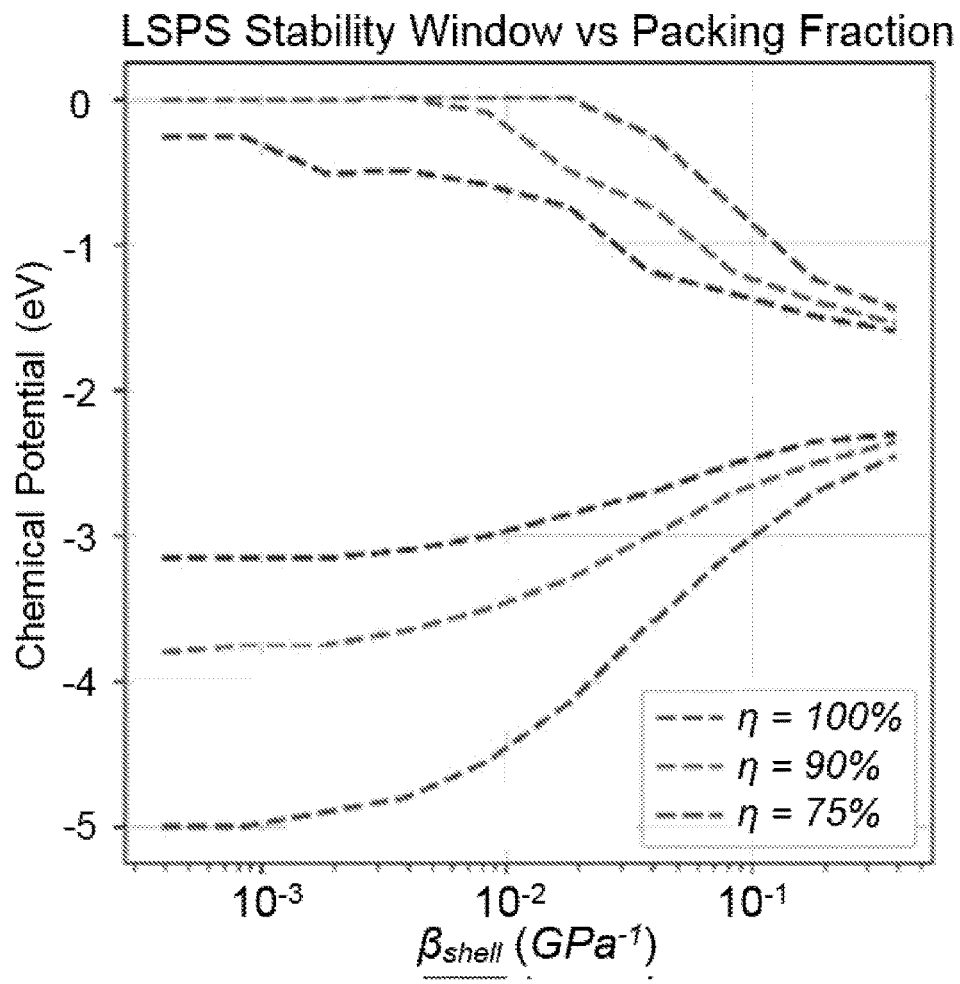
Figure 3D:
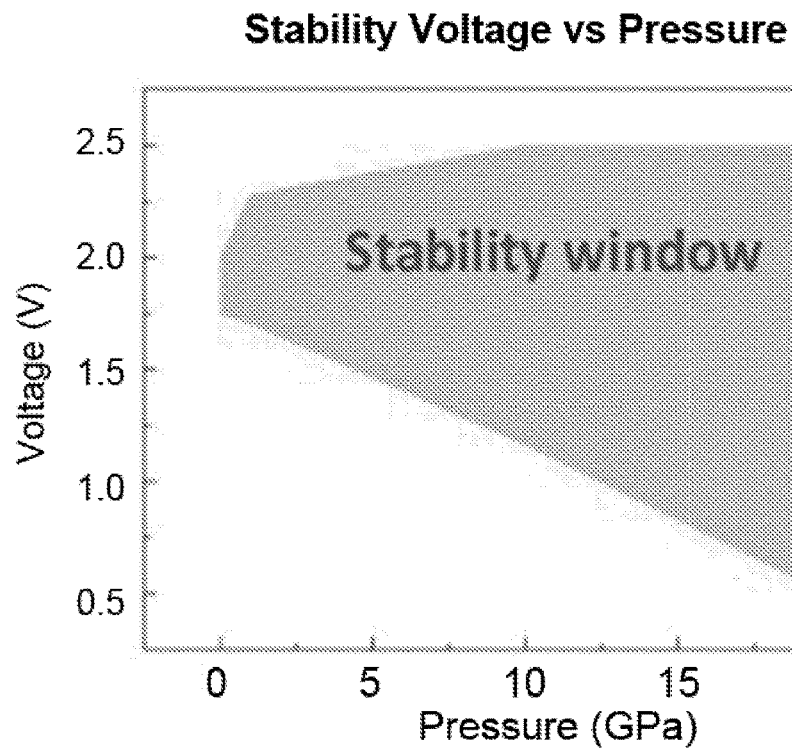

FIG. 3C illustrates the significant potential impact of such a packing efficiency increases the voltage stability window, suggesting the additional importance of different decay processes within the rigid shell picture. FIG. 3D shows the overall calculated voltage stability window of LGPS over the full pressure range of 0-20 GPa.

Density Functional Theory Calculations:

In order to allow comparability with the Material Project crystal database, all DFT calculations were performed using the Material Project criteria[25]. All calculations were performed in VASP using the recommended Projector Augmented Wave (PAW) pseudopotentials. An energy cutoff of 520 eV with k-point mesh of 1000/atom was used. Compressibility values were found by discretely evaluating the average compressibility of the material between 0 GPa and 1 GPa.

Pre/Post-Process Calculations:

The Python Materials Genomics (pymatgen) library was used for pre/post-processing of high-throughput calculations[26]. In particular, the energy above hull modules were used to calculate the convex hull for each elemental system. Pymatgen was used in conjunction with the Materials Project API[27] for accessing the Materials Project crystal database's Materials Explorer[28]. Biaxial moduli were calculated from the Poisson's ratio and $K_{VRH}$ approximation of the bulk modulus.

Example 2—Synthesis of Chloride Doped Li Ion Sulfide-Based Solid State Electrolytes The starting materials used for the synthesis of $Li_{9.54}Si_{1.74}P_{1.44}S_{11.7}Cl_{0.3}$ solid state electrolyte were $Li_2S$ (>99.9% purity, Alfa Aesar), $P_2S_5$ (>99% purity, Sigma Aldrich), $SiS_2$ (>99% purity, American Elements) and LiCl (>99% purity, Alfa Aesar). All of the reagents were weighed in the appropriate molar ratio and then placed into a $ZrO_2$ ball-mill jar containing $ZrO_2$ milling balls. All of the procedures were conducted under an argon atmosphere inside a glove box. The mixture was then mechanically milled using a planetary ball milling facility for 40 h. Following the ball milling procedure, the mixture was sealed into glass tubes and then heated at 400° C., 450° C., 460° C., 470° C., 480° C., 490° C., and 500° C., respectively, for 8 h, followed by a slow cooling procedure back to room temperature.

Example 3—XRD Characterization of Different Sulfide-Based Solid State Electrolytes $Li_{9.54}Si_{1.74}P_{1.44}S_{11.7}Cl_{0.3}$ powders (LSPS-Cl) were synthesized at 7 different annealing temperatures ranging from 400° C. to 500° C. The colors of the as-synthesized LSPS-Cl powders shown in FIG. 2 change along with the annealing temperature from 400° C. to 500° C. For example, LSPS-Cl annealed at 450° C. shows a red color, while the LSPS-Cl annealed at 400° C. has a white color. Despite the different colors, all of the as-synthesized LSPS-Cl powders annealed at various temperatures were confirmed to belong to the same space group, $P4_{2/nmc}(137)$, by X-ray diffraction (XRD). XRD data were obtained using a Rigaku Miniflex 6G with a Cu target X-ray source (wavelength=1.54056 Å). The various LSPS-Cl powders were placed onto standard XRD sample holders and sealed with Kapton film and vacuum grease under an argon atmosphere in a glove box. Structural parameters were refined in the Topas software using the Rietveld refinement technique. TEM samples were prepared by dropping the as synthesized powder directly to the TEM copper grid, sealed inside the airtight bottles in the glovebox and opened immediately before loading into the TEM column with an air exposure of less than 30 seconds. A Gatan vacuum transfer TEM sample holder was used to double check, which confirmed the same results. A JEOL 2010F was used for TEM and STEM-EDS characterization on multiple particles for each LSPS-Cl sample, and the average composition values of the obtained data were statistically analyzed.

Figure 4:
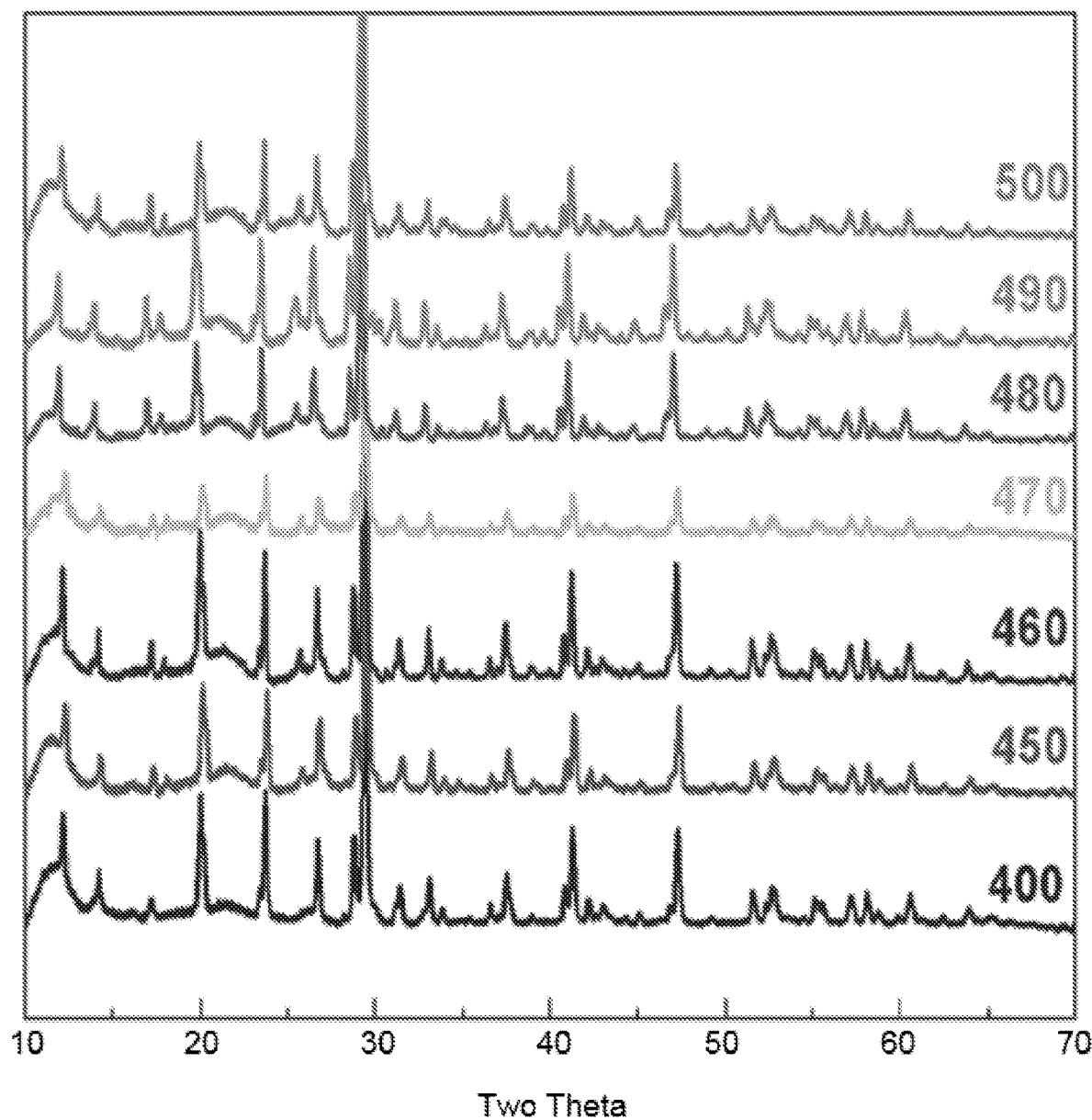
FIG. 4: XRD θ-2θ patterns of LSPS-Cl powders annealed at different temperatures ranging from 400° C. to 500° C.
Figure 5:
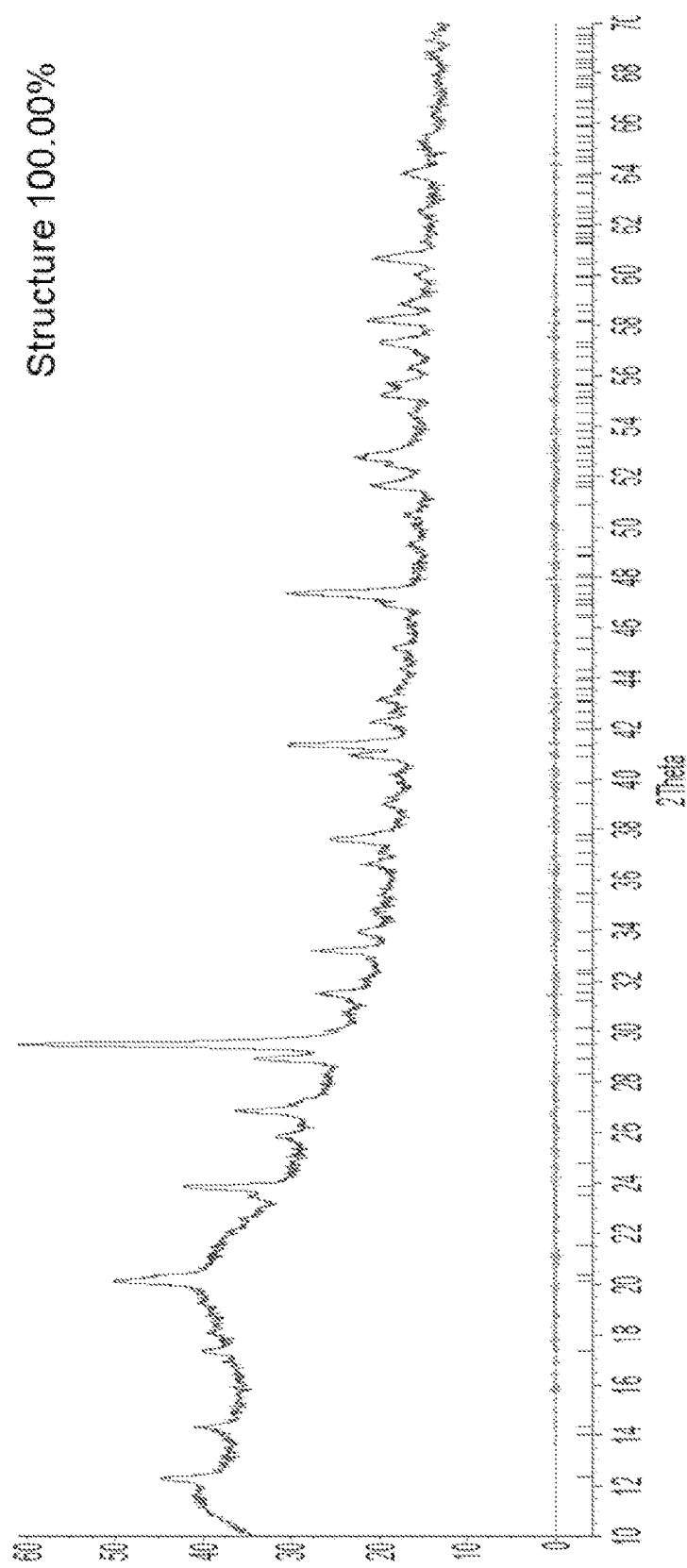
FIG. 5: Rietveld refinement of $Li_{9.54}Si_{1.74}P_{1.44}S_{11.7}Cl_{0.3}$ (LSPS-Cl) 450. The spectrum is the overlay of the measured X-ray diffraction data obtained at room temperature and the simulated pattern calculated by the Rietveld refinement technique. The lower line is the difference plot, and vertical markers indicate the positions of the diffraction lines of LSPS-Cl phase. The calculated lattice parameters (a and c) from Rietveld refinement technique are shown in the inset. The same refinement and processing procedures were applied to all 7 LSPS-Cl samples. The refinement results for LSPS-Cl 450 are shown here as a demonstration.

FIG. 4 presents the XRD θ-2θ patterns and FIG. 5 and Tables 2 and 3 present the neutron Rietveld Refinement XRD spectra and parameters derived from the temperature dependent spectra of FIG. 4 showing show the same crystal structure and the difference among their lattice parameters.

TABLE 2

Lattice and Rietveld Refinement parameters derived from XRD θ-2θ patterns of LSPS-Cl samples annealed at different temperatures

| Sample | a | c | Structure | $R_{wp}$ | $P_{exp}$ | Goodness of Fit |
|---|---|---|---|---|---|---|
| LSPS 400 | 8.714 | 12.607 | Tetragonal | 2.18542951 | 2.34628823 | 0.93144119 |
| LSPS 450 | 8.724 | 12.602 | $P4_{2/mnc}(137)$ | 2.05154496 | 2.23155231 | 0.91933536 |
| LSPS 460 | 8.716 | 12.611 | | 2.07335730 | 2.27905751 | 0.90974329 |
| LSPS 470 | 8.710 | 12.604 | | 1.92898048 | 2.09975377 | 0.91866985 |
| LSPS 480 | 8.707 | 12.601 | | 2.19724275 | 2.37448747 | 0.92535453 |
| LSPS 500 | 8.711 | 12.577 | | 2.19056407 | 2.29533667 | 0.95435414 |

TABLE 3

Atom positions inside LSPS-Cl 450 crystal lattice calculated from Rietveld refinement. The same refinement and processing procedure are applied to all seven LSPS-Cl samples

| Site | Np | x | Y | z | Atom | Occ. | Beq. | Site |
|---|---|---|---|---|---|---|---|---|
| 1 | 16h | 16 | 0.24226 | 0.21157 | 0.18821 | Li | 5.962 | 1 |
| 2 | 4d | 4 | 0.00000 | 0.50000 | −0.08526 | Li | 4.554 | 1 |
| 3 | 8f | 16 | 0.23146 | 0.24204 | −0.03209 | Li | 7.073 | 1 |
| 4 | 4c | 4 | 0.00000 | 0.00000 | 0.27112 | Li | 1.628 | 1 |
| 5 | 4d | 4 | 0.00000 | 0.50000 | 0.73040 | Si | 1.336 | 1 |
| 6 | 4d | 4 | 0.00000 | 0.50000 | 0.67064 | P | 0.8046 | 1 |
| 7 | 2b | 2 | 0.00000 | 0.00000 | 0.50000 | Si | 0.083791 | |
| 8 | 2b | 2 | 0.00000 | 0.00000 | 0.50000 | P | 0.4036 | 1 |
| 9 | 8g | 8 | 0.00000 | 0.15540 | 0.42796 | S | 1.379 | 1 |
| 10 | 8g | 8 | 0.00000 | 0.15497 | 0.42822 | Cl | 1.336 | 1 |
| 11 | 8g | 8 | 0.00000 | 0.34009 | 0.11139 | S | 1.518 | 1 |
| 12 | 8g | 8 | 0.00000 | 0.34066 | 0.11251 | Cl | 1.524 | 1 |
| 13 | 8g | 8 | 0.00000 | 0.67057 | 0.76525 | S | 1.436 | 1 |
| 14 | 8g | 8 | 0.00000 | 0.67258 | 0.76620 | Cl | 1.276 | 1 |

Figure 6:
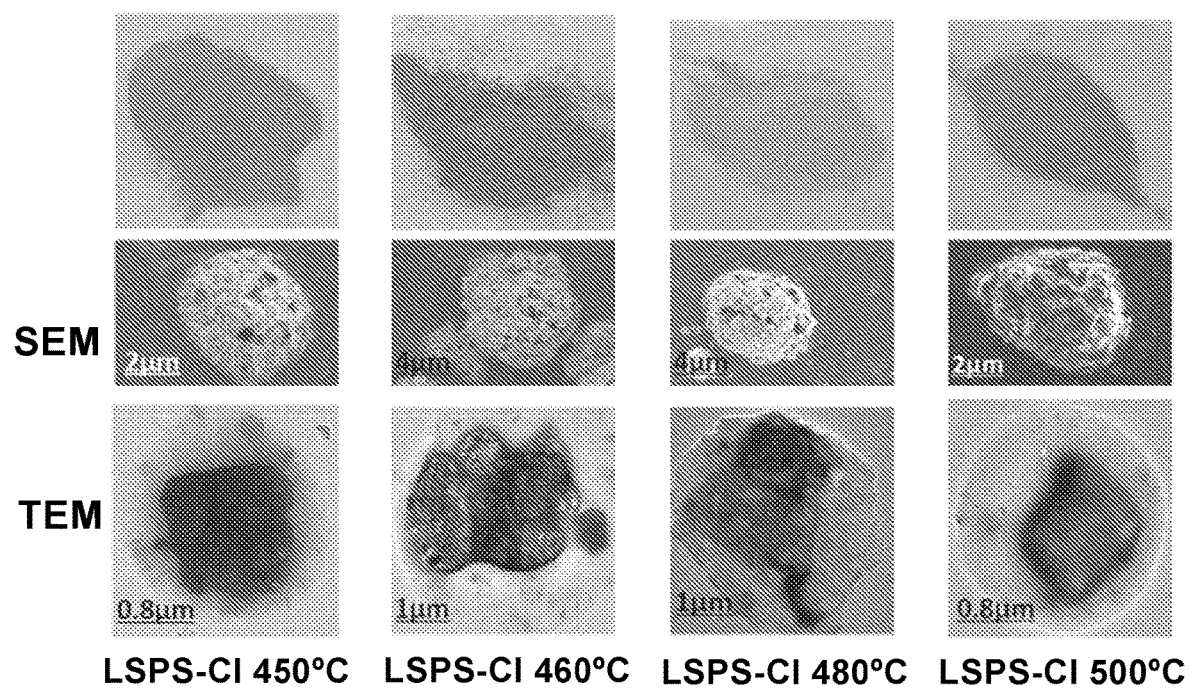
FIG. 6: SEM and TEM images of LSPS-Cl samples annealed at 450° C., 460° C., 480° C. and 500° C. show their typical core-shell structure. Shown with each micrograph is the picture from FIG. 1 corresponding to the micrograph.
Figure 7:
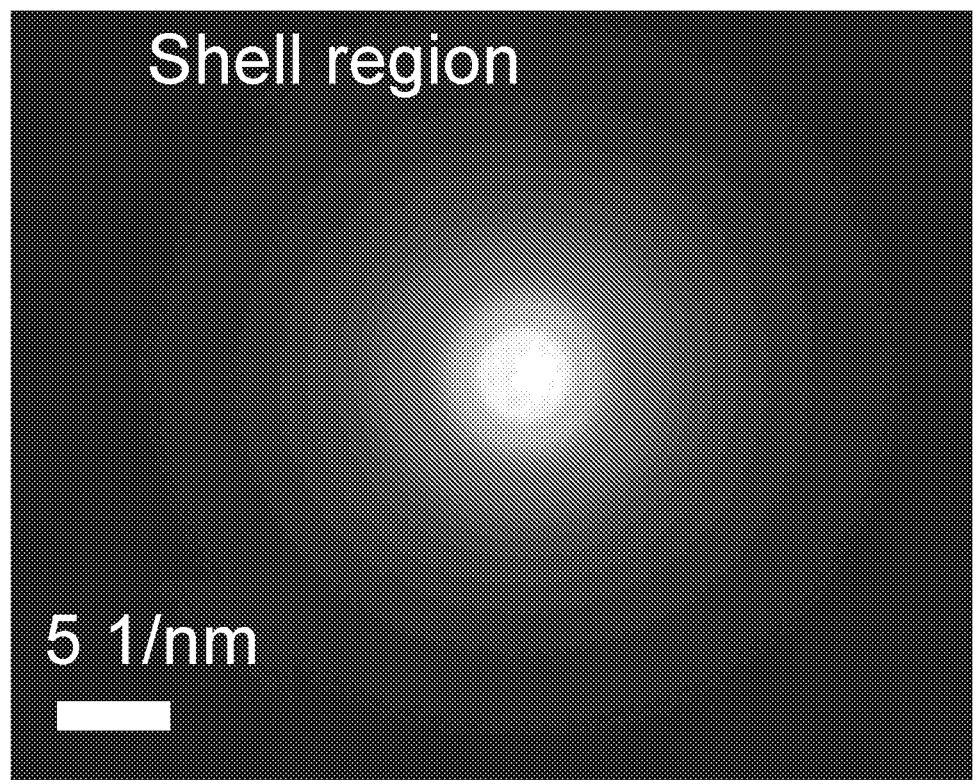
FIG. 7: TEM diffraction pattern of the shell of the LSPS-Cl 460 solid electrolyte showing the amorphous structure of the shell.
Figure 8:
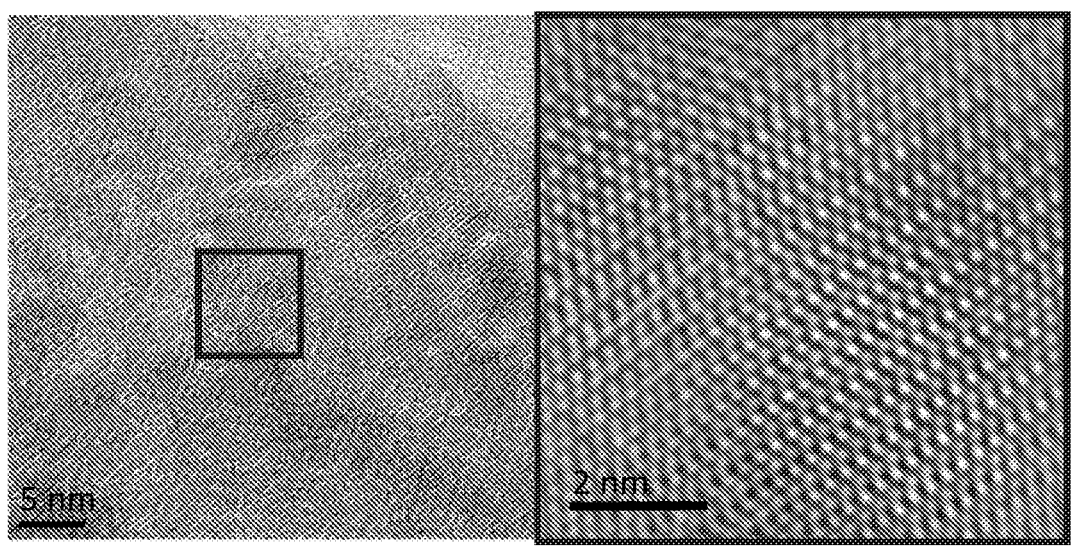
FIG. 8: Typical HRTEM images of particles inside the shell of LSPS-Cl 450, showing that they are single nanoparticle crystals embedded in the amorphous shell.

Since the seven LSPS-Cl samples annealed at different temperatures shared the same crystal structure from XRD analyses, it is interesting to understand why they show different colors. Scanning and Transmission Electron Microscopy (SEM/TEM) images (FIG. 6) of LSPS-Cl samples annealed at 450° C., 460° C., 480° C. and 500° C. (hereafter LSPS-Cl 450, 460, 480 and 500) revealed that LSPS-Cl particles have a core-shell structure, with a typical particle size of several micrometers. The shells have a transparent contrast in TEM bright-field image, indicating that they are thin (e.g., on the order of less than a nanometer). TEM further reveals that the shell regions of LSPS particles have an amorphous structure, as shown in the TEM diffraction pattern of the shell of LSPS-Cl 460 in FIG. 7. The nanoparticles are randomly distributed inside the shell as single particles, as revealed by high resolution TEM (HR-TEM) images, as shown in FIG. 8.

Figure 9A:
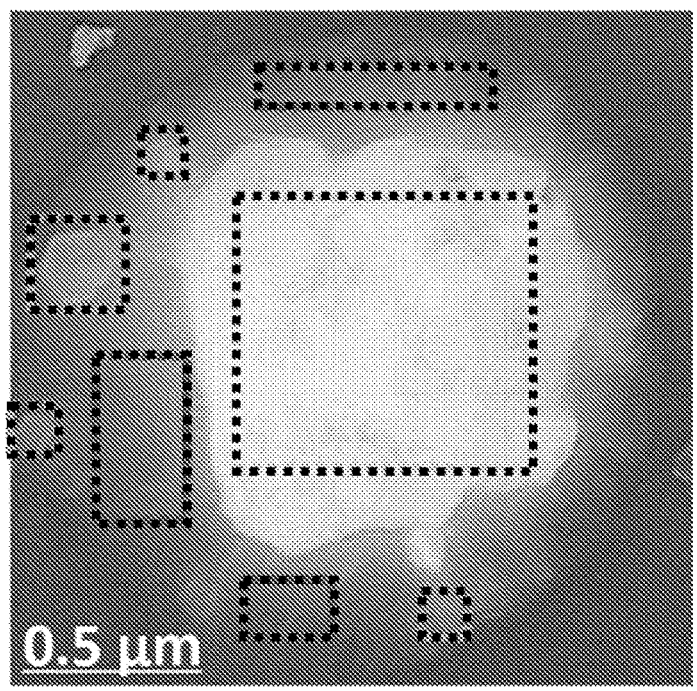
FIGS. 9A-9C: (A) SEM dark field image showing the three distinct structural regions in a granule of a composition of the invention. The larger, lighter dotted line box is the core, the darker dotted line box is the shell, and the smaller, lighter dotted line box is a particle within the shell. (B) SEM image showing the three distinct structural regions in a granule of a composition of the invention. The darkest region is the core, the lightest region is the shell, and the darker dots are particles within the shell. (C) A model of the structure of a composition of the invention.
Figure 9B:
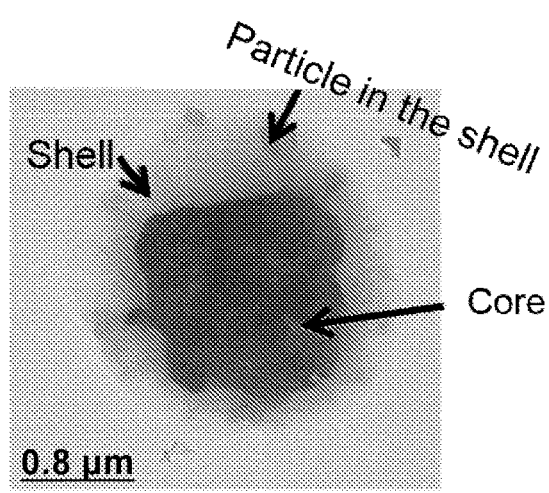
Figure 9C:
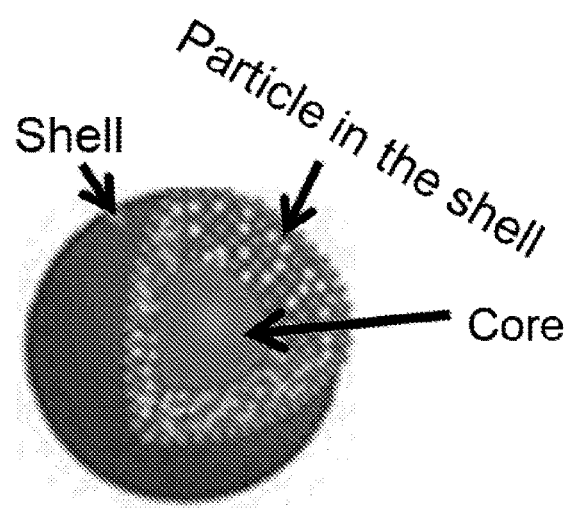
Figure 10A:
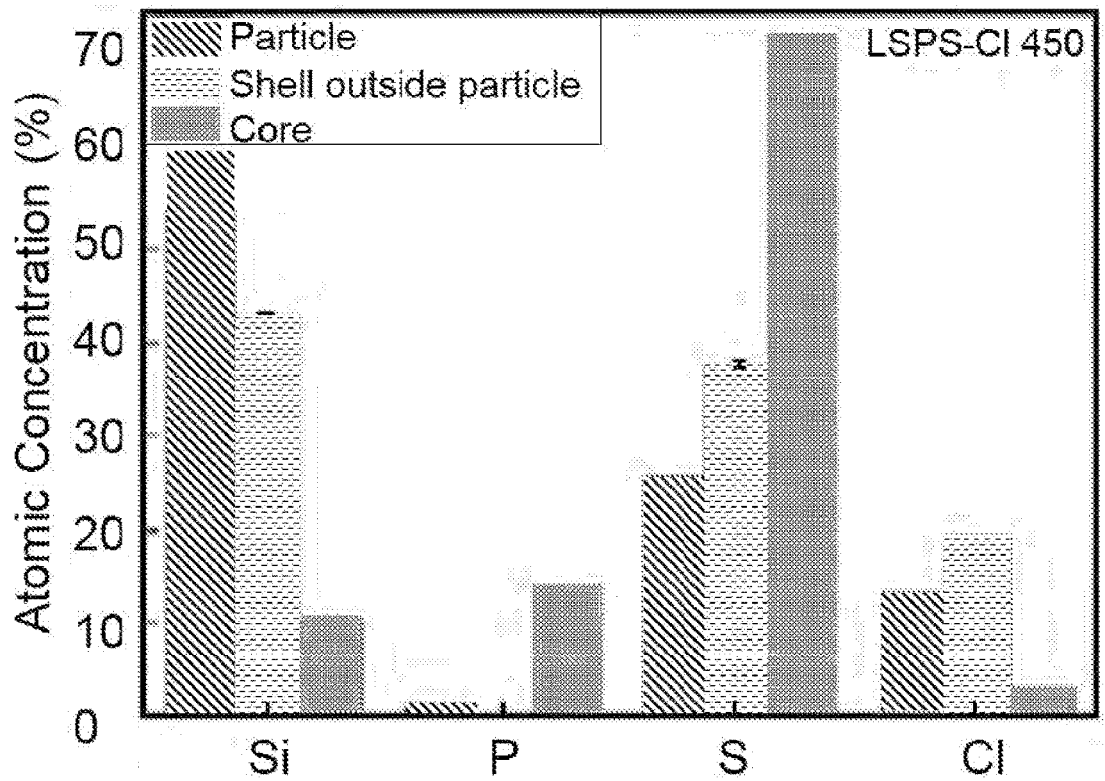
FIGS. 10A-10D: EDS histogram of the composition of the three structural regions of (A) LSPS-Cl 450, (B) LSPS-Cl 460 composition, (C) LSPS-Cl 480 composition, and (D) LSPS-Cl 500 composition.
Figure 10B:
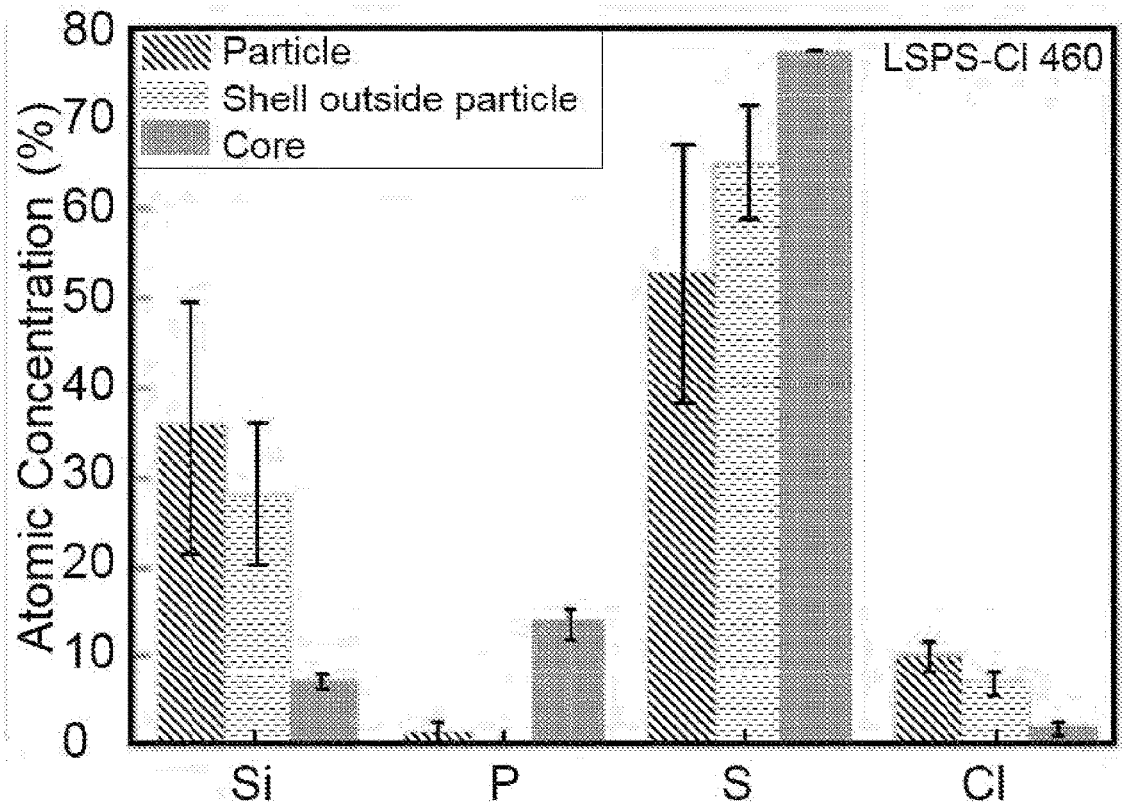
Figure 10C:
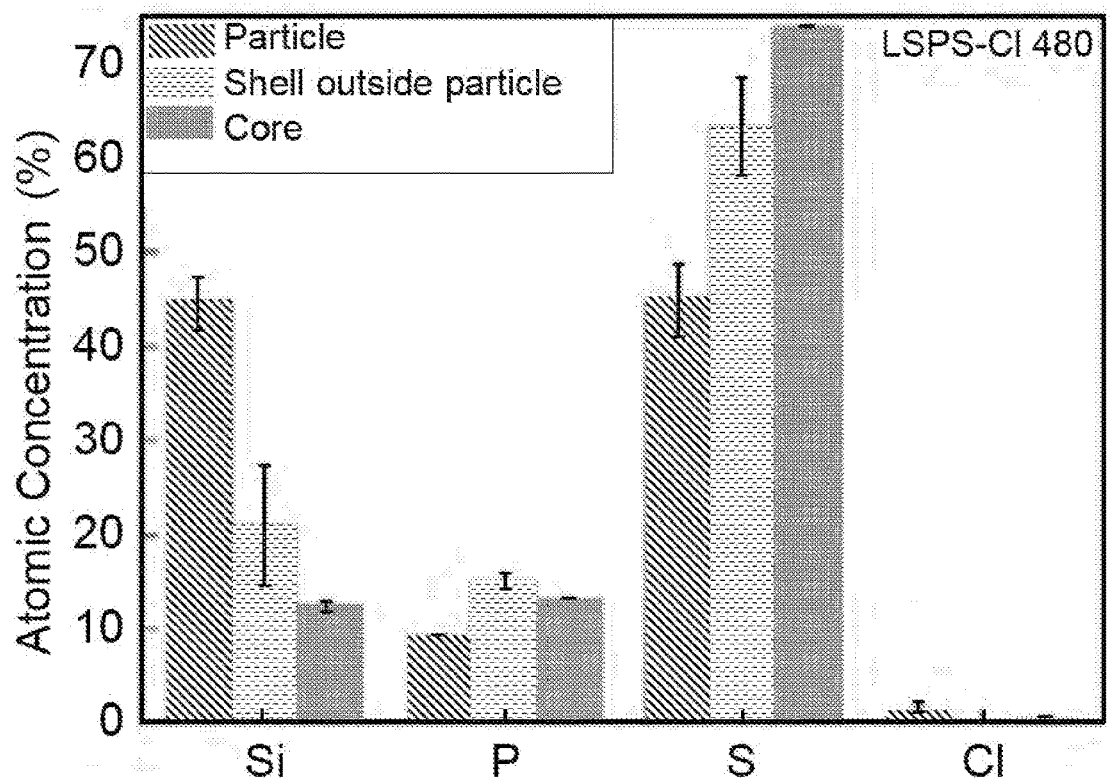
Figure 10D:
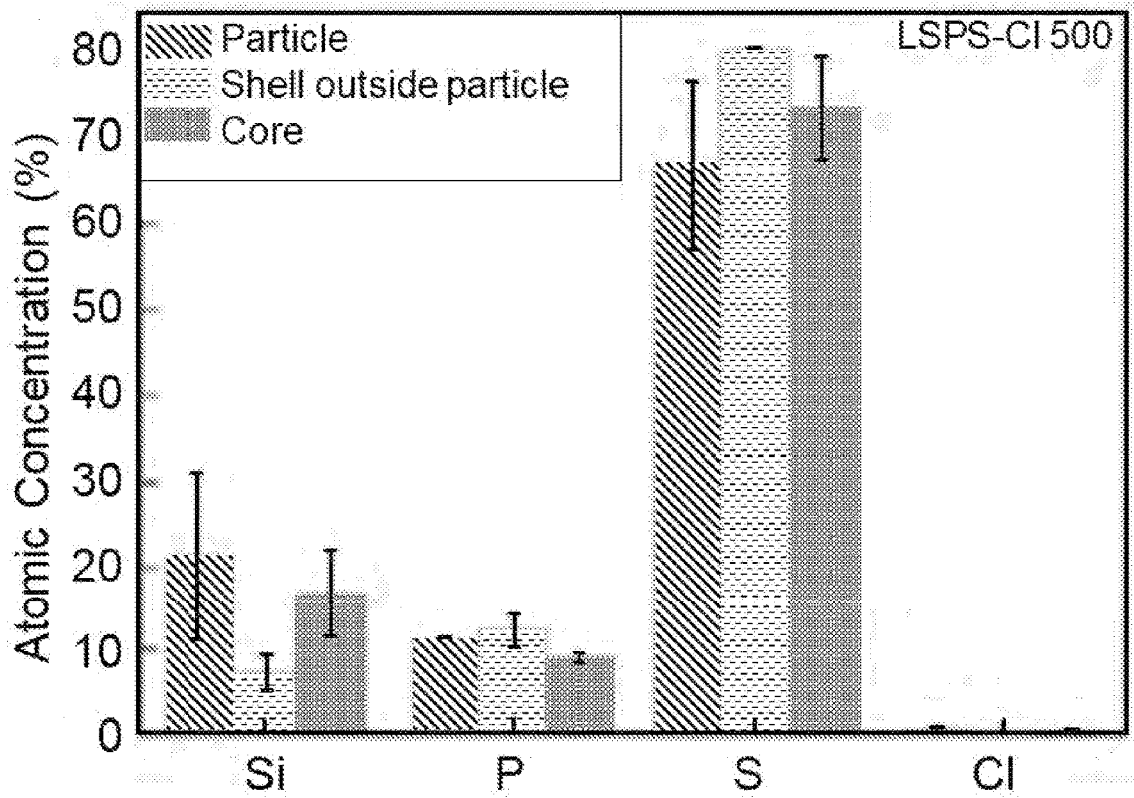
Figure 11A:
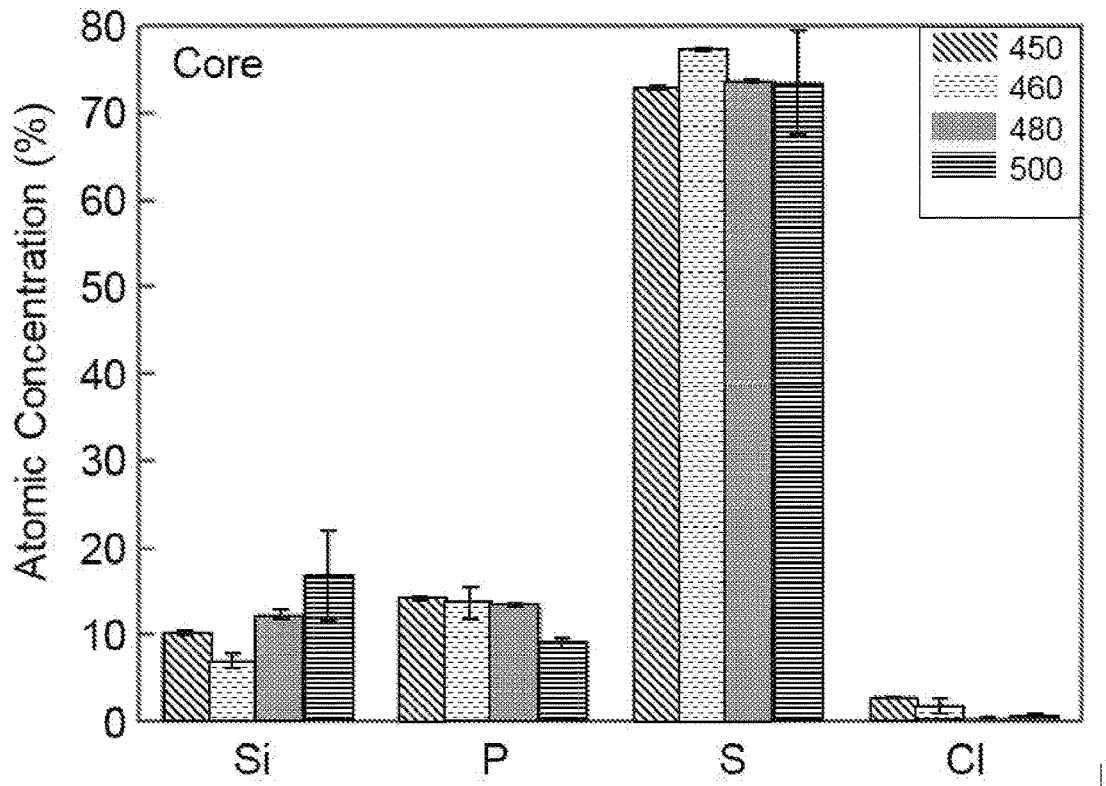
FIGS. 11A-11B: (A) EDS histograms of the composition of the core regions of the LSPS-Cl 450, LSPS-Cl 460, LSPS-Cl 480, and LSPS-Cl 500 compositions. (B) EDS histograms of the composition of the shell regions of the LSPS-Cl 450, LSPS-Cl 460, LSPS-Cl 480, and LSPS-Cl 500 compositions.
Figure 11B:
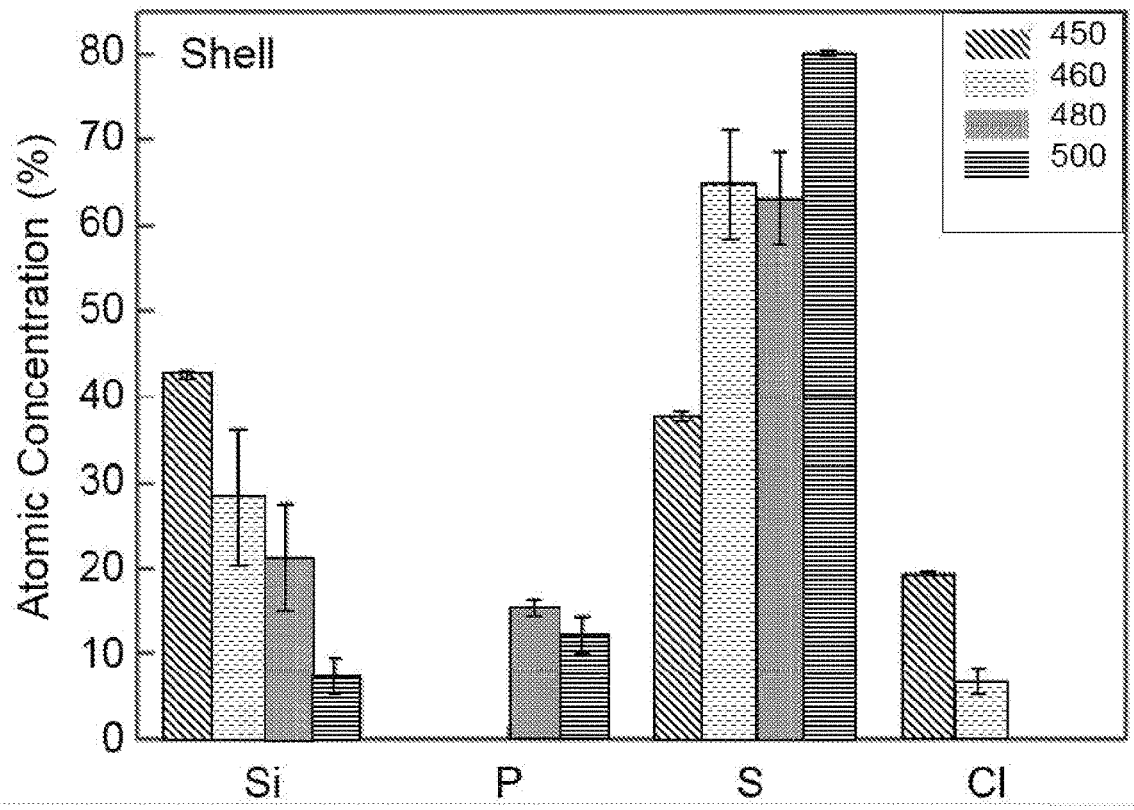

To understand the composition of different regions (i.e., core, shell, and particle in the shell) inside a LSPS-Cl SSE particle, Scanning Transmission Electron Microscopy (STEM) and Energy-dispersive X-ray Spectroscopy (EDS) analyses were performed on multiple different areas (FIG. 9A-9C) inside several different particles for each sample. The statistically analyzed compositions and atomic concentrations of LSPS-Cl 450, 460, 480 and 500 are summarized in FIGS. 10A-10D and FIGS. 11A-11B, showing that all of these samples comprised Si, P, S and Cl. Lithium atoms could not be detected by the EDS technique due to its small atomic weight and number. A trend and difference can be observed in the shell composition for these four samples from the EDS analyses. As the annealing temperature increases from 450 to 500° C., the atomic concentration of silicon in the shell generally decreases from ~40% to less than 10%, while that of sulfur increases from ~40% to ~80%. In contrast, the variation in elemental concentrations of core compositions of the four samples is relatively small, indicating similar core composition and corresponding well to the similar XRD patterns of these samples.

Example 4—Cyclic Voltammetry of Different Sulfide-Based Solid State Electrolytes Given that the compositions of the LSPS-Cl samples annealed at various temperatures were different as described in Example 3, we measured the relationship between their electrochemical properties and microstructures. Cyclic voltammetry (CV) was used to experimentally evaluate the electrochemical stability of LSPS-Cl samples.

Adopting the configuration of Li/LSPS-Cl+C/Au cell, the low-voltage (voltage range=0.1 to 2.0 V) and high-voltage (voltage range=1.0 to 5.0 V) stabilities of LSPS-Cl samples were tested and shown in FIGS. 12A-12I. The results showed that in the low voltage range (FIG. 12A), all 7 LSPS-Cl samples show a decomposition peak at ~0.7 V with similar current densities (normalized to 1 gram of LSPS-Cl with the same area of $\frac{1}{8} \ast \frac{1}{8}$ in$^2$). This indicated that the decomposition of different LSPS-Cl samples in the low voltage range occurred at almost the same voltage with similar intensity.

Figure 12A:
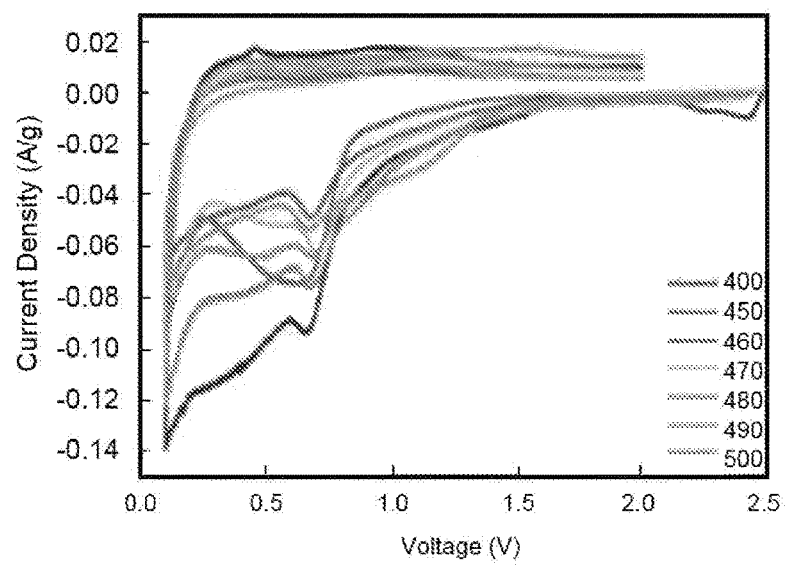
FIGS. 12A-12I: (A) Cyclic voltammogram traces of all seven LSPS-Cl compositions in the low voltage range. (B) Cyclic voltammogram traces of all seven LSPS-Cl compositions in the high voltage range. (C) Zoomed in view of the cyclic voltammogram traces of all seven LSPS-Cl compositions in the high voltage range. (D) Integrated spectrum intensity of the LSPS-Cl 400 composition. (E) Integrated spectrum intensity of the LSPS-Cl 400 composition. (F) Integrated spectrum intensity of the LSPS-Cl 500 composition. (G) Calculation of the starting degradation voltage of the LSPS-Cl 400 composition. (H) Calculation of the starting degradation voltage of the LSPS-Cl 470 composition. (I) Calculation of the starting degradation voltage intensity of the LSPS-Cl 500 composition.
Figure 12B:
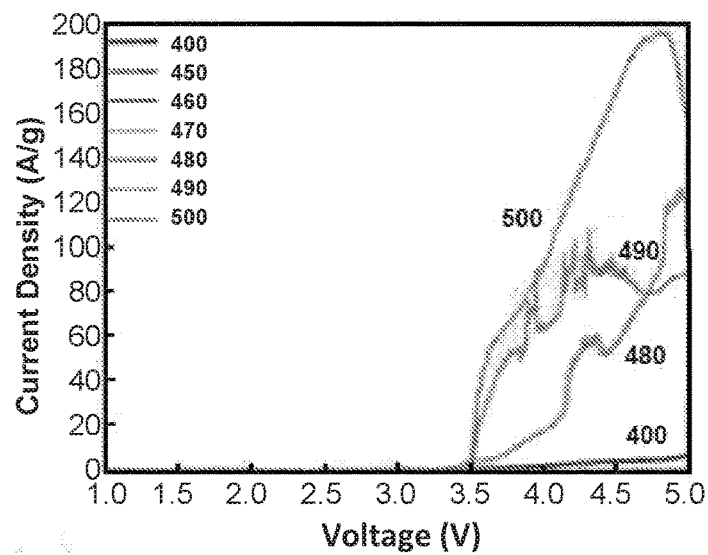
Figure 12C:
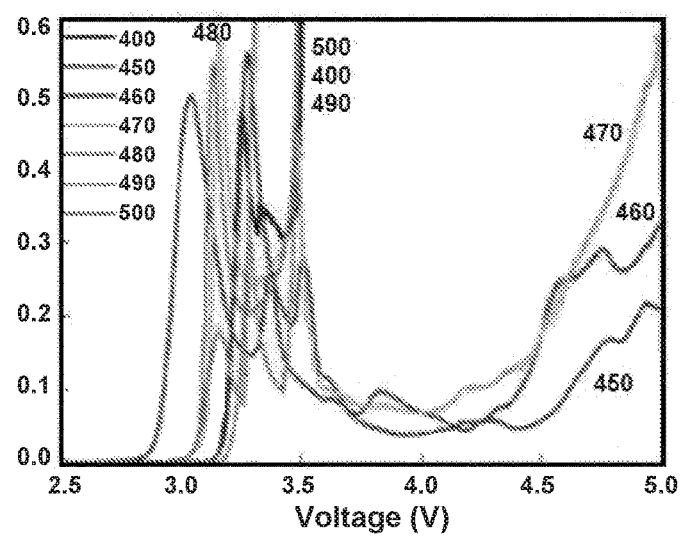

In contrast, the high voltage range CV test (FIG. 12B) showed differences among the seven LSPS-Cl samples. The current densities increased significantly for LSPS-Cl 480, 490, and 500, indicating severe decompositions at high voltages. As a comparison, the current density curves of LSPS-Cl 450, 460 and 470 samples were horizontal lines close to 0, showing no decomposition at all. FIG. 12C shows the enlarged version of the same high-voltage-range CV curves as in FIG. 12B, with a scale of ~500 times smaller than that of FIG. 12B. All seven LSPS-Cl samples start to decompose at 3.0+0.2 V, but with different degrees of decomposition. To quantitatively measure the severity of decomposition of the different LSPS-Cl samples, the seven current density versus voltage curves were integrated from 2.5 V to 5 V to obtain the integrated spectrum intensity, as summarized in Table 4.

TABLE 4

Summary of the decomposition voltages and severities of LSPS-Cl samples annealed at various temperatures derived from CV curves

| Sample | Low Voltage Peak | High Voltage Peak | | |
|---|---|---|---|---|
| | | Starting voltage point (V) | Integrated Spectrum Intensity (VA/g) | Decomposition Degree |
| 400 | 0.66 | 3.15 | 4.77612 | Moderate |
| 450 | 0.66 | 3.16 | 0.24920 | Minor |
| 460 | 0.68 | 2.87 | 0.37556 | |
| 470 | 0.71 | 3.09 | 0.41444 | |
| 480 | 0.69 | 3.04 | 69.63326 | Severe |
| 490 | 0.67 | 3.20 | 105.19533 | |
| 500 | 0.68 | 3.06 | 187.98299 | |

Figure 12D:
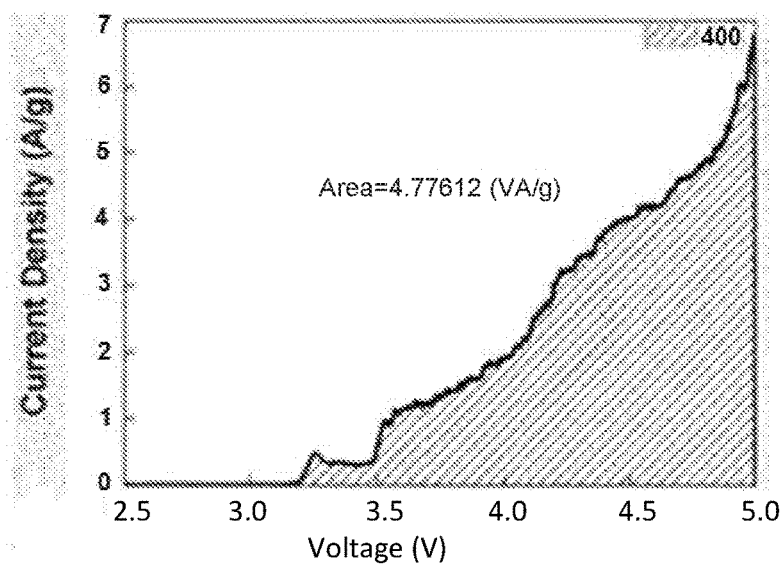
Figure 12E:
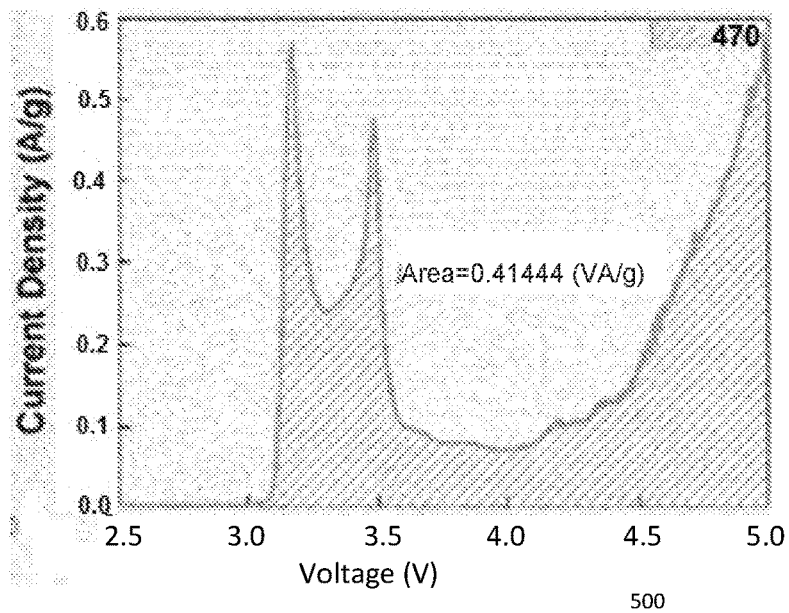
Figure 12F:
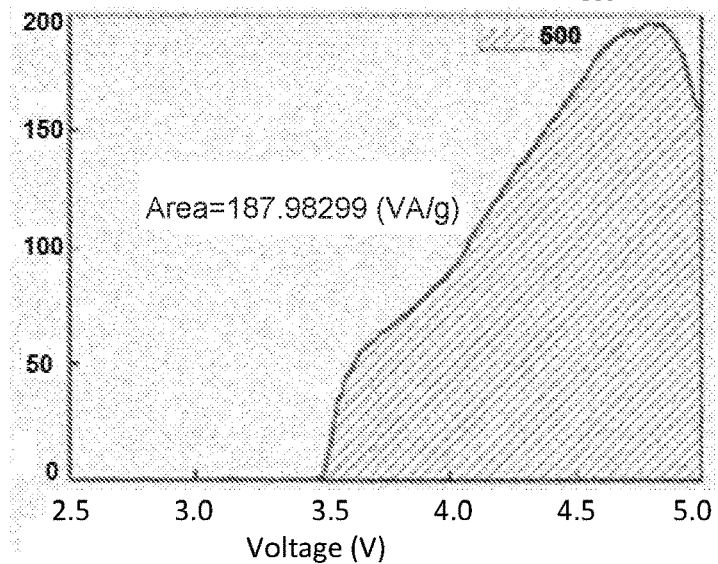
Figure 12G:
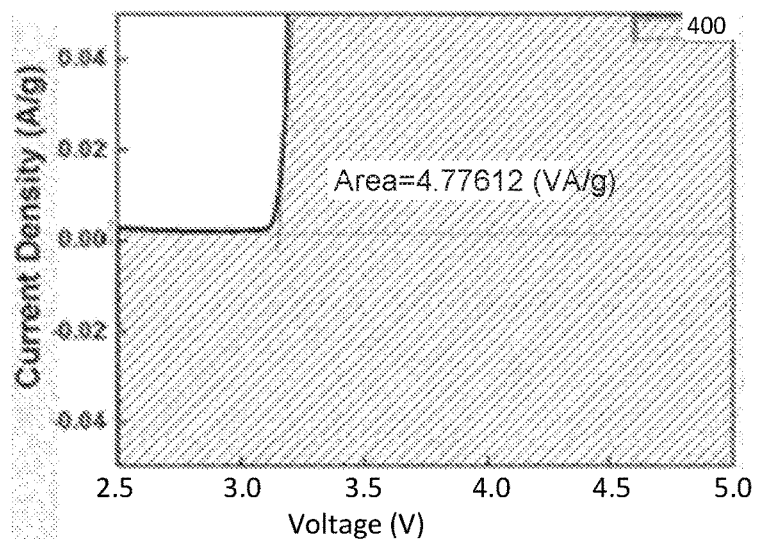
Figure 12H:
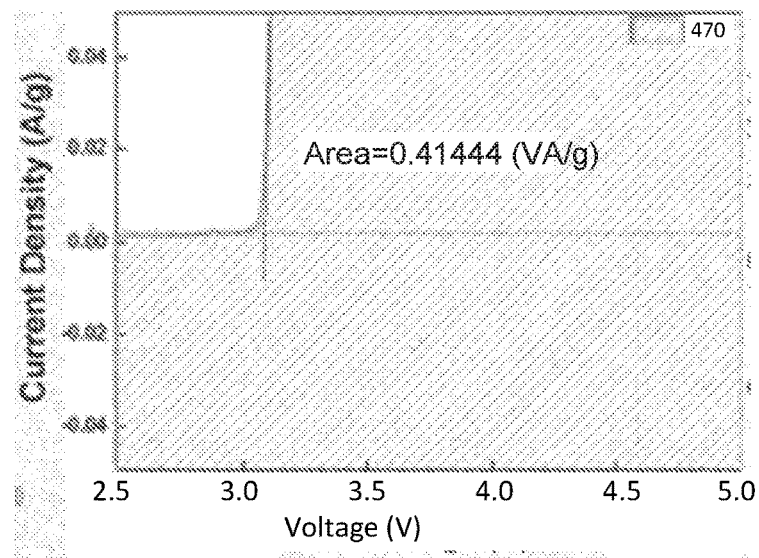
Figure 12I:
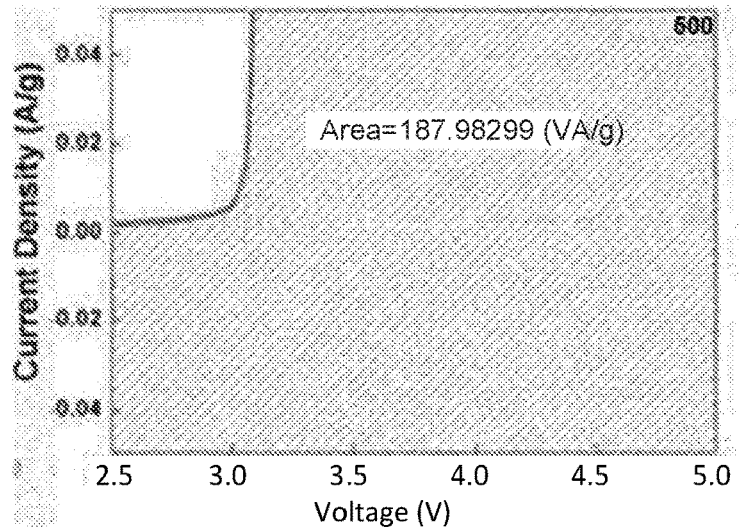
Figure 13A:
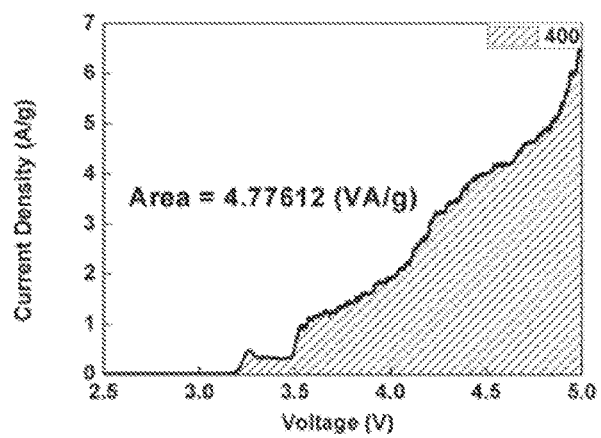
FIGS. 13A-13G: Integrated spectrum intensity of (A) LSPS-Cl 400 composition, (B) LSPS-Cl 450 composition, (C) LSPS-Cl 460 composition, (D) LSPS-Cl 470 composition, (E) LSPS-Cl 480 composition, (F) LSPS-Cl 400 composition, and (G) LSPS-Cl 500 composition.
Figure 13B:
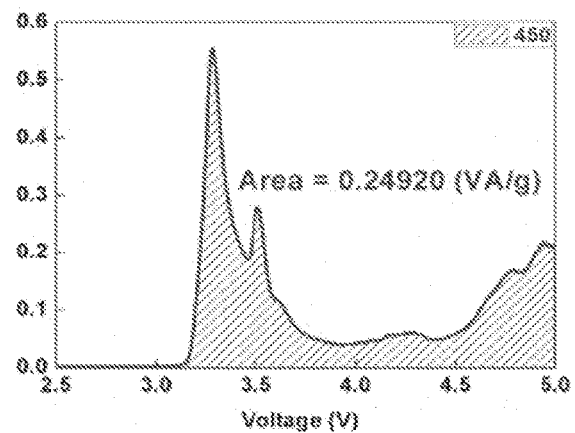
Figure 13C:
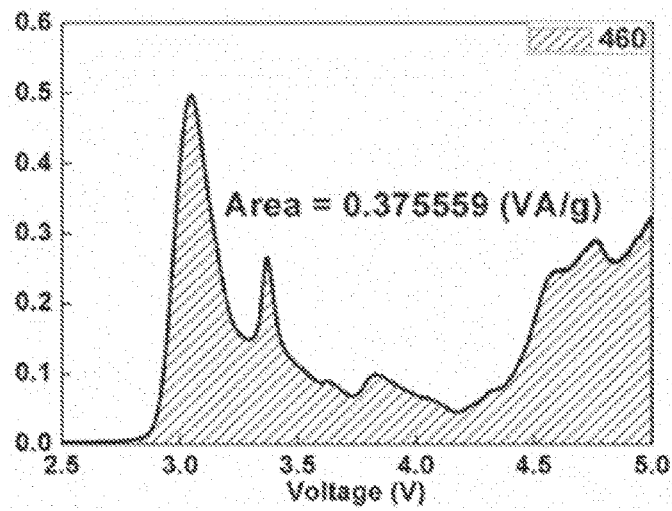
Figure 13D:
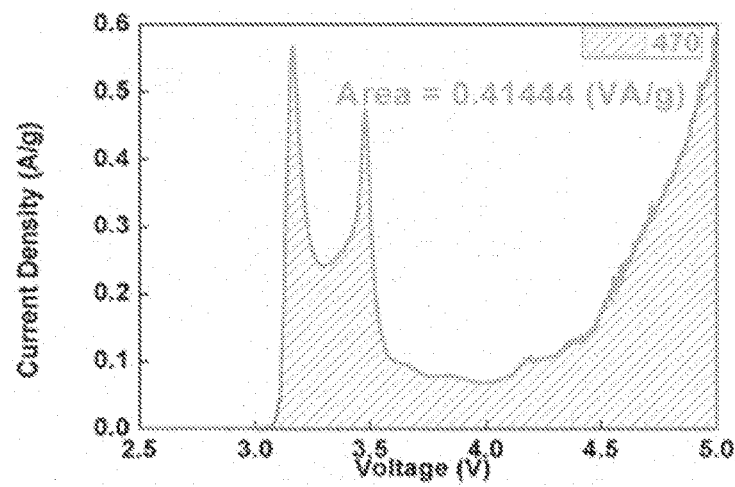
Figure 13E:
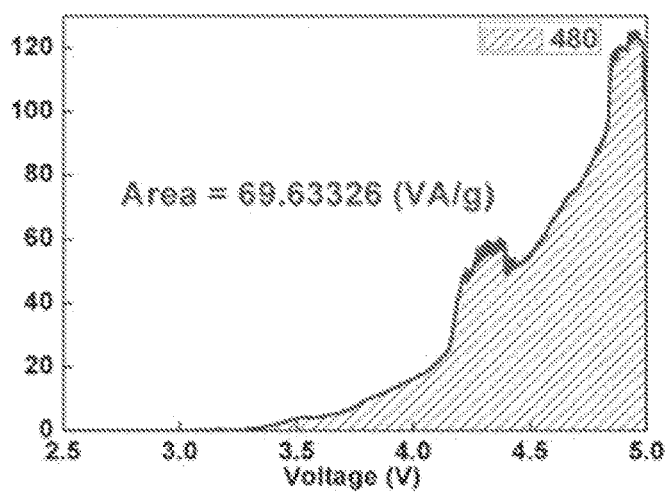
Figure 13F:
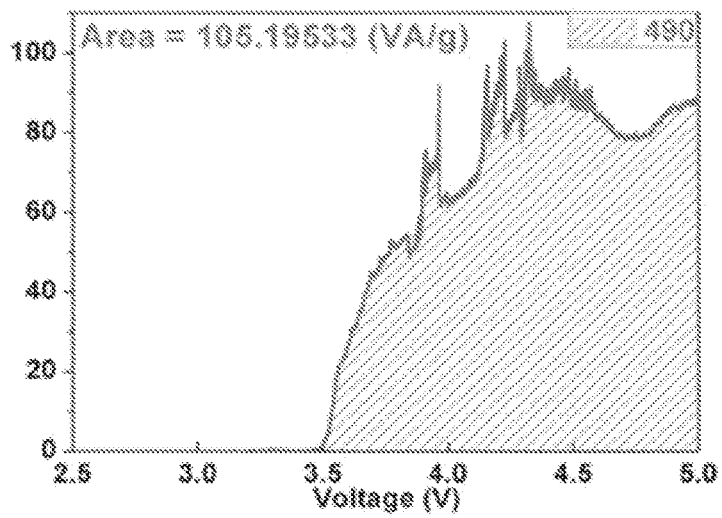
Figure 13G:
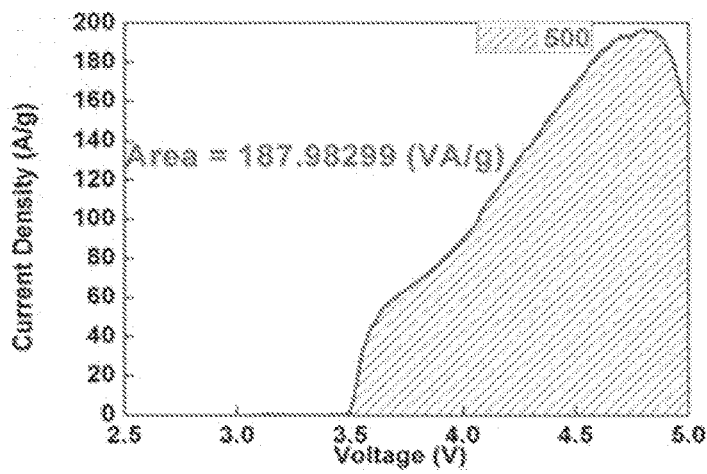
Figure 14A:
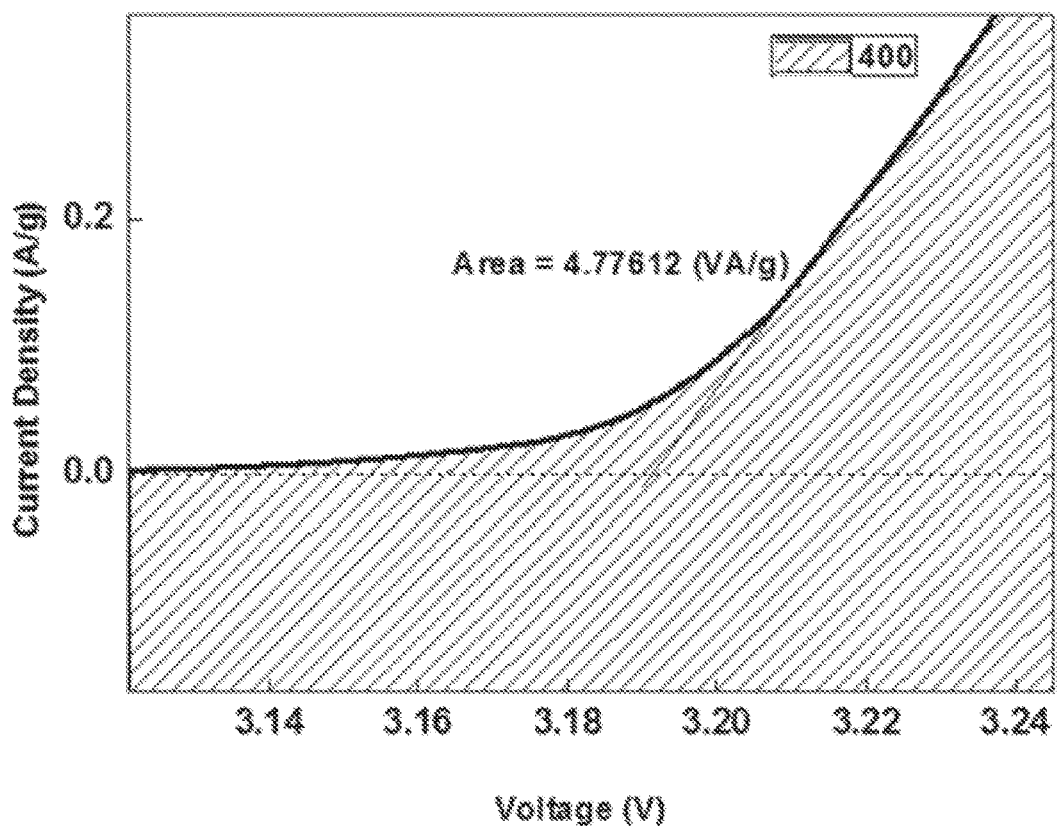
FIGS. 14A-14G: Calculation of the starting degradation voltage of (A) LSPS-Cl 400 composition, (B) LSPS-Cl 450 composition, (C) LSPS-Cl 460 composition, (D) LSPS-Cl 470 composition, (E) LSPS-Cl 480 composition, (F) LSPS-Cl 490 composition, and (G) LSPS-Cl 500 composition.
Figure 14B:
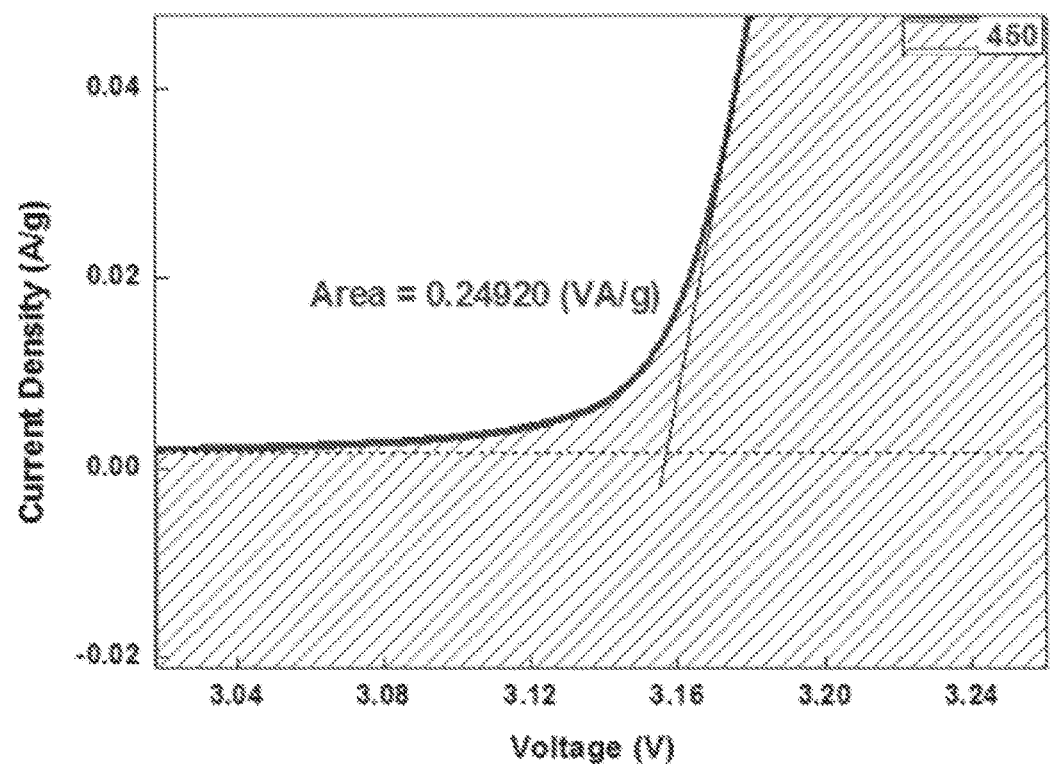
Figure 14C:
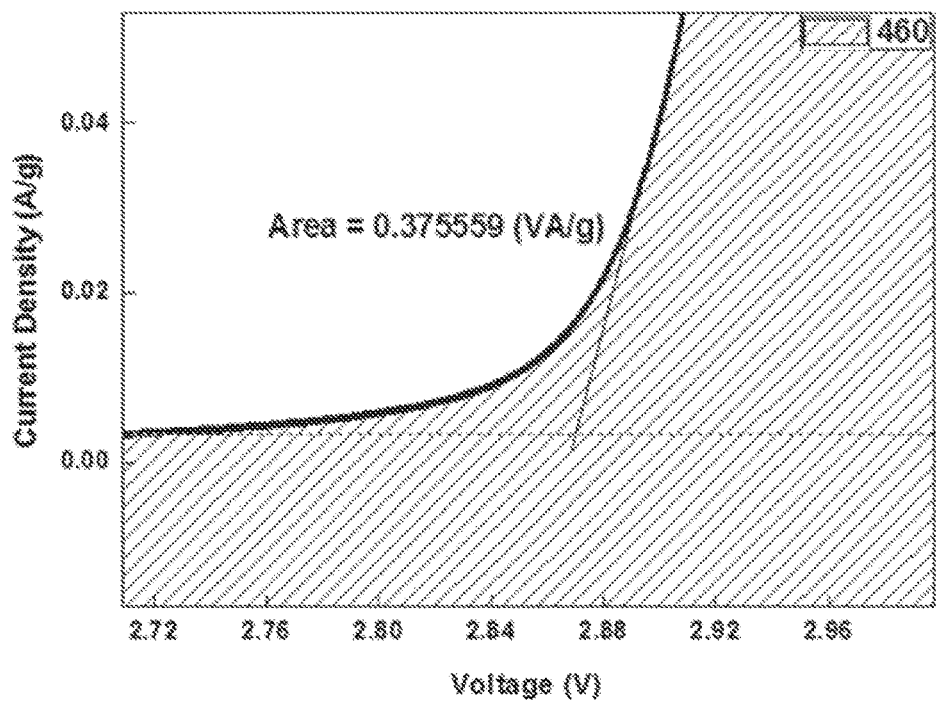
Figure 14D:
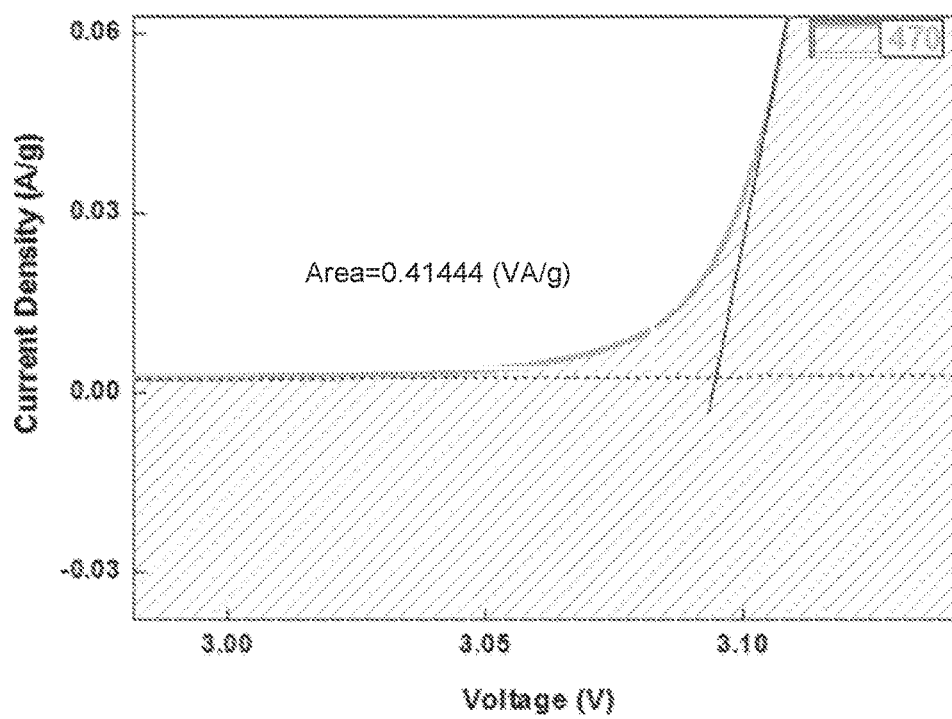
Figure 14E:
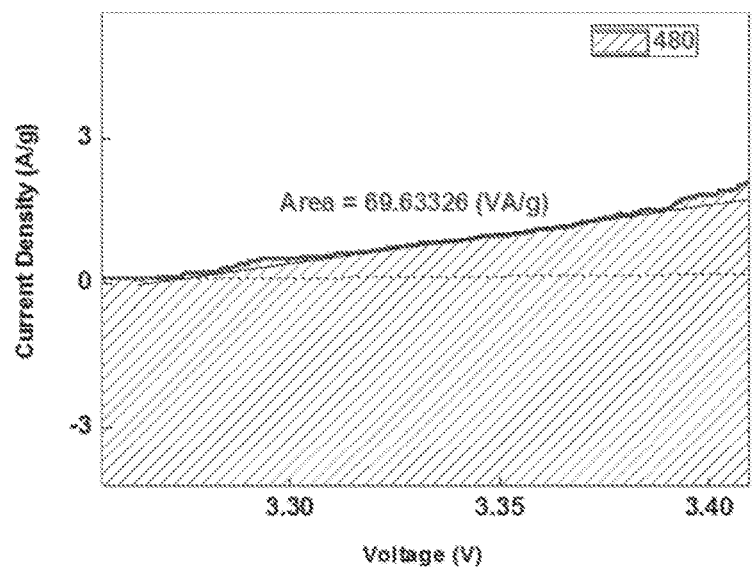
Figure 14F:
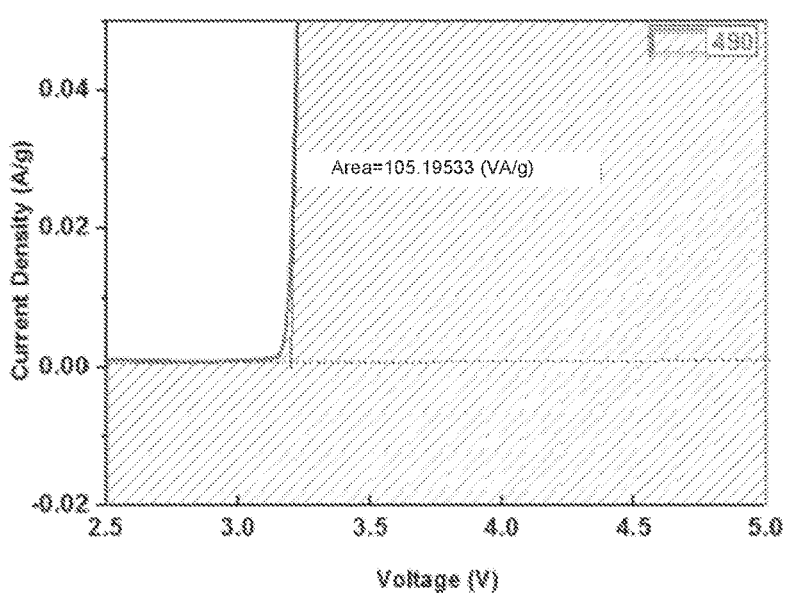
Figure 14G:
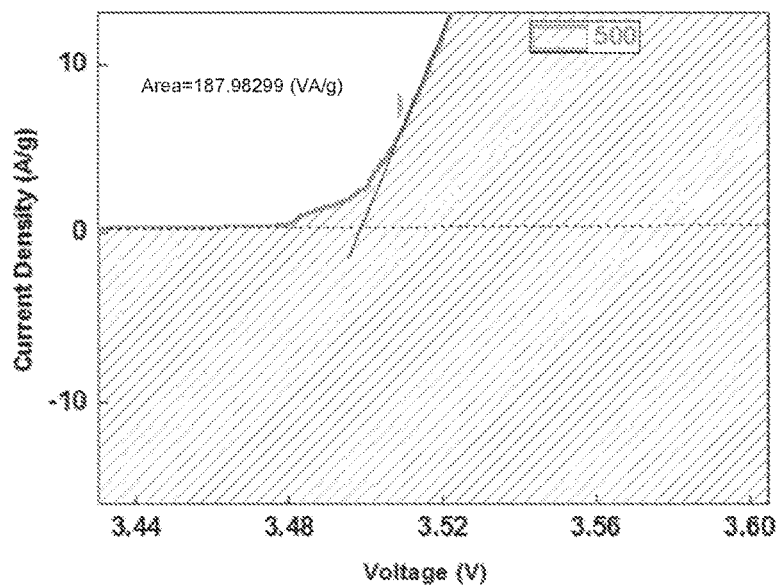
Figure 15A:
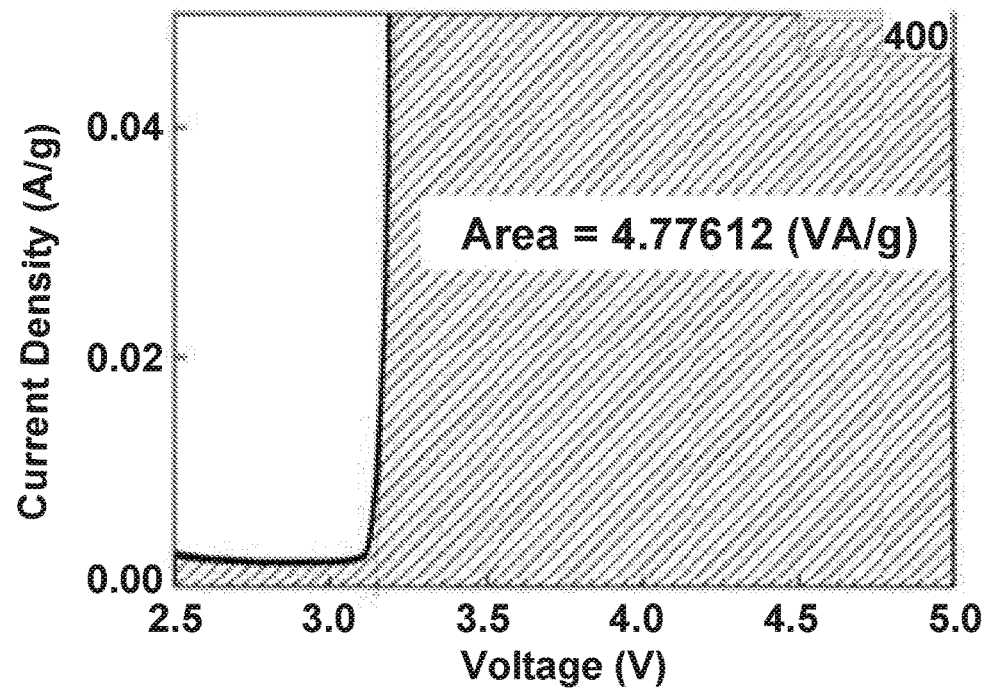
FIG. 15A-15G: Calculation of the starting degradation voltage obtained by drawing tangent lines for the horizontal base and the current density curve of (A) LSPS-Cl 400 composition, (B) LSPS-Cl 450 composition, (C) LSPS-Cl 460 composition, (D) LSPS-Cl 470 composition, (E) LSPS-Cl 480 composition, (F) LSPS-Cl 490 composition, and (G) LSPS-Cl 500 composition.
Figure 15B:
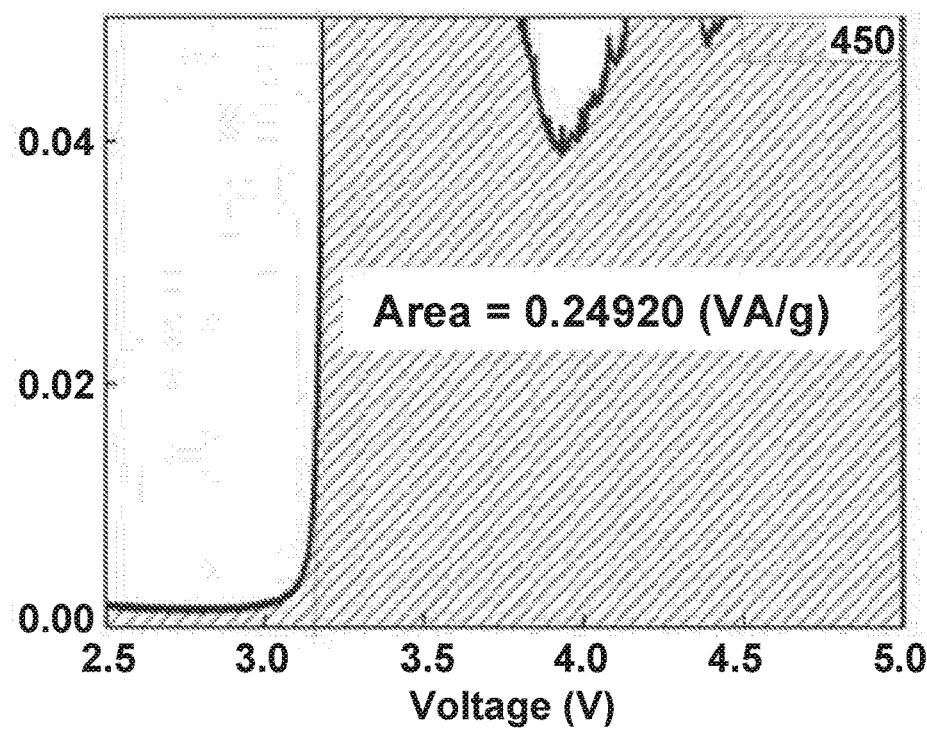
Figure 15C:
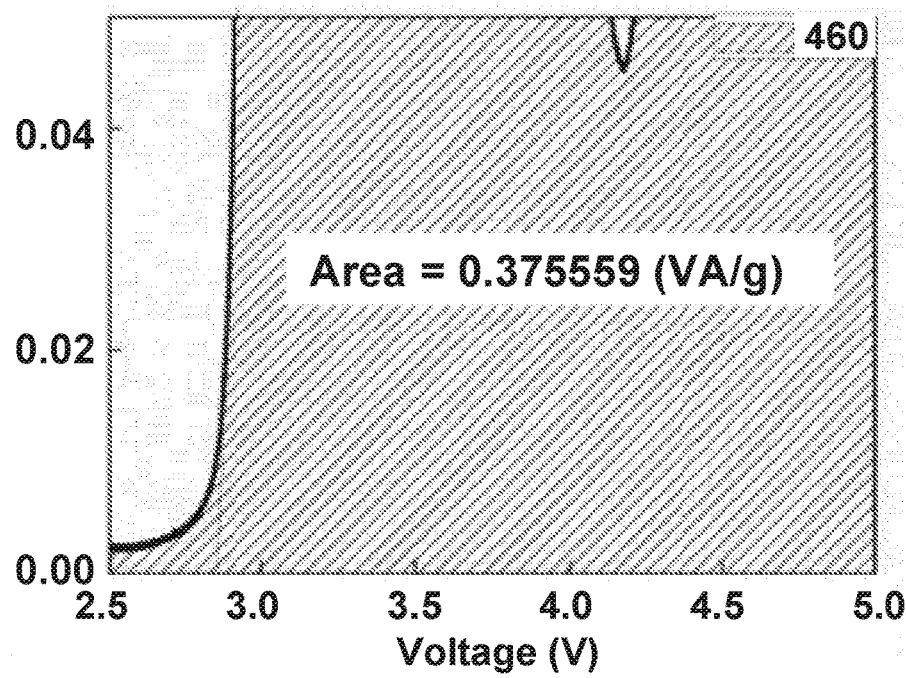
Figure 15D:
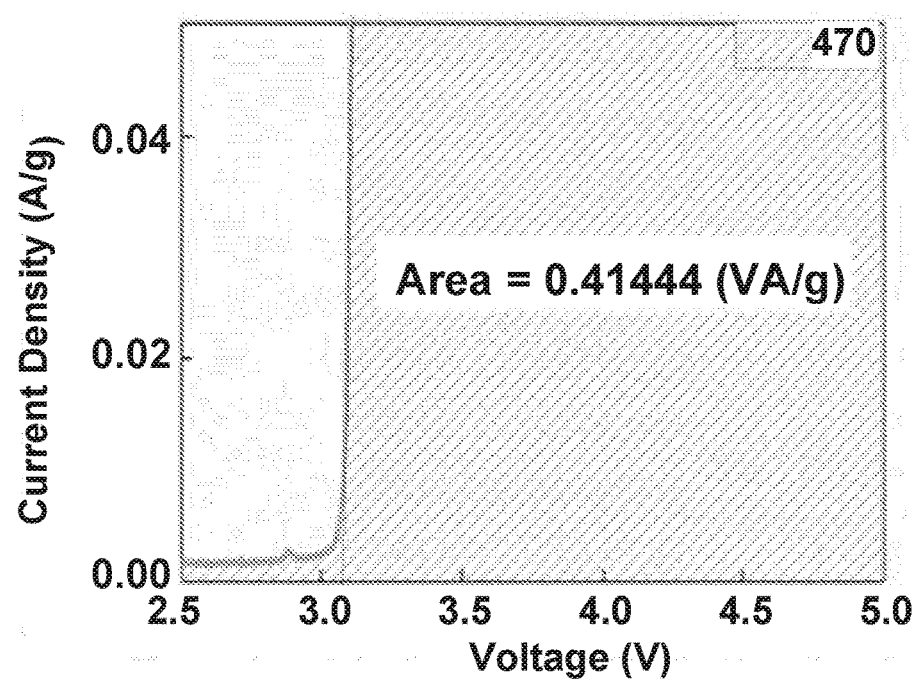
Figure 15E:
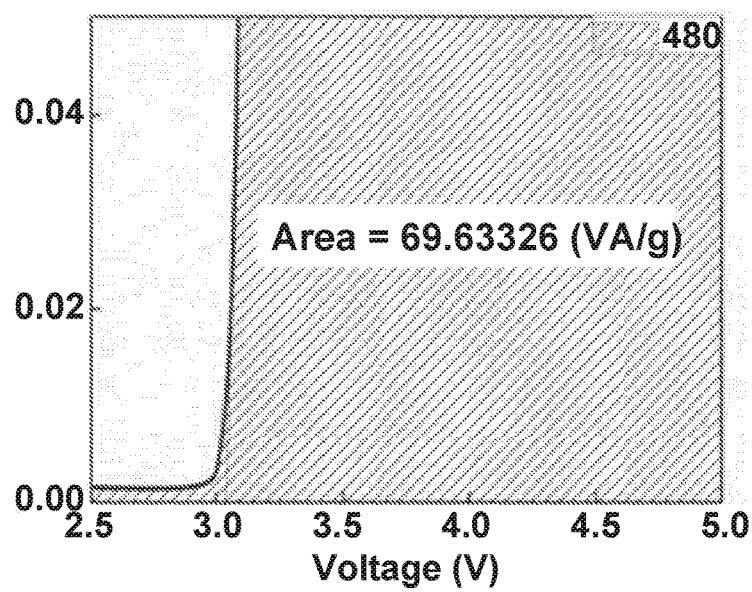
Figure 15F:
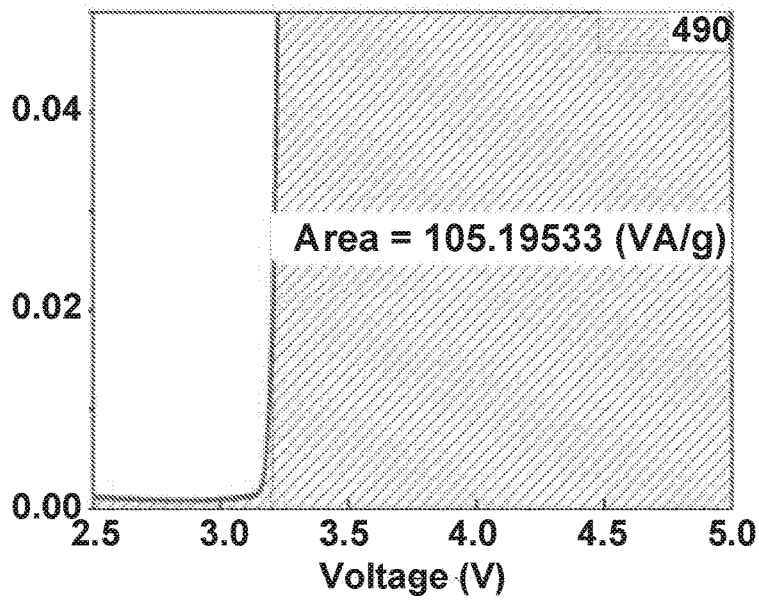
Figure 15G:
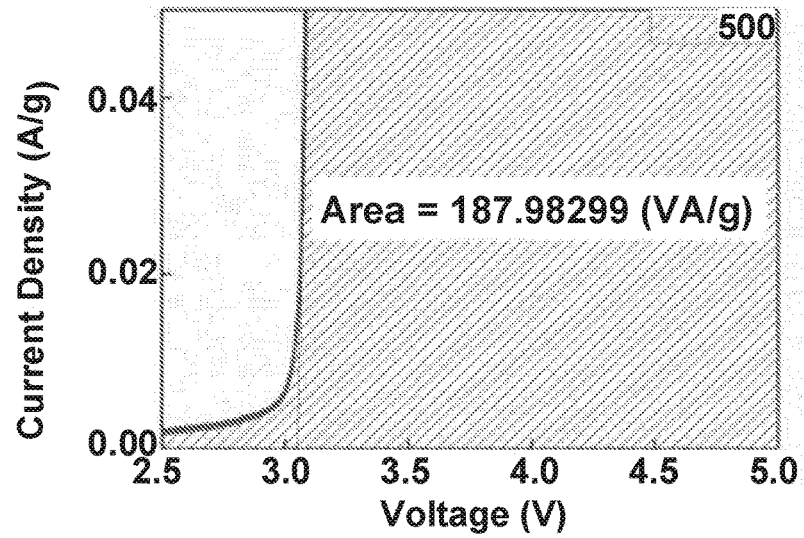
Figure 16:
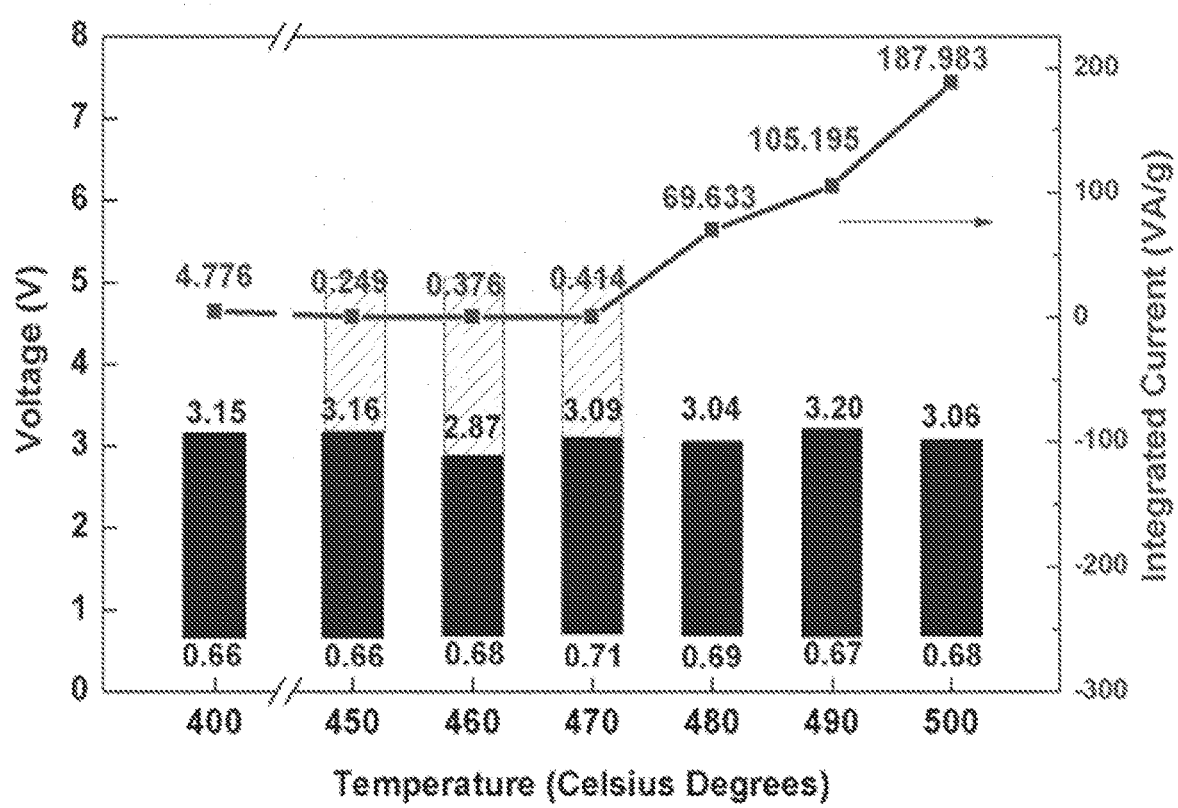
FIG. 16: Summary diagram showing the core-shell-structured LSPS-Cl materials with a similar voltage stability window of ~0.7-3.1 V. The decomposition of minor-decomposition materials (LSPS-Cl 450-470) above 3.1 V are largely suppressed, giving a quasi-stability window up to 5 V.

Based on the values of the integrated spectrum intensity, the seven LSPS-Cl samples can be classified into three categories: minor-, medium- and severe-decomposition materials. FIGS. 12D-12F shows the representative spectra of each category (the full set of seven spectra is shown in FIGS. 13A-13G), in which the integrated spectrum intensity was equal to the shadowed area between the current density curve and the x-axis, with the integrated data presented in Table 4. LSPS-Cl 450, 460 and 470 were samples with minor degradation, having integrated spectrum intensities in the range of 0.25 to 0.41 VA/g. In comparison, the integrated spectrum intensities of the severely-decomposed samples (LSPS-Cl 480, 490 and 500) were several hundred times larger, ranging from 70 to 188 VA/g. LSPS-Cl 400 was the only sample in medium-decomposition category, with an integrated spectrum intensity of 4.8 VA/g. In addition to the decomposition intensity, the starting voltage for decomposition of each sample can also be obtained by drawing tangent lines for the horizontal base and the current density curve, as shown in FIGS. 12G-12I, FIGS. 14A-14G, and FIGS. 15A-15G. They all show onset voltages near 3.1 V, with a maximum value for LSPS-Cl 490 at 3.20 V and a minimum value for LSPS-Cl 460 at 2.87 V. Therefore, the voltage stability windows of these LSPS-Cl materials with core-shell structure were from 0.7 to around 3.1 V as summarized in FIG. 16, much larger than the 1.7-2.1 V window reported previously[17-20].

Example 5—Performance of the LSPS-Cl Solid State Electrolytes in a Rechargeable Battery For battery performance, a composite cathode was prepared by mixing $Li_4Ti_5O_{12}$, LSPS-Cl, polytetrafluoroethylene (PTFE), and carbon black with a weight ratio of 60:30:5:5. This mixture was then rolled into a thin film. A LSPS-Cl thin film was prepared by mixing LSPS-Cl and PTFE with a weight ratio of 95:5. The battery cell of cathode film/LSPS-Cl film/glass fiber/Li was then assembled in an argon filled glove box. A piece of glass fiber separator was inserted between the LSPS-Cl film and Li metal foil to reduce possible interfacial chemical reactions. One drop of 1 M $LiPF_6$ in ethylene carbonate (EC) and dimethyl carbonate (DMC) solution (1:1) was carefully applied onto the glass fiber to allow lithium ion conduction through the separator. A galvanostatic battery cycling test was performed on an ArbinBT2000 work station at room temperature. The specific capacity was calculated based on the amount of LTO (30 wt %) in the cathode film. For impedance measurements, a C-LSPS/LSPS/C-LSPS cell was fabricated by sandwiching and cold pressing (applied force 0.6 ton, sample cross-section area=0.316 $cm^2$) an electrolyte powder layer with two carbon black-electrolyte powder layers. 50 weight % carbon black was mixed with electrolyte to form the conductive layer, with the purpose of decreasing the interface resistance. The measurement was performed in a Solartron electrochemical potentiostat (1470E+1455 FRA). The frequency range of the measurement was from 100 Hz to 1 MHz, and the amplitude was 10 mV.

Figure 17A:
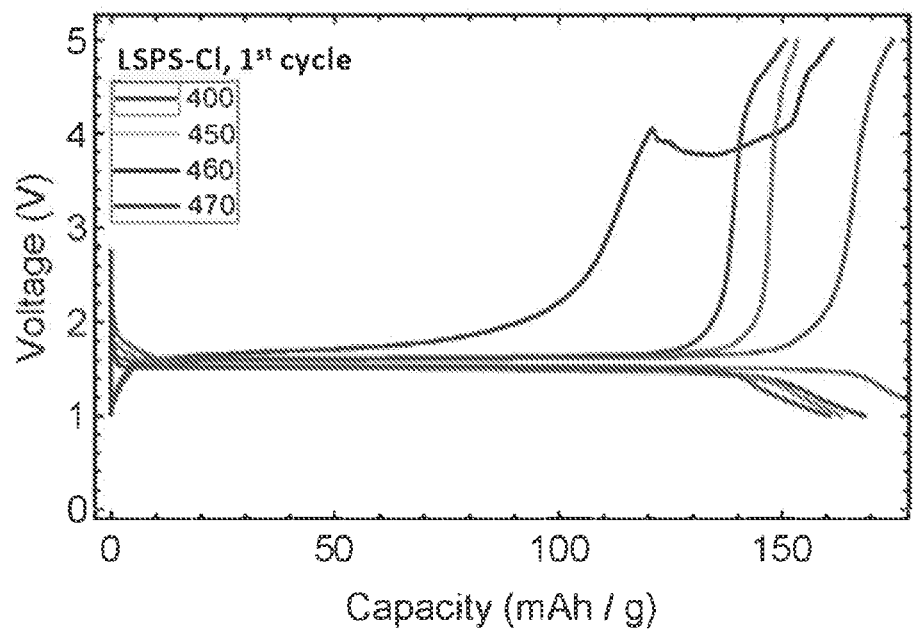
FIGS. 17A-17B: (A) First cycle charge and discharge curves of the LSPS-Cl 400, LSPS-Cl 450, LSPS-Cl 460, and LSPS-Cl 470 compositions. (B) First cycle charge and discharge curves of the LSPS-Cl 480, LSPS-Cl 490, and LSPS-Cl 500 compositions.
Figure 17B:
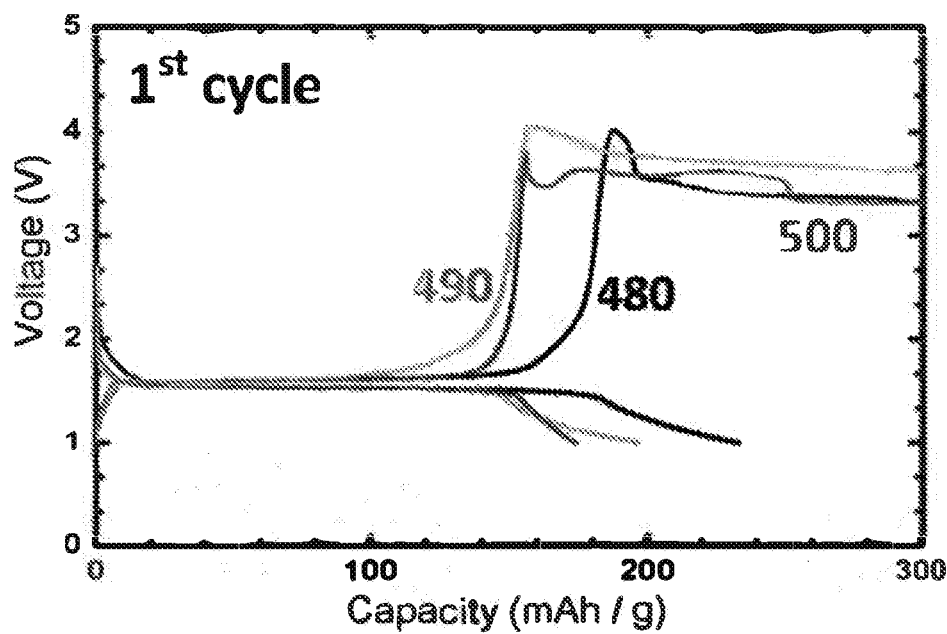

FIGS. 17A-17B show the first cycle charge and discharge curves of the seven LSPS-Cl samples; FIG. 17A shows the first cycle charge and discharge curves of the 400, 450, 460, and 470 samples, and FIG. 17B shows the first cycle charge and discharge curves the 480, 490, and 500 samples. Batteries incorporating LSPS-Cl 480, 490 and 500 cannot be charged beyond 4 V, because of the severe decomposition of these three LSPS-Cl samples, and this is shown in the data of FIG. 17B.

Figure 18A:
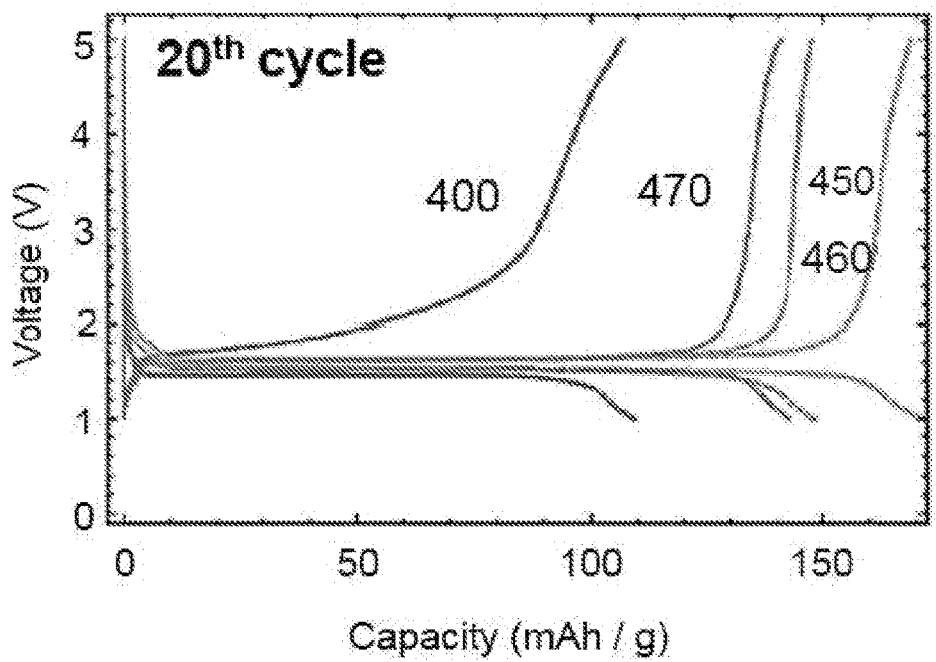
FIGS. 18A-18B: (A) Twentieth cycle charge and discharge curves of the LSPS-Cl 400, LSPS-Cl 450, LSPS-Cl 460, and LSPS-Cl 470 compositions. (B) Specific capacity as a function oy charge cycle number for the LSPS-Cl 400, LSPS-Cl 450, LSPS-Cl 460, and LSPS-Cl 470 compositions.
Figure 18B:
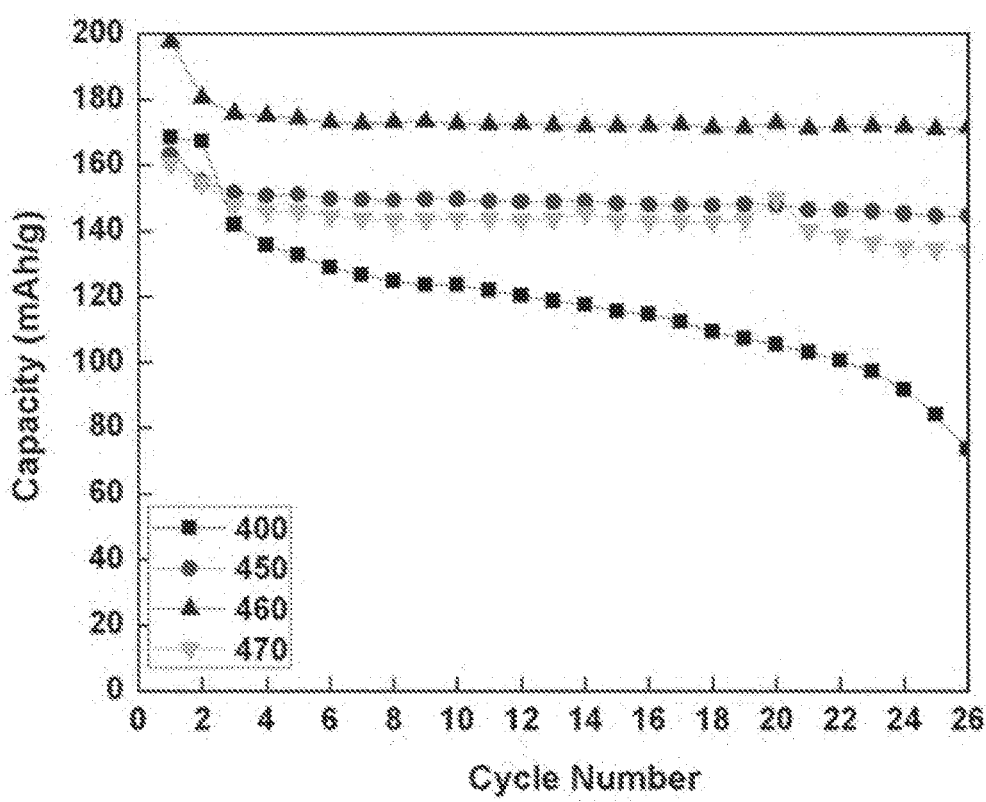
Figure 19A:
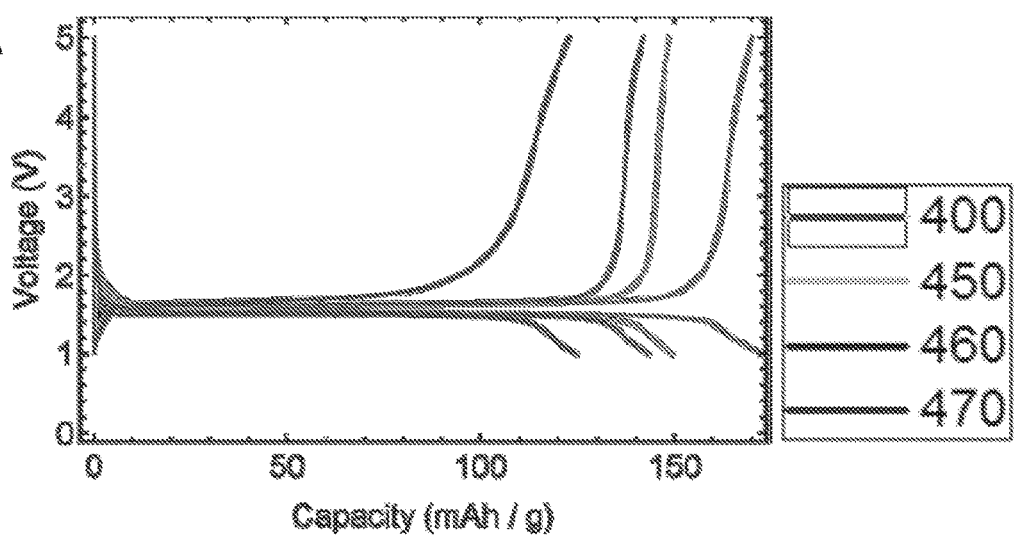
FIGS. 19A-19G: (A) Tenth cycle charge and discharge curves of the LSPS-Cl 400, LSPS-Cl 450, LSPS-Cl 460, and LSPS-Cl 470 compositions. (B) Twentieth cycle charge and discharge curves of the LSPS-Cl 400, LSPS-Cl 450, LSPS-Cl 460, and LSPS-Cl 470 compositions. (C) Thirtieth cycle charge and discharge curves of the LSPS-Cl 400, LSPS-Cl 450, LSPS-Cl 460, and LSPS-Cl 470 compositions. (D) Fortieth cycle charge and discharge curves of the LSPS-Cl 400, LSPS-Cl 450, LSPS-Cl 460, and LSPS-Cl 470 compositions. (E) Fiftieth cycle charge and discharge curves of the LSPS-Cl 400, LSPS-Cl 450, LSPS-Cl 460, and LSPS-Cl 470 compositions. (F) Sixtieth cycle charge and discharge curves of the LSPS-Cl 400, LSPS-Cl 450, LSPS-Cl 460, and LSPS-Cl 470 compositions. (G) Seventieth cycle charge and discharge curves of the LSPS-Cl 400, LSPS-Cl 450, LSPS-Cl 460, and LSPS-Cl 470 compositions.
Figure 19B:
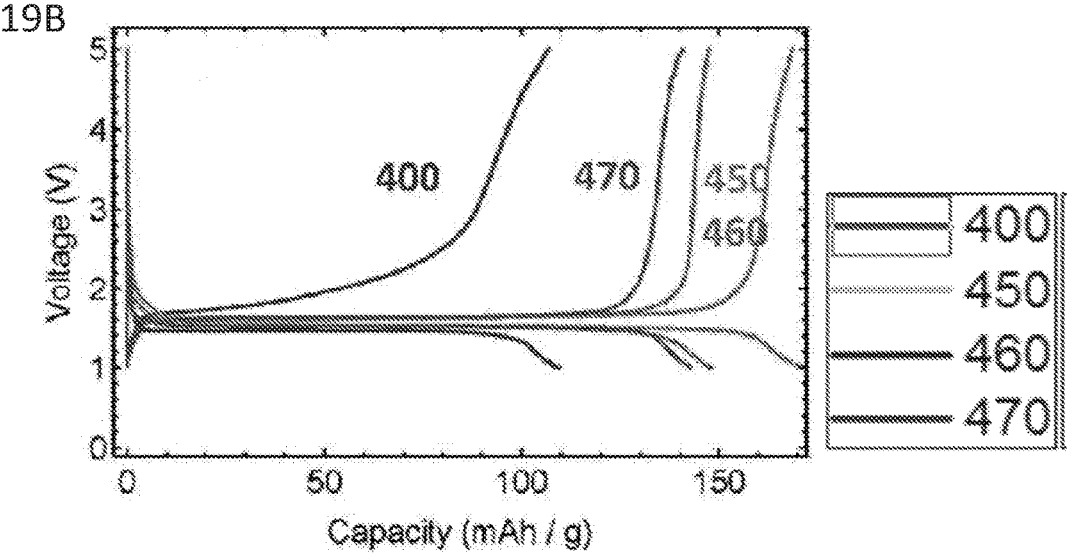
Figure 19C:
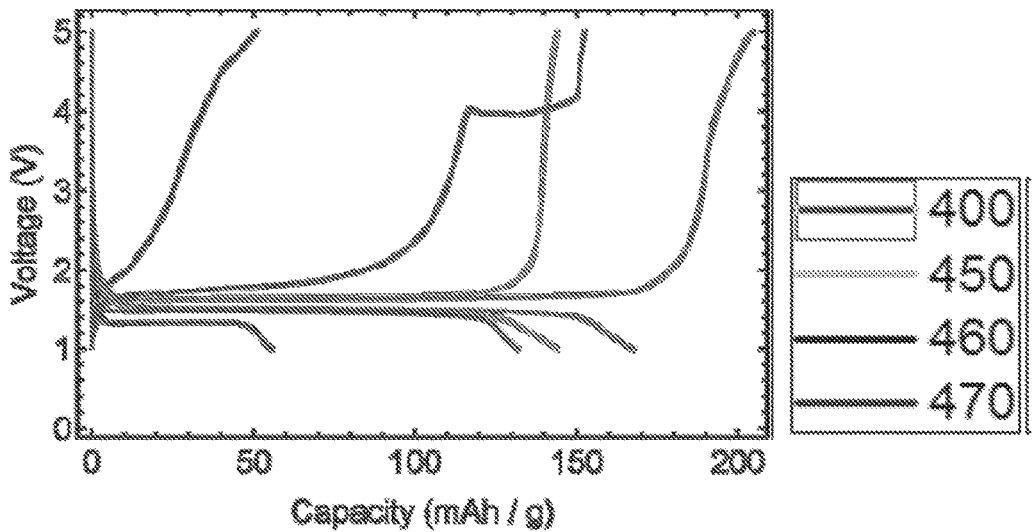
Figure 19D:
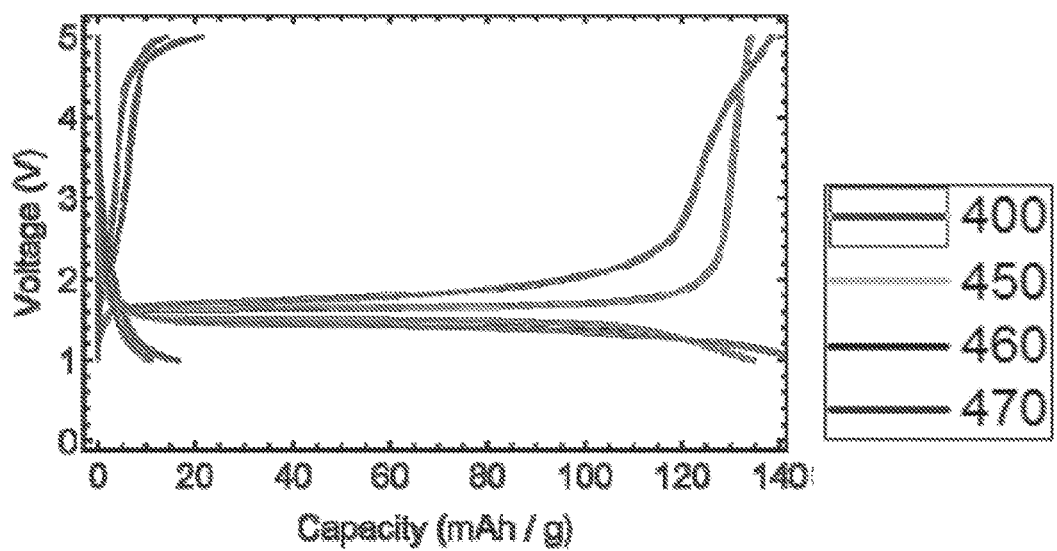
Figure 19E:
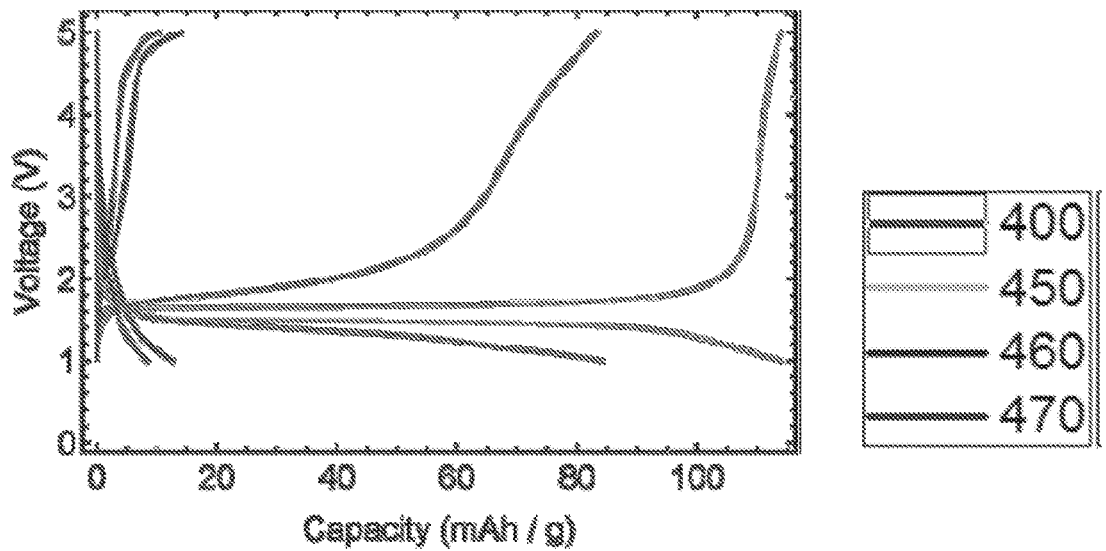
Figure 19F:
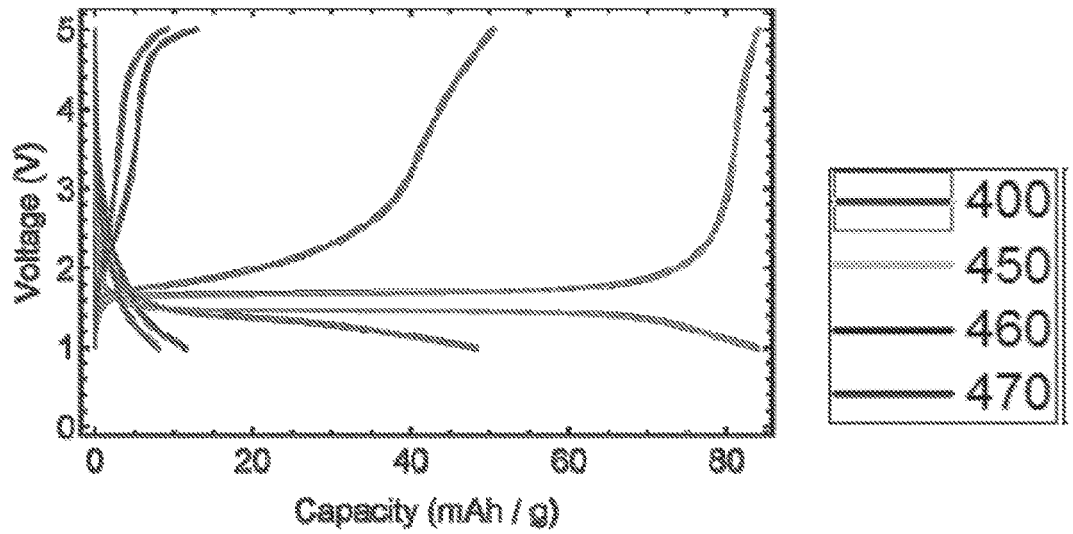
Figure 19G:
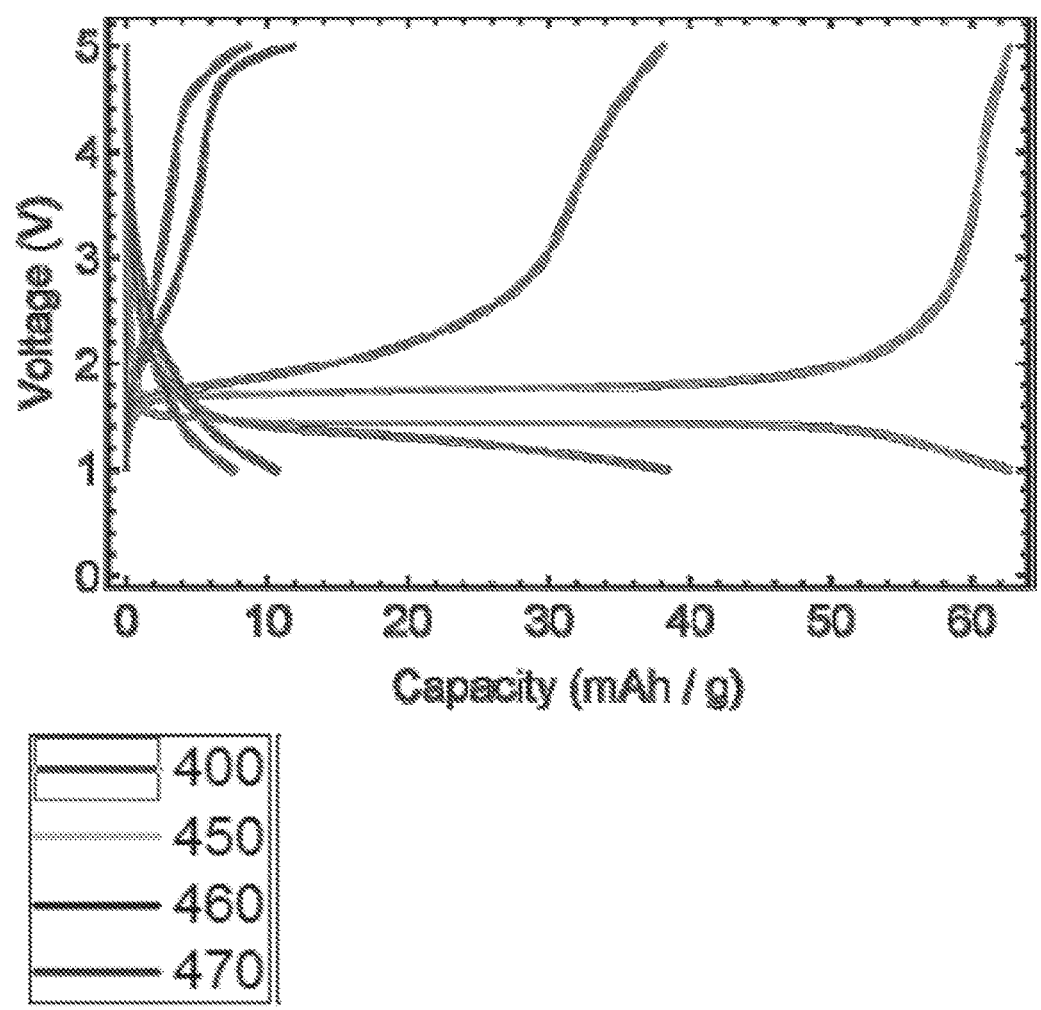

The battery incorporating LSPS-Cl 400 can be charged to 5 V successfully, but with a peak at 4 V on its first charge profile, due to the medium-degree decomposition of LSPS-Cl 400. In sharp contrast, the batteries incorporating LSPS-Cl 450, 460 and 470 can cycle between 1 and 5 V smoothly without voltage bumps, successfully reflecting the high voltage stabilities of these three LSPS-Cl samples. FIG. 18A shows the twentieth cycle charge and discharge curves of four of the seven LSPS-Cl samples, specifically the 400, 450, 460, and 470 samples, and FIG. 18B shows the battery capacity as a function of number of charge cycles for the same four samples. The charge/discharge profiles of the twentieth cycle for batteries incorporating LSPS-Cl 400, 450, 460 and 470 show differences between the minor-decomposition and medium-decomposition materials. This trend remained consistent out to the seventieth charge cycle, as seen in the data in FIGS. 19A-19G. The 1.5 V charge plateau remains flat for LSPS-Cl 450-470 batteries, while that of LSPS-Cl 400 battery disappears. The cycle performance of these batteries also corroborates that the specific capacity of LSPS-Cl 400 battery decays faster than that of LSPS-Cl 450-470 batteries, due to the greater decomposition of the LSPS-Cl 400 material, clearly seen in FIG. 18B.

Figure 20A:
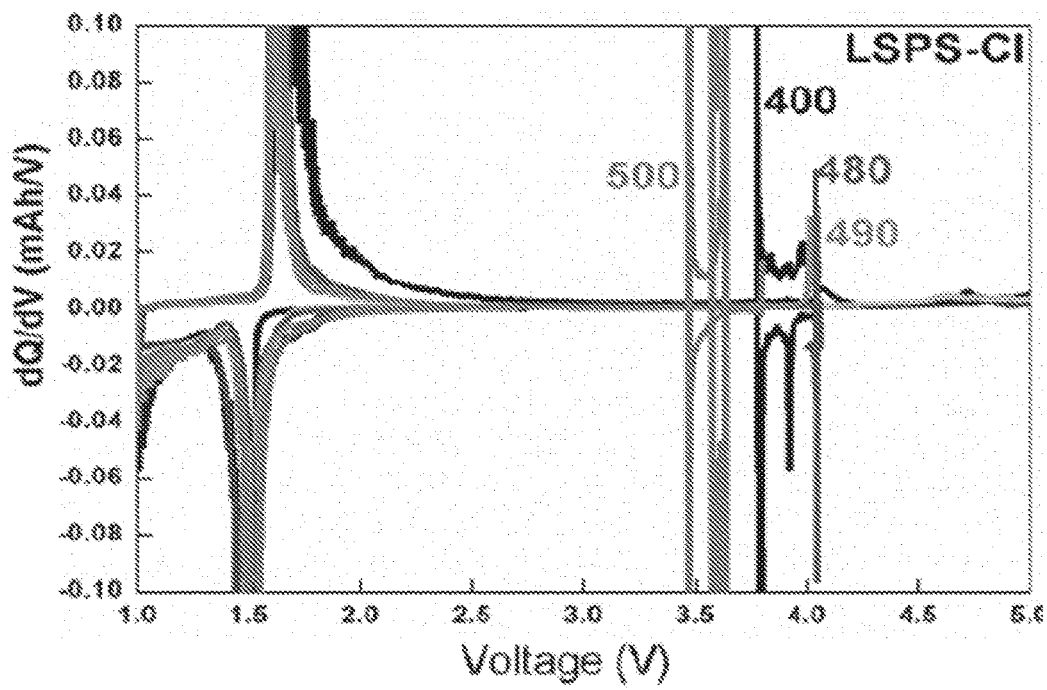
FIGS. 20A-20B: (A) Derivative of capacity versus voltage (dQ/dV) plots for the seven batteries cycled between 1-5 V. (B) Derivative of capacity versus voltage (dQ/dV) plots for the seven batteries cycled between 0.1-2 V.
Figure 20B:
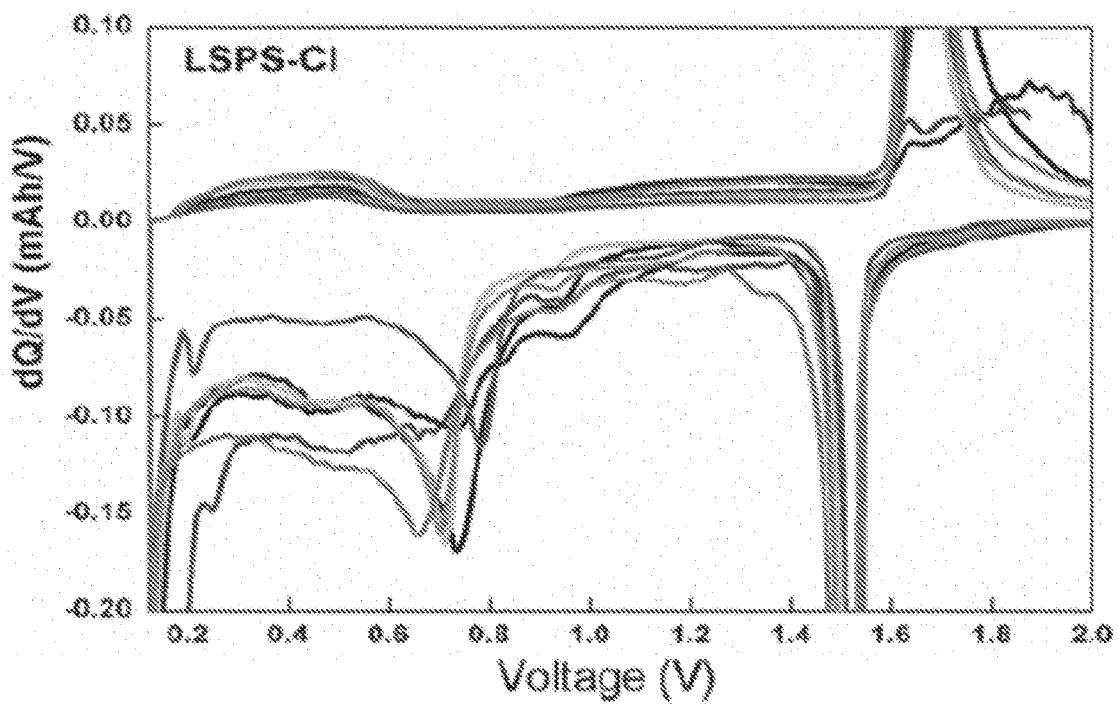
Figure 21:
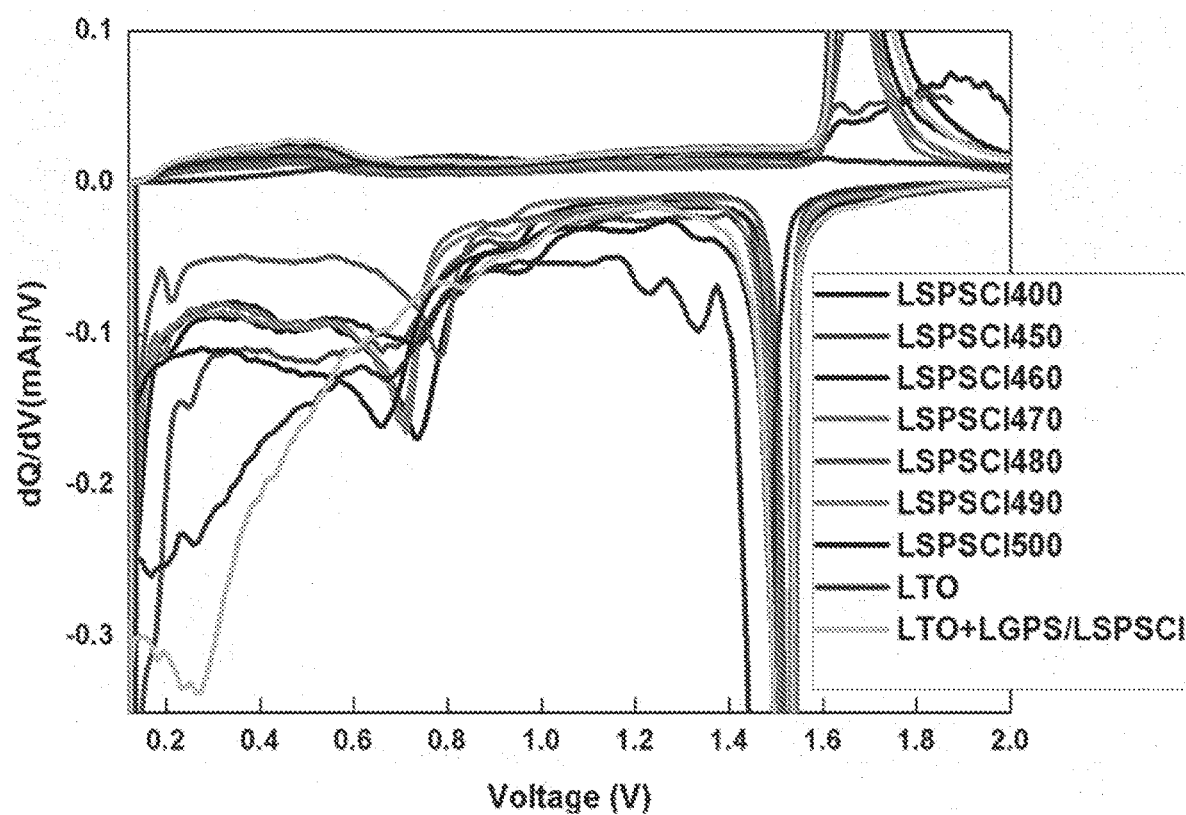
FIG. 21: Derivative of capacity versus voltage (dQ/dV) plots for $Li_4Ti_5O_{12}$+LSPS-Cl+C/LSPS-Cl/glass fiber/Li cells incorporating different LSPS-Cl materials and $Li_4Ti_5O_{12}$+LGPS/LSPS-Cl 470/glass fiber/Li cells, showing that the $Li_4Ti_5O_{12}$+LGPS/LSPS-Cl 470/glass fiber/Li cell has no peak at 0.7 V. In other words, the 0.7 V peak is not caused by the liquid electrolyte or the interaction between LSPS-Cl and liquid electrolyte.
Figure 22A:
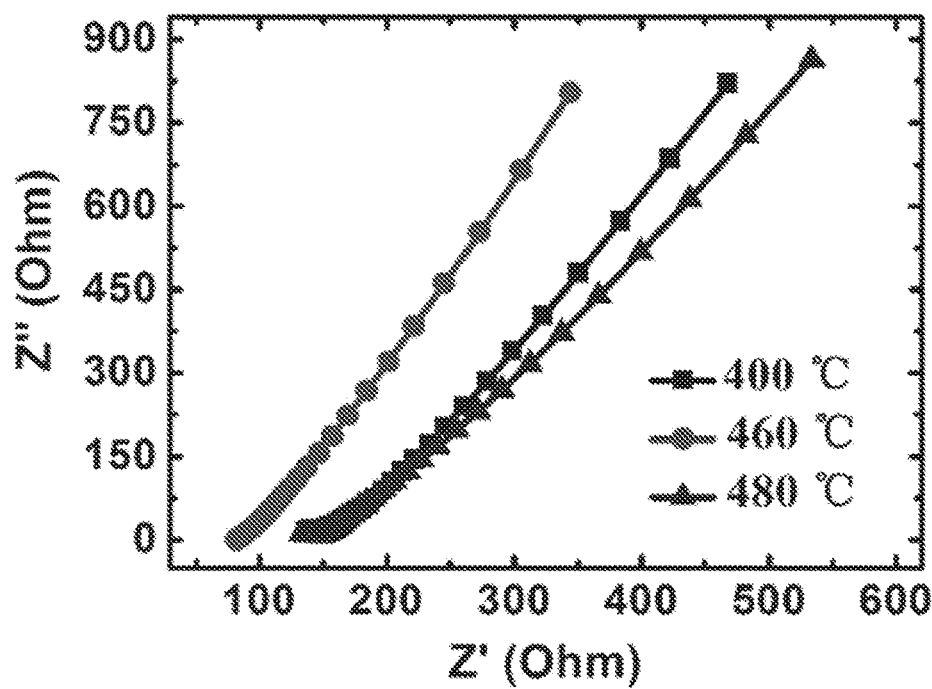
FIGS. 22A-22B: (A) Impedance profiles of C-LSPS/LSPS/C-LSPS with electrolytes at different annealing temperatures tested under a low pressure of 1 MPa. The total thicknesses of the cells are 800-900 μm and the C-LSPS layer is thin (~2% of total thickness) so that the profiles reflects the impedance behavior close to the real solid state electrolyte. (B) Ionic conductivities of LSPS with different annealing temperatures derived from panel (A).
Figure 22B:
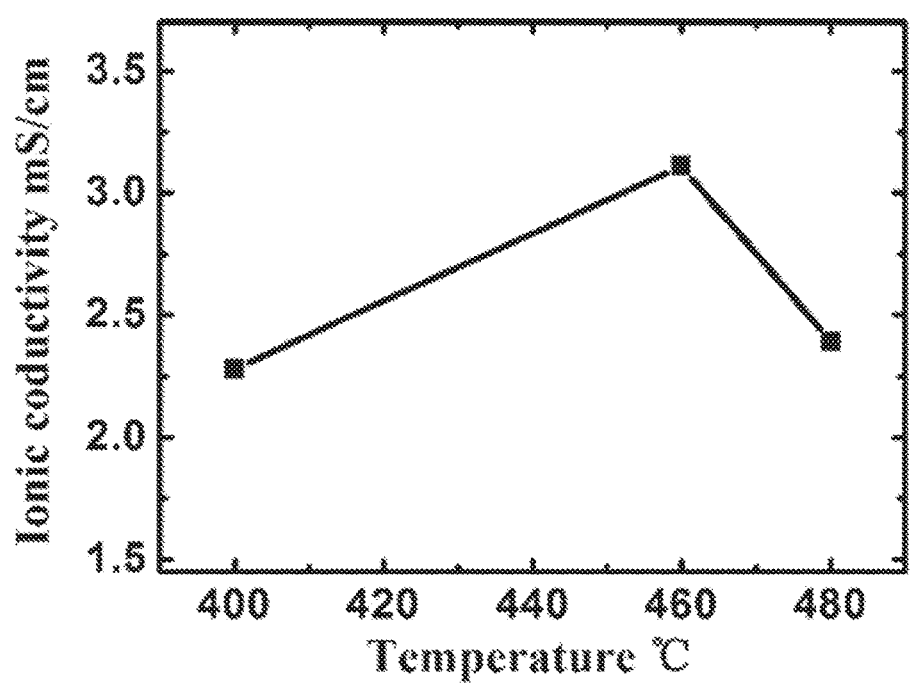

The derivative of capacity versus voltage (dQ/dV) plots for the seven batteries (FIGS. 20A-20B) show peaks at 1.5 V for all of them (due to the phase transition of LTO), and peaks at 3.5-4 V only for batteries incorporating medium- or severe-decomposition materials, corresponding well to the CV results (FIG. 13B). dQ/dV of these batteries cycled between 0.1-2 V (FIG. 20B) further confirmed the ~0.7 V decomposition peak for all seven LSPS-Cl materials, again consistent with the CV results (FIG. 21). Note that the LSPS-Cl samples with high voltage stabilities coincided with the high lithium ion conductivities measured by impedance spectroscopy. LSPS-Cl 400, 460 and 480 were selected as the representative materials of each category for the ionic conductivity measurement. Results, shown in FIGS. 22A-22B, indicate that LSPS-Cl 460 has the highest ionic conductivity of 3.1 mS/cm, while LSPS-Cl 400 and 480 show relatively lower ionic conductivity of 2.28 mS/cm and 2.39 mS/cm, respectively. Note that even higher ionic conductivity may be obtained by applying much higher pressure[21] during the impedance measurement, which was not applied during our test.

Figure 23A:
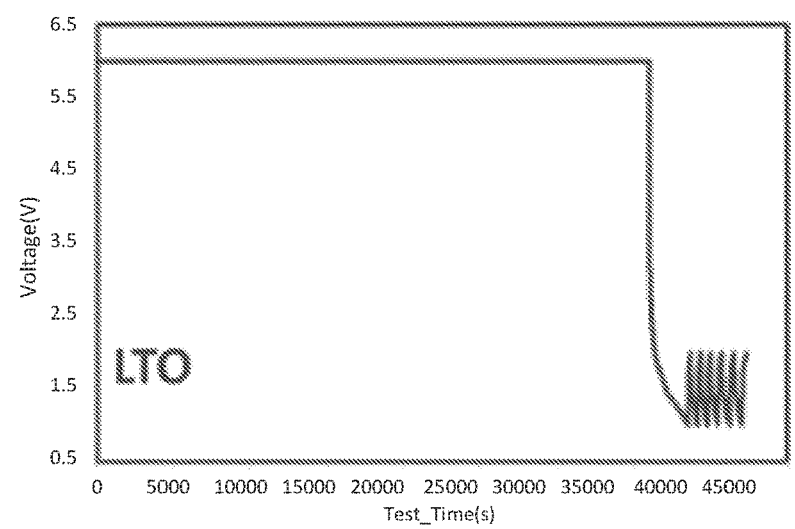
FIGS. 23A-23C: (A) Charge/discharge profiles of batteries using LTO+C+PTFE as the cathode and lithium foil as the anode. (B) Charge/discharge profiles of batteries using LTO+LSPS-Cl 460+C+PTFE as the cathode and lithium foil as the anode. (C) Charge/discharge profiles of batteries using LTO+LSPS 500-Cl+C+PTFE as the cathode and lithium foil as the anode. One piece of glass fiber separator was added between the cathode and the anode with one drop of electrolyte (1M LiPF$_6$ in 1:1 EC/DEC) added to conduct Li ions through the separator. All batteries were held at 6 V for 10 h before cycling between 1 and 2 V at a 0.5 C rate.
Figure 23B:
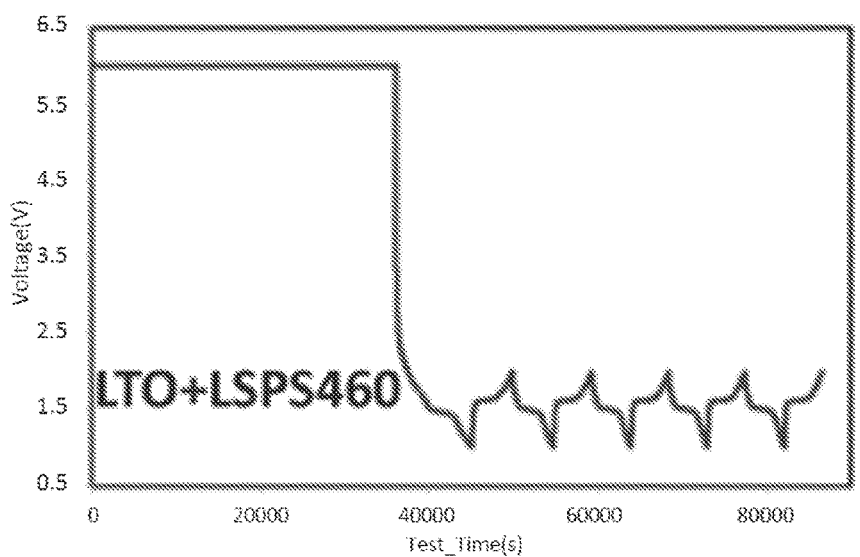
Figure 23C:
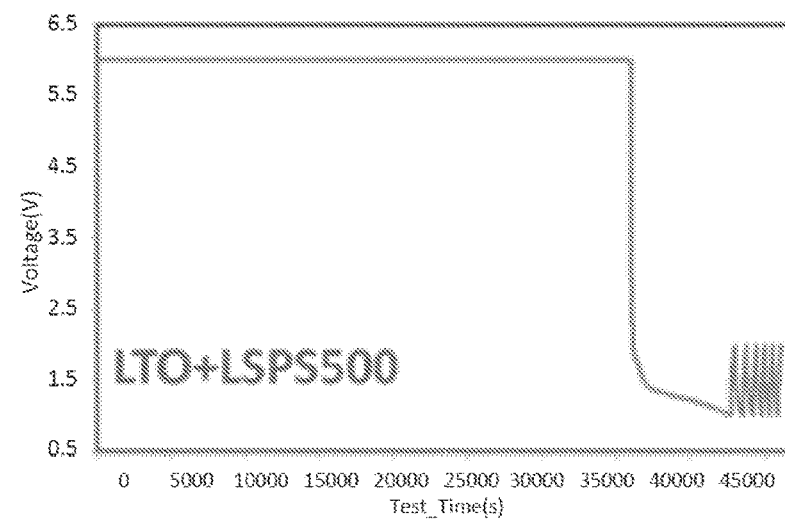
Figure 24A:
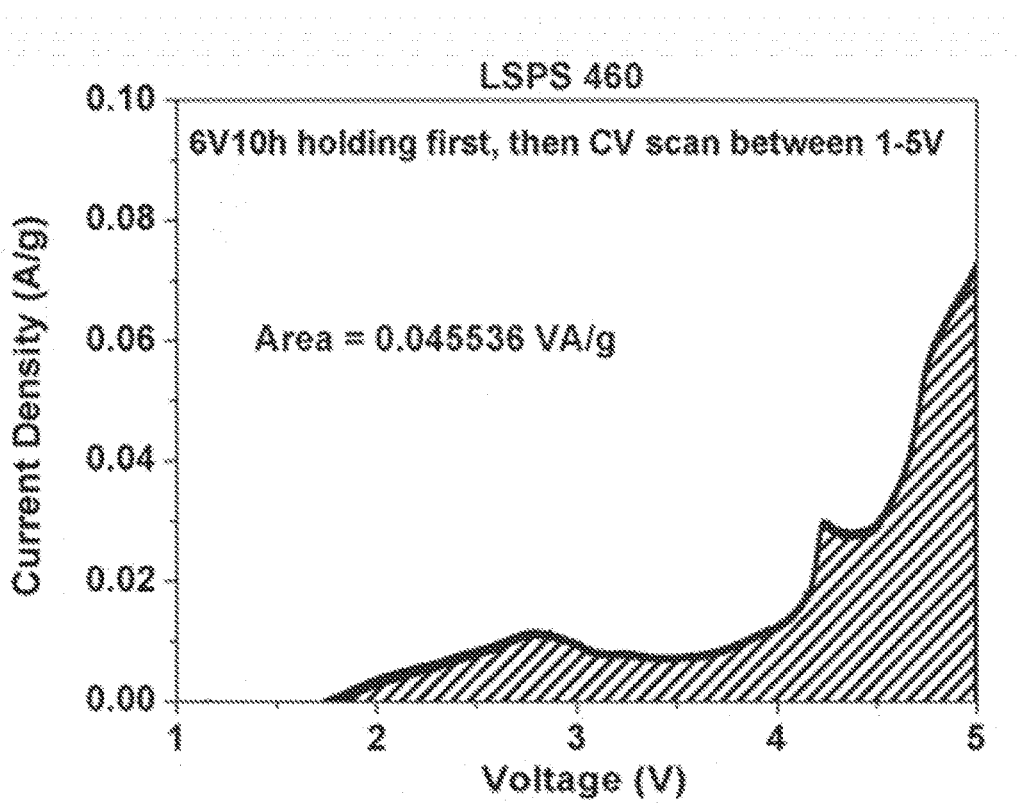
FIGS. 24A-24B: (A) 1-5 V cyclic voltammogram for a battery containing LSPS-Cl 460 as a solid electrolyte. (B) 1-5 V cyclic voltammogram for a battery containing LSPS-Cl 500 as a solid electrolyte. Prior to the CV tests, the batteries were held at 6 V for 10 h to completely decompose the liquid electrolytes possibly existing in pores and on surface area of LSPS-Cl particles. The ramping speed of the CV was 0.1 mV/s.
Figure 24B:
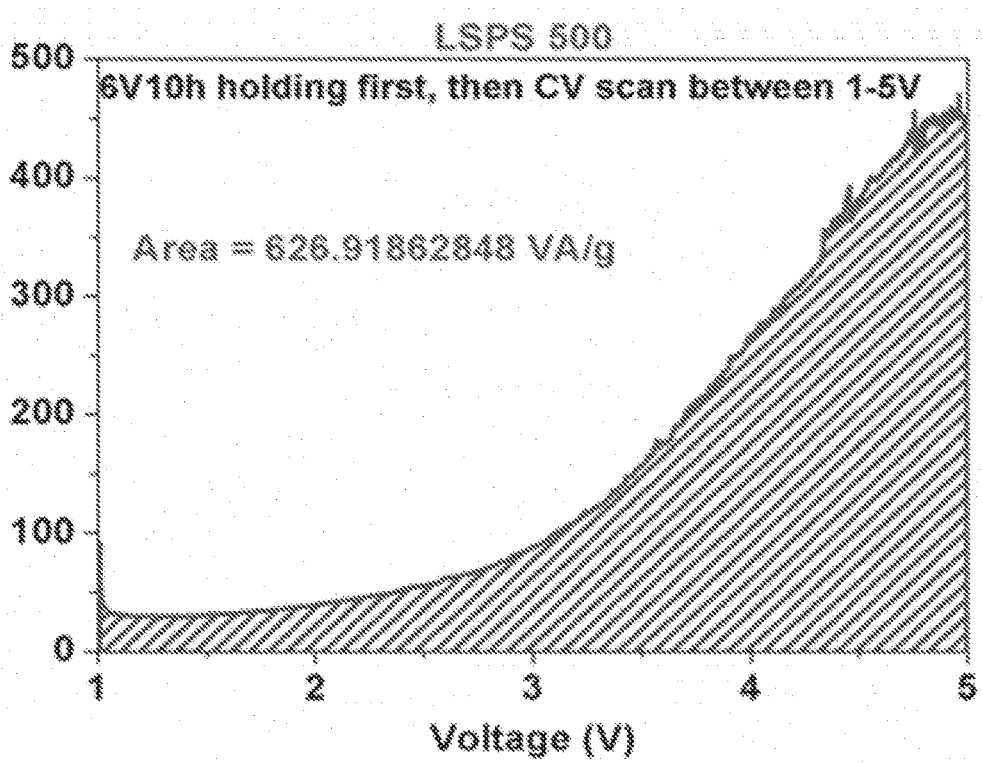

Example 6—Evaluation of the Stability of LSPS-Cl Solid State Electrolytes in a Rechargeable Battery Above 5 V In Examples 4 and 5, the half-cell batteries contain a glass fiber separator to avoid the influence from the interfacial interaction between the LSPS-Cl and lithium metal. A small amount of liquid electrolyte is thus added to the glass fiber to allow lithium ion conduction. To rule out any effect of the liquid electrolyte that may permeate into the cathode layer, the following experiments were performed. Prior to a battery test, the batteries were held at 6 V for 10 hours to decompose the liquid electrolyte within the high voltage portion of the battery, as the commercial electrolytes have a limited voltage stability window[29-31] and decompose at voltages above 4.5 V[30,31]. The decomposition of liquid electrolyte can be seen in the comparison of galvanostatic battery cycling tests (shown in FIGS. 23A-23C), where the battery lost the capacity in the normal liquid electrolyte cell without any LSPS-Cl solid electrolyte, while it can cycle normally in the cell with minor-decomposition of solid electrolyte of LSPS-Cl 460. If the LSPS-Cl 460 is replaced by LSPS-Cl 500, which exhibits severe decomposition at high voltage, the battery lost the capacity again after the 6 V holding. This is clear evidence that in the cathode region, a solid electrolyte with high voltage stability (such as LSPS-Cl 460) is the only lithium conducting medium after the liquid electrolyte decomposes. Similarly, after holding at 6 V for 10 hours, the subsequent CV scan reflects the intrinsic material property of LSPS-Cl without being influenced by the liquid electrolytes. Such CV tests (shown in FIGS. 24A-24B) show that the integrated decomposition current densities for LSPS-Cl 460 and LSPS-Cl 500 are 0.045536 VA/g and 626.918628 VA/g, respectively, consistent with the trends obtained from the normal CV tests without the 10 hours holding to decompose the liquid electrolyte.

Figure 25A:
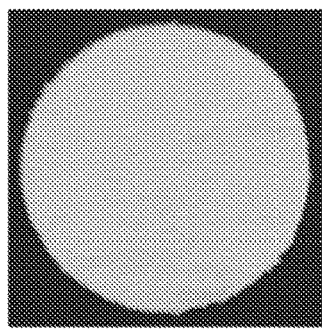
FIGS. 25A-25E: (A) Photograph of a glass fiber separator before installation in a rechargeable battery of the invention. (B) Photograph of a glass fiber separator installed in a rechargeable battery of the invention where the solid state electrolyte was LSPS-Cl 460 after cyclic voltammetry experiments between 1-5 V. (C) Photograph of a glass fiber separator installed in a rechargeable battery of the invention where the solid state electrolyte was LSPS-Cl 500 after cyclic voltammetry experiments between 1-5 V. (D) Cyclic voltammetry test result for minor decomposition material (LSPS-Cl 460) between 1 V and 5 V. (E) Cyclic voltammetry test result for severe decomposition material (LSPS-Cl 500) between 1 V and 5 V.
Figure 25B:
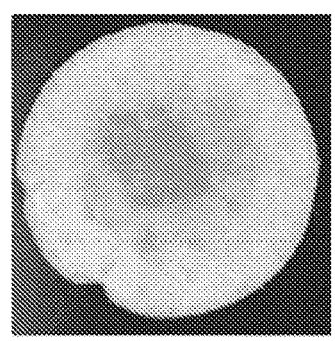
Figure 25C:
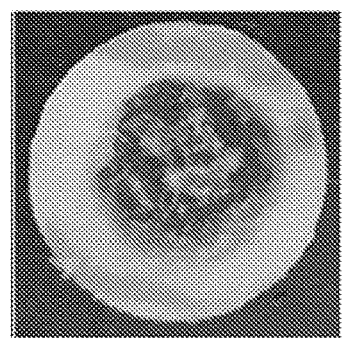
Figure 25D:
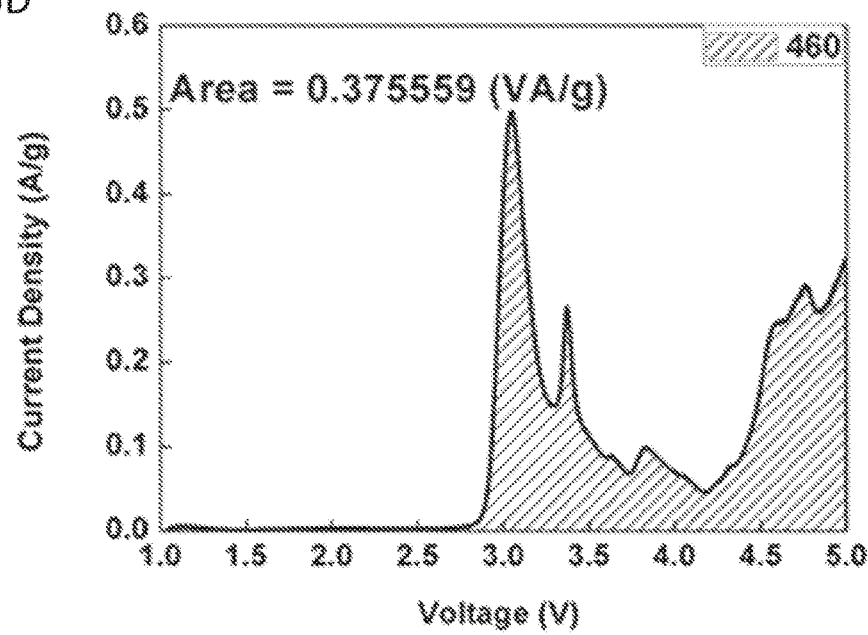
Figure 25E:
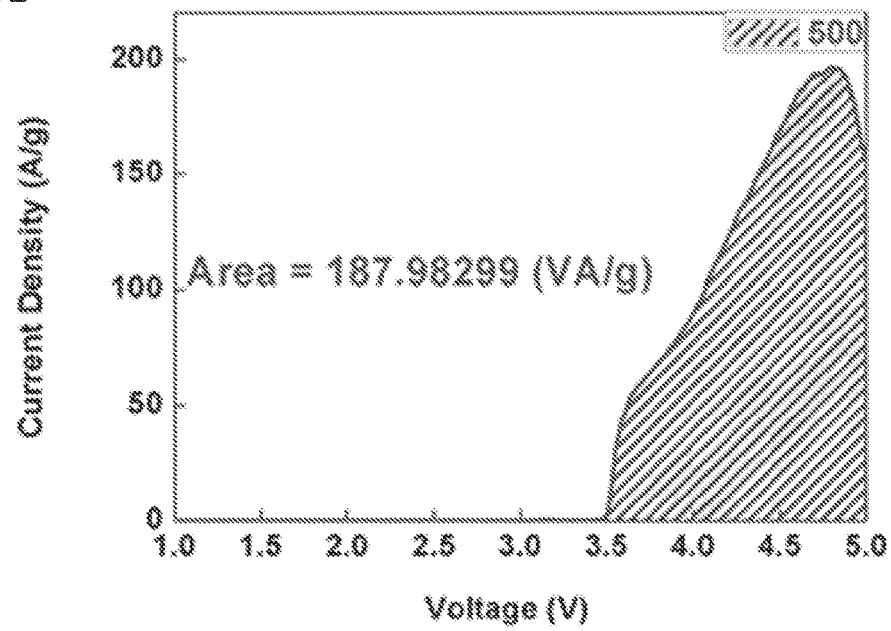

We disassembled batteries containing LSPS-Cl 460 and LSPS-Cl 500 solid state electrolytes to perform a visual inspection of the glass fiber separators. FIGS. 25A-25E shows photographs of the separator before installation (FIG. 25A), after use in a battery with LSPS-Cl 460 (FIG. 25B), and after use in a battery with LSPS-Cl 500 (FIG. 25C). The color of the separator remains almost unchanged (FIG. 25D) for minor-decomposition material (such as LSPS-Cl 460), while for severe-decomposition material (such as LSPS-Cl 500) the separator becomes black (FIG. 25E). SEM-EDS analyses on the black deposits on the separator of FIG. 25C, shown in FIG. 26, confirm the presence of Si, P, S and Cl on the glass fibers. The full composition of the black deposits on the separator is summarized in Table 5. Therefore, we conclude that at least the S signal results from the decomposition of LSPS-Cl 500.

TABLE 5

Figure 26A:
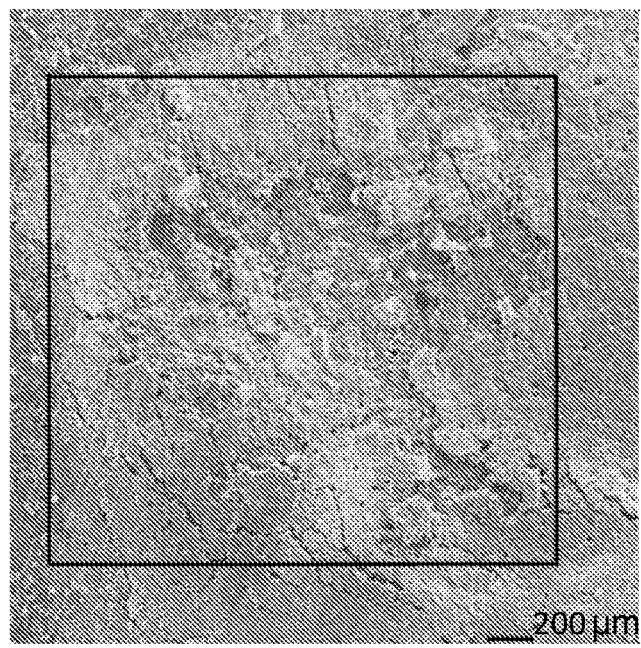
FIGS. 26A-26B: (A) SEM image of the black deposits on the glass fiber separator used in a rechargeable battery of the invention where the solid state electrolyte is LSPS-Cl 500 and (B) the corresponding energy dispersive spectrum of the region boxed in (A).
Figure 26B:
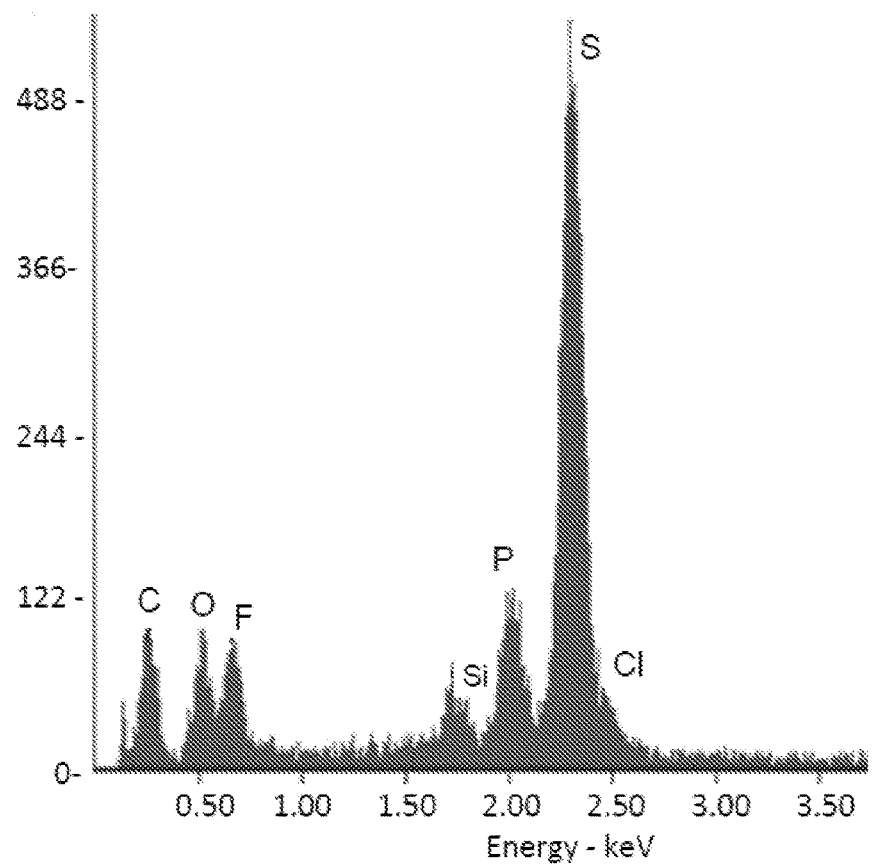

Quantitative SEM-EDS analysis of the spectrum FIG. 26 for all the detected elements deposited in the black region of the glass fiber separator of shown in FIG. 25C

| Element | Weight % | Atomic % |
| --- | --- | --- |
| C | 49.98 | 65.63 |
| O | 13.27 | 13.08 |
| F | 08.94 | 07.42 |

TABLE 5-continued

Quantitative SEM-EDS analysis of the spectrum FIG. 26 for all the detected elements deposited in the black region of the glass fiber separator of shown in FIG. 25C

| Element | Weight % | Atomic % |
| --- | --- | --- |
| Si | 01.82 | 01.02 |
| P | 04.62 | 02.35 |
| S | 21.00 | 10.33 |
| Cl | 00.36 | 00.16 |

Figure 27A:
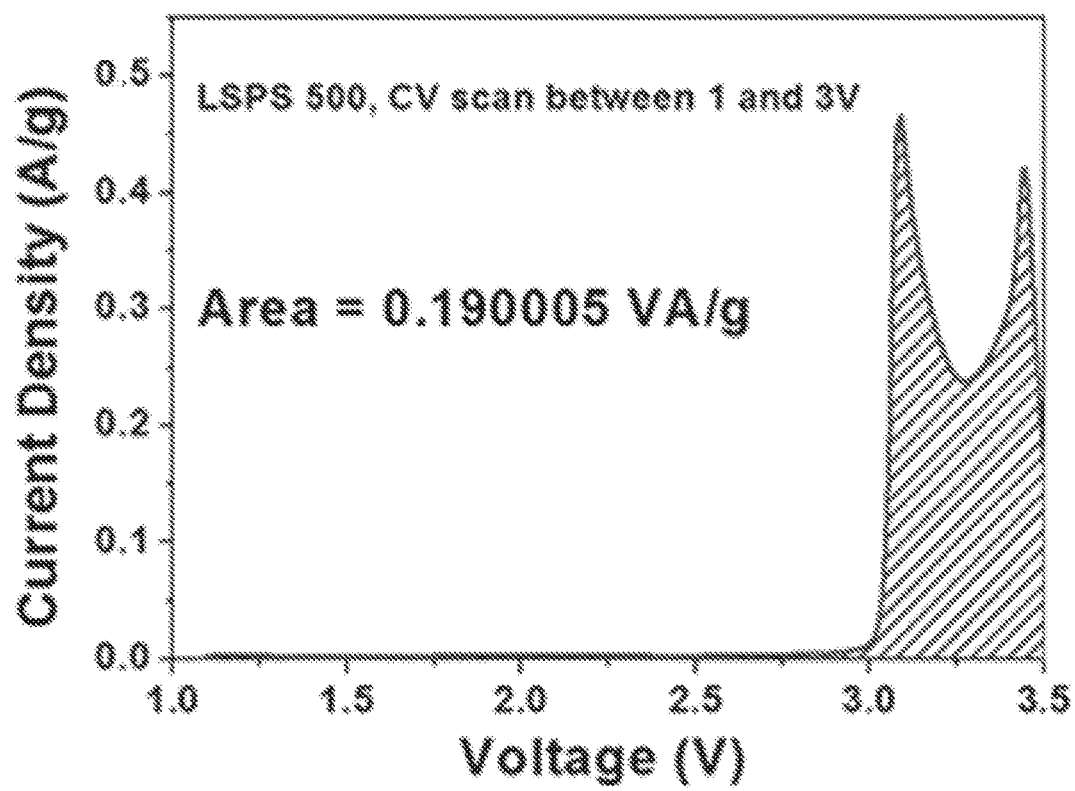
FIGS. 27A-27B: (A) Cyclic voltammetry test result for the severe decomposition material (LSPS-Cl 500) between 1-3.5 V to avoid the threshold for high voltage-induced decomposition. (B) Photograph of the separator installed in a rechargeable battery of the invention where the solid state electrolyte was LSPS-Cl 500 after cyclic voltammetry experiments between 1-3.5 V, showing little decomposition of the LSPS-Cl material.
Figure 27B:
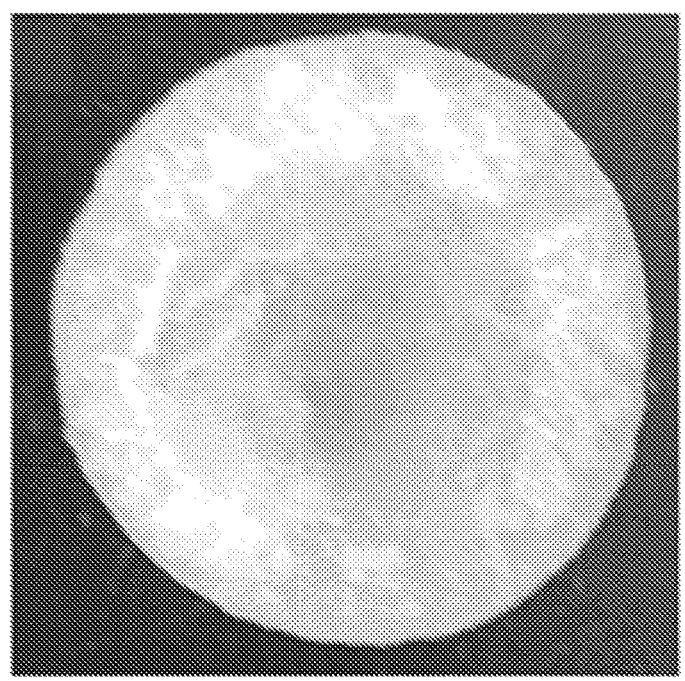

We further investigated the decomposition of the LSPS-Cl 500 material by performing CV experiments between 1 and 3.5 V to ensure that the material was below its breakdown threshold. The resulting CV of a battery using LSPC-Cl 500 and the separator from the cell are shown in FIGS. 27A-27B. In these experiments, the separator did not significantly discolor.

Figure 28A:
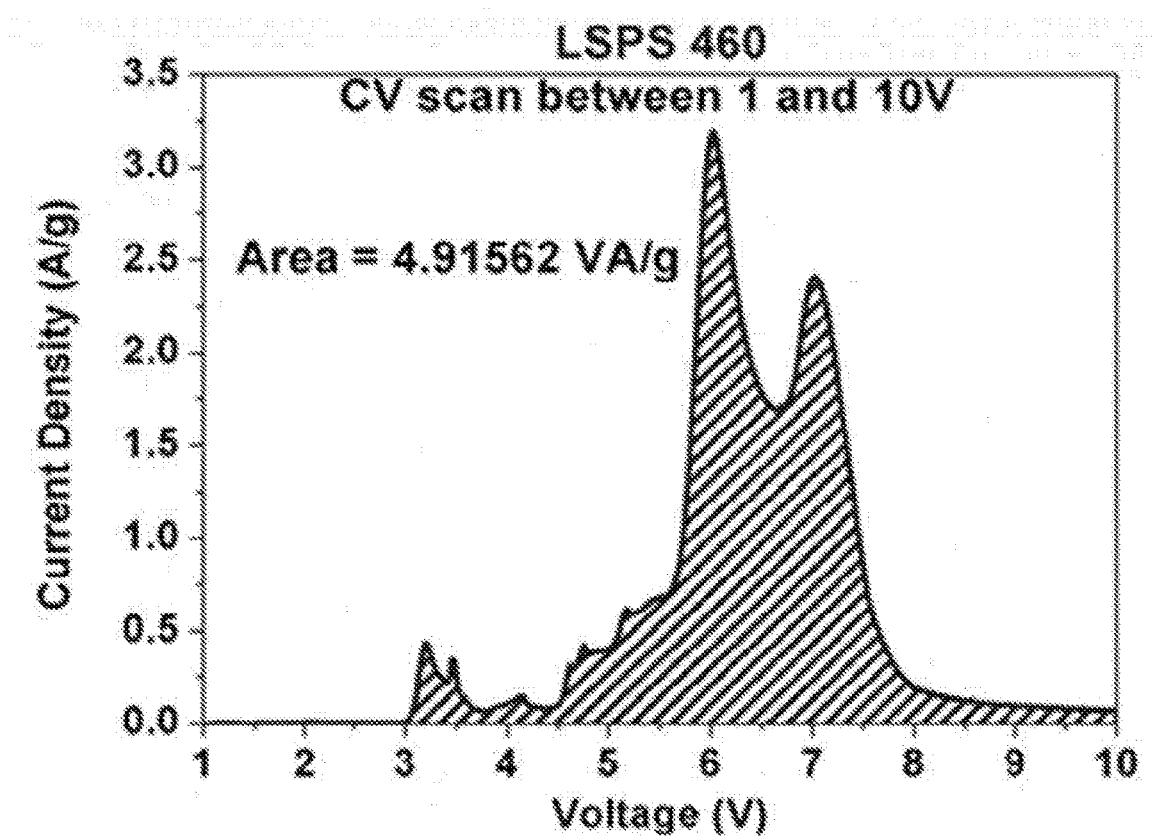
FIGS. 28A-28B: (A) Cyclic voltammetry test result for the minor decomposition material (LSPS-Cl 460) between 1-10 V. (B) Photograph of the separator installed in a rechargeable battery of the invention where the solid state electrolyte was LSPS-Cl 460 after cyclic voltammetry experiments between 1-10 V, showing minor decomposition of the LSPS-Cl material.
Figure 28B:
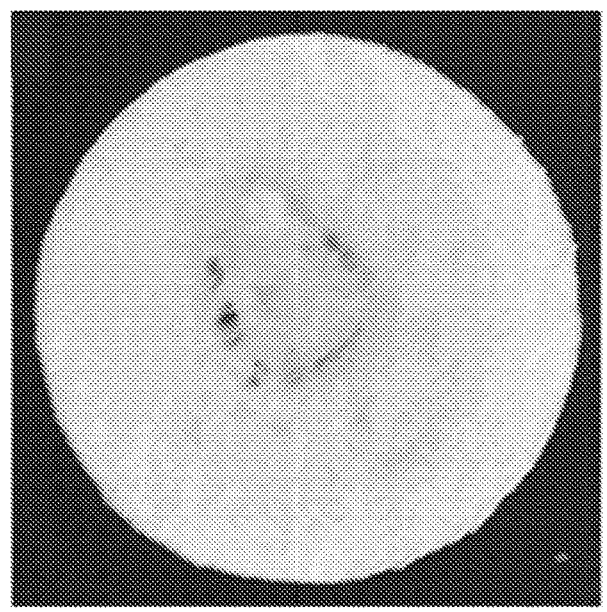

To explore the true electrochemical stability of LSPS-Cl 460 at high voltages, we expanded the CV test window up to 1-10 V, where the integrated current density was 4.91562 VA/g. The resulting CV and a photograph of the glass fiber separator are shown in FIGS. 28A-28B. The separator, shown in FIG. 28B, remains almost white with small black regions, indicating a small degree of decomposition.

Example 7—Relationship Between Material Rigidity and SSE Composition

Figure 29:
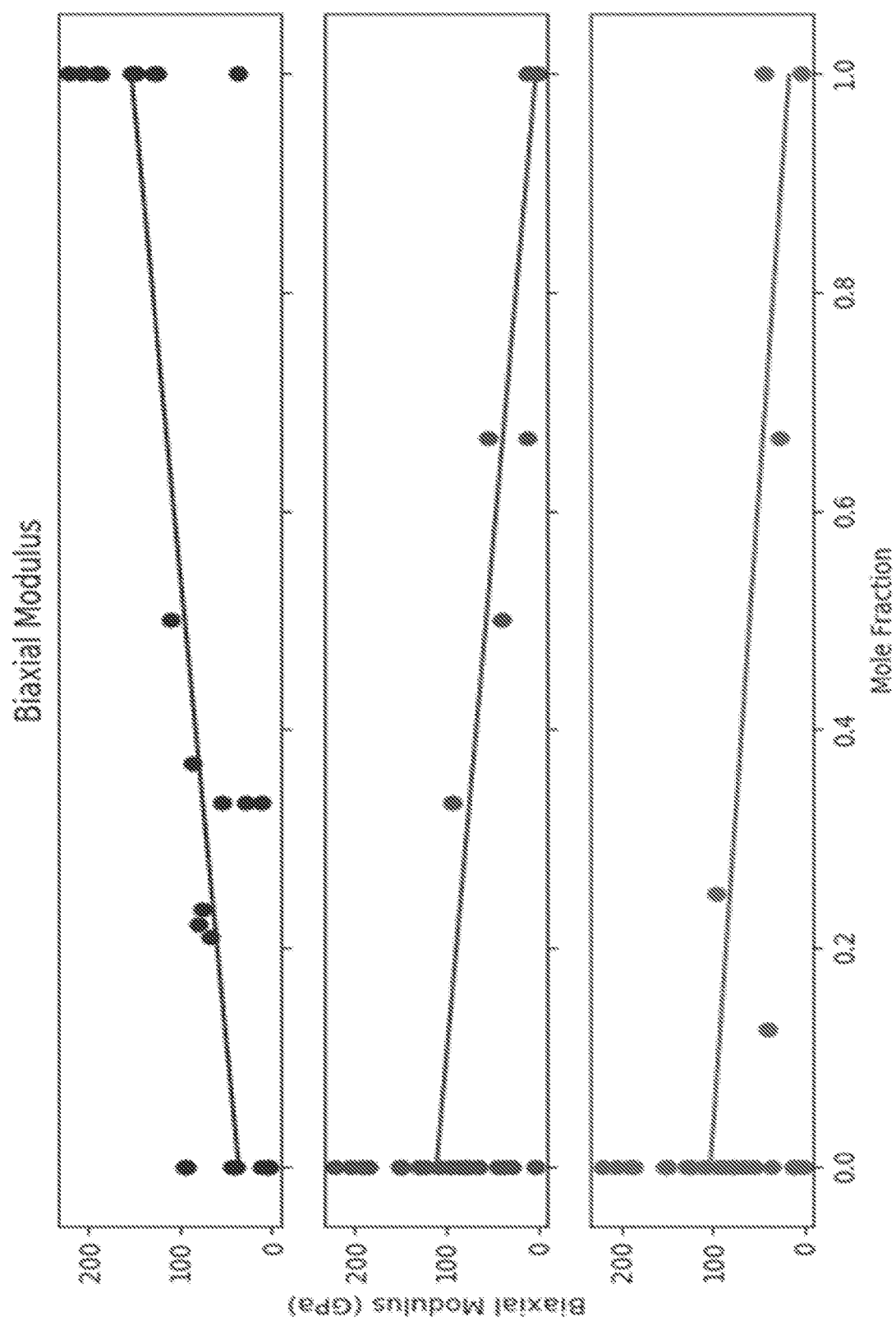
FIG. 29: Biaxial modulus (GPa) and trendlines vs. mole fraction for Si (top), S (middle), and P (bottom). Data points come from the Materials Project.

The rigidity of the shell, as described in previous Examples, is related to both the composition of the SSE and its sintering temperature. FIG. 29 shows biaxial modulus data for all Li—Si—P—S materials available within the Materials Project database. The biaxial moduli were obtained via the KVRH approximation. The overall trends show that, within this family of compounds, materials tend to increase in modulus with increasing Si content. Conversely, these materials tend to become lower in modulus (higher in compressibility) as either the S or P content is increased.

These results suggest that excess Si would be beneficial to the stability of sulfide-based solid state electrolyte. Given that Si and P sit in the same sites, this excess Si would have to come at the expense of P. In fact, this is in line with the best known performing $Li_{10}SiP_2S_{12}$ derivative, $Li_{9.54}Si_{1.74}P_{1.44}S_{11.7}Cl_{0.3}$, which was successfully cycled over 500 times[13]. Note that the Si:P ratio is over twice here than a typical LSPS.

It is also interesting to note that if we simply consider the monovalent defects ($V_{Li}^{1-}$, $Si_P^{1-}$, $P_S^{1+}Cl_S^{1+}$), the general doping structure is $Li_{10-x}Si_{1-x+y}P_{2+x-y}S_{12-y}Cl_y$. For the doping structure to have $[V_{Li}]=0.46$, $[Cl_S]=0.3$, and for everything to remain in its valence state, the Si, P, and S concentration would be fixed at $Li_{9.56}Si_{1.16}P_{1.84}S_{11.6}Cl_{0.3}$. This composition likely has a decreased compressibility compared to $Li_{10}SiP_2S_{12}$ given the excess Si. Forcing even more Si (such as the compound we synthesized) could lead to an amorphous shell phase with Si, consistent with our STEM-EDS measurement.

Given the high modulus of amorphous Si (biaxial modulus ~140 GPa[22,23]), it is likely that such a high Si:P ratio would lead to both a core of significantly decreased compressibility and a very rigid shell. This would satisfy both conditions 1 and 2 for improved stability windows of sulfide-based solid state electrolyte. Lastly, given that Si has a larger atomic radius that P, Si-rich LSPS would have an increased reaction strain (condition 3). To confirm the latter, we simulated the zero pressure isobaric decomposition energies for $Li_{10}SiP_2S_{12}$ and $Li_{10}Si_{1.5}P_{1.5}S_{12}$. The result found that in the low/high chemical potential region, the Si-rich material had a 2.3-3.6% higher reaction strain than the non-Si-rich material.

Our simulation on the LGPS system and experimental results show that its voltage stability can also be improved by the same mechanism, suggesting the universality of the theory for the sulfide solid electrolytes. Note that it is also possible that the "passivation layer" mentioned in the previous literature studies[19,24] actually serves as a similar core-shell microstructure generated by the reaction on the surface of a solid state electrolyte.

In practice, we expect a macroscopic sulfide-based solid state electrolyte material to contain particles with a distribution of $\beta_{shell}$. It should be noted that the shell serves a pressure vessel for the sulfide-based solid state electrolyte core. As such, the effective compressibility of shell is a complicated function of the shell mechanical properties, thickness, curvature, core volume, etc. In general, however, shell structures with high moduli, such as amorphous silicon, are the best. Considering the different lithium ion conductivities in the microstructures, if the shell conductivity is lower than the core, a thin rigid shell is thus preferred, in addition to the criteria for the core of low compressibility and high reaction strain, for the design of next generation sulfide solid electrolytes.

Example 8

In certain embodiments, half-cell batteries contain a glass-fiber separator to avoid the influence from the interfacial interaction between the LSPS and lithium metal. A small amount of liquid electrolyte was thus added to the glass-fiber to allow the lithium ion conduction. However, to rule out any effect of the liquid electrolyte that may permeate into the cathode layer, an all-solid state battery without any glass-fiber separator layer was fabricated and tested. A treatment was performed on Li foil to form a protective layer so that the interfacial reaction between LSPS solid electrolyte and Li can be avoided.

For all-solid state batteries, lithium anode was coated with a protection layer in the following steps: Firstly, a solution was prepared by mixing $Li_2S_6$ (0.5M) and $P_2S_5$ (1M) in the mixture solvent of DME and DOL (1:1, v/v) in the glovebox for 1 h. Then lithium foil (5/16 inch in diameter) was soaked into the prepared solution for 2 h. The soaked lithium foils were assembled into Li/Li symmetric battery for 5 cycles of charge-discharge, with 1M LiTFSi, 0.025M $Li_2S_6$, and 0.05M $P_2S_5$ in DME and DOL (1:1, v/v). Finally, the lithium foils after the above process were taken out of the symmetric battery for use as the anode (hereafter LPS-Li). The cathode of the all-solid state cell was a mixture of LTO+LSPS+carbon black powder (75:20:5), and solid electrolyte is pure LGPS powder. 0.5 mg of cathode mixture powder and 80 mg of solid electrolyte powder were pressed together to form a disc-shape pellet, which is pressed onto a freshly prepared LPS-Li in a Swagelock Cell to form an all-solid state battery. The same battery configuration was used for solid state CV test with 0.1 mV/s sweeping rate.

Results show that an all-solid state battery using a mixture of LTO+LSPS460+C as cathode (FIG. 30A) can be charged to 4V smoothly, while the all-solid state battery using LTO+LSPS500+C cathode failed at ~3.6V (FIG. 30B) due to a much more severe decomposition of LSPS500. These all-solid state battery results correspond to the trend obtained by semi-solid state battery configuration (FIGS. 17A-17B and 18A-18B), confirming again that LSPS solid electrolytes synthesized with different conditions have different electrochemical stabilities.

Making use of the same solid state battery configuration, a solid state CV test was performed to rule out the possible effect of liquid electrolyte on the electrochemical stability test results of LSPS. FIGS. 30C-30D show the CV scan results in the voltage range of 1-5V for all-solid state batteries using LTO+LSPS460+C and LTO+LSPS500+C cathode, respectively. The CV peaks of LTO around 1.5V exist for both batteries. However, no decomposition was observed for LSPS460, while the decomposition of LSPS500 starting at ~3.5V was apparent. These results match well with the CV results obtained by liquid cell, confirming the different electrochemical stabilities of various LSPS solid electrolytes.

REFERENCES

1 Armand, M. & Tarascon, J. M. Building better batteries. *Nature* 451, 652-657 (2008).
2 Goodenough, J. B. & Kim, Y. Challenges for Rechargeable Li Batteries. *Chemistry of Materials* 22, 587-603, (2010).
3 Etacheri, V., Marom, R., Elazari, R., Salitra, G. & Aurbach, D. Challenges in the development of advanced Li-ion batteries: a review. *Energy & Environmental Science* 4, 3243-3262, (2011).
4 Whittingham, M. S. Lithium Batteries and Cathode Materials. *Chemical Reviews* 104, 4271-4302, (2004).
5 Nitta, N., Wu, F., Lee, J. T. & Yushin, G. Li-ion battery materials: present and future. *Materials Today* 18, 252-264, (2015).
6 Zhou, G., Li, F. & Cheng, H.-M. Progress in flexible lithium batteries and future prospects. *Energy & Environmental Science* 7, 1307-1338, (2014).
7 Gadjourova, Z., Andreev, Y. G., Tunstall, D. P. & Bruce, P. G. Ionic conductivity in crystalline polymer electrolytes. *Nature* 412, 520, (2001).
8 Quartarone, E. & Mustarelli, P. Electrolytes for solid state lithium rechargeable batteries: recent advances and perspectives. *Chemical Society Reviews* 40, 2525-2540, (2011).
9 Deviannapoorani, C., Dhivya, L., Ramakumar, S. & Murugan, R. Lithium ion transport properties of high conductive tellurium substituted $Li_7La_3Zr_2O_{12}$ cubic lithium garnets. *Journal of Power Sources* 240, 18-25, (2013).
10 Geiger, C. A. et al. Crystal Chemistry and Stability of "$Li_7La_3Zr_2O_{12}$" Garnet: A Fast Lithium-Ion Conductor. *Inorganic Chemistry* 50, 1089-1097, (2011).
11 Han, X. et al. Negating interfacial impedance in garnet-based solid state Li metal batteries. *Nature Materials* 16, 572, (2016).
12 Ren, Y. et al. Oxide Electrolytes for Lithium Batteries. *Journal of the American Ceramic Society* 98, 3603-3623, (2015).
13 Kato, Y. et al. High-power all-solid state batteries using sulfide superionic conductors. *Nature Energy* 1, 16030, (2016).
14 Mizuno, F., Hayashi, A., Tadanaga, K. & Tatsumisago, M. New, Highly Ion-Conductive Crystals Precipitated from $Li_2S$—$P_2S_5$ Glasses. *Advanced Materials* 17, 918-921, (2005).
15 Rangasamy, E. et al. An Iodide-Based $Li_7P_2S_6I$ Superionic Conductor. *Journal of the American Chemical Society* 137, 1384-1387, (2015).

16 Kamaya, N. et al. A lithium superionic conductor. *Nature Materials* 10, 682, (2011).
17 Han, F., Gao, T., Zhu, Y., Gaskell, K. J. & Wang, C. A Battery Made from a Single Material. *Advanced Materials* 27, 3473-3483, (2015).
18 Han, F., Zhu, Y., He, X., Mo, Y. & Wang, C. Electrochemical Stability of $Li_{10}GeP_2S_{12}$ and $Li_7La_3Zr_2O_{12}$ Solid Electrolytes. *Advanced Energy Materials* 6, 1501590 (2016).
19 Mo, Y., Ong, S. P. & Ceder, G. First Principles Study of the $Li_{10}GeP_2S_{12}$ Lithium Super Ionic Conductor Material. *Chemistry of Materials* 24, 15-17, (2012).
20 Ong, S. P. et al. Phase stability, electrochemical stability and ionic conductivity of the $Li_{10+/-1}MP_2X_{12}$ (M=Ge, Si, Sn, Al or P, and X=O, S or Se) family of superionic conductors. *Energy & Environmental Science* 6, 148-156, (2013).
21 Xu, R. et al. Construction of All-solid state Batteries based on a Sulfur-Graphene Composite and $Li_{9.54}Si_{1.74}P_{1.44}S_{11.7}Cl_{0.3}$ Solid Electrolyte. *Chemistry—A European Journal* 23, 13950-13956, (2017).
22 Witvrouw, A. & Spaepen, F. Viscosity and elastic constants of amorphous Si and Ge. *Journal of Applied Physics* 74, 7154-7161, (1993).
23 De Sandre, G., Colombo, L. & Bottani, C. Calculation of elastic constants in defected and amorphous silicon by quantum simulations. *Physical Review B* 54, 11857-11860 (1996).
24 Kobayashi, T., Yamada, A. & Kanno, R. Interfacial reactions at electrode/electrolyte boundary in all solid state lithium battery using inorganic solid electrolyte, thio-LISICON. *Electrochimica Acta* 53, 5045-5050, (2008).
25 Jain, A. et al. Commentary: The Materials Project: A materials genome approach to accelerating materials innovation. *APL Materials* 1, 011002, (2013).
26 Ong, S. P. et al. Python Materials Genomics (pymatgen): A robust, open-source python library for materials analysis. *Computational Materials Science* 68, 314-319, (2013).
27 Ong, S. P. et al. The Materials Application Programming Interface (API): A simple, flexible and efficient API for materials data based on REpresentational State Transfer (REST) principles. *Computational Materials Science* 97, 209-215, (2015).
28 de Jong, M. et al. Charting the complete elastic properties of inorganic crystalline compounds. *Scientific Data* 2, 150009, (2015).
29 J. R. Croy, A. Abouimrane, Z. Zhang, Next-generation lithium-ion batteries: The promise of near-term advancements *MRS Bulletin* 39, 407-415 (2014).
30 Y. Li, B. Ravdel, B. L. Lucht, Electrochem. Electrolyte Reactions with the Surface of High Voltage LiNi0.5Mn1.5O4 Cathodes for Lithium-Ion Batteries, *Solid State Letters* 13 A95-A97 (2010).
31 L. Hu, Z. Zhang, K. Amine, Electrochemical investigation of carbonate-based electrolytes for high voltage lithium-ion cells, *J. Power Sources* 236, 175-180 (2013).
Other embodiments are in the claims.

What is claimed is:

1. A solid state electrolyte comprising:
an ion-conducting core comprising an alkali metal and S, wherein an atomic percentage of the S in the ion-conducting core is in a range of about 60% to about 80% of detectable elements; and
an ion-conducting shell comprising the alkali metal and S disposed around the ion-conducting core,
wherein the ion-conducting shell comprises a lower atomic percentage of S than the atomic percentage of S in the ion-conducting core;
wherein the ion-conducting shell increases stability of the solid state electrolyte during electrical cycling by reducing expansion of the ion-conducting core.

2. The solid state electrolyte of claim 1, wherein at least one of the ion-conducting core and the ion-conducting shell further comprises P, Si, Ge, or Sn.

3. The solid state electrolyte of claim 1, wherein the alkali metal is selected from the group consisting of Li, Na, K, Rb, and Cs.

4. The solid state electrolyte of claim 3, wherein the alkali metal is Li.

5. The solid state electrolyte of claim 1, wherein at least one of the ion-conducting core and the ion-conducting shell further comprises a dopant atom.

6. The solid state electrolyte of claim 5, wherein the dopant atom is a halogen.

7. The solid state electrolyte of claim 6, wherein the halogen is Cl.

8. The solid state electrolyte of claim 5, wherein the dopant atom is a chalcogen.

9. The solid state electrolyte of claim 8, wherein the chalcogen is O.

10. The solid state electrolyte of claim 1, wherein the detectable elements in the ion-conducting core comprise about 65% to about 80% S, about 10% to about 20% P, about 5% to about 15% Si, and about 0% to about 10% Cl.

11. The solid state electrolyte of claim 1, wherein the detectable elements in the ion-conducting shell comprise about 30% to about 70% S, about 0% to about 5% P, about 25% to about 50% Si, and about 5% to about 20% Cl.

12. The solid state electrolyte of claim 1, wherein the ion-conducting shell has a Young's modulus of about 1 GPa to about 250 GPa.

13. The solid state electrolyte of claim 12, wherein the ion-conducting shell has a Young's modulus of about 10 GPa to about 30 GPa.

14. The solid state electrolyte of claim 12, wherein the ion-conducting shell has a Young's modulus of about 20 GPa to about 40 GPa.

15. The solid state electrolyte of claim 1, wherein the ion-conducting shell comprises S in a range of about 35% to about 80% of detectable elements.

16. The solid state electrolyte of claim 15, wherein at least one of the ion-conducting core and the ion-conducting shell further comprises a dopant atom.

17. The solid state electrolyte of claim 16, wherein the dopant atom is a chalcogen.

18. The solid state electrolyte of claim 17, wherein the chalcogen is O.

19. The solid state electrolyte of claim 15, wherein the at least one of the ion-conducting core and the ion-conducting shell further comprises P in a range of about 0% to about 25% of detectable elements.

20. The solid state electrolyte of claim 19, wherein at least one of the ion-conducting core and the ion-conducting shell further comprises a dopant atom.

21. The solid state electrolyte of claim 20, wherein the dopant atom is a chalcogen.

22. The solid state electrolyte of claim 21, wherein the chalcogen is O.

23. The solid state electrolyte of claim 1, wherein the detectable elements are elements detectable by energy dispersive X-ray spectroscopy (EDS).

24. A rechargeable battery, comprising first and second electrodes and the solid state electrolyte of claim 1, wherein the solid state electrolyte is disposed between the first and second electrodes.

25. The rechargeable battery of claim 24, wherein the first electrode comprises lithium titanate (LTO), carbon, and a fluoropolymer.

26. The rechargeable battery of claim 24, wherein the second electrode is an alkali metal.

27. The rechargeable battery of claim 26, wherein the second electrode is lithium.

28. The rechargeable battery of claim 24, wherein the battery does not comprise a liquid electrolyte.

29. The rechargeable battery of claim 24, further comprising a liquid electrolyte.

\* \* \* \* \*